US010479343B2

(12) United States Patent
Frait et al.

(10) Patent No.: US 10,479,343 B2
(45) Date of Patent: Nov. 19, 2019

(54) METHODS AND SYSTEMS FOR ENGINE-OFF DISENGAGEMENT OF A VEHICLE PARK STATE

(71) Applicant: Ford Global Technologies, LLC, Dearborn, MI (US)

(72) Inventors: Steven Anatole Frait, Milan, MI (US); Jason Meyer, Canton, MI (US); Kevin Ray Ruybal, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 15/794,697

(22) Filed: Oct. 26, 2017

(65) Prior Publication Data

US 2018/0118185 A1 May 3, 2018

Related U.S. Application Data

(60) Provisional application No. 62/415,392, filed on Oct. 31, 2016.

(51) Int. Cl.
*B60W 10/113* (2012.01)
*B60K 6/48* (2007.10)
(Continued)

(52) U.S. Cl.
CPC ............. *B60W 10/113* (2013.01); *B60K 6/26* (2013.01); *B60K 6/387* (2013.01); *B60K 6/442* (2013.01);
(Continued)

(58) Field of Classification Search
CPC ............. Y10T 477/837; Y10T 477/839; Y10T 477/865; F16H 61/688; F16H 63/48;
(Continued)

(56) References Cited

U.S. PATENT DOCUMENTS 8,645,037 B2 * 2/2014 Kato ...................... B60K 6/445
701/70
9,261,188 B2 * 2/2016 Ruehle ................ F16H 63/3416
(Continued)

OTHER PUBLICATIONS

Ruybal, K. et al., "Systems and Methods for Controlling an Engine Start in a Hybrid Vehicle," U.S. Appl. No. 15/671,333, filed Aug. 8, 2017, 108 pages.
(Continued)

*Primary Examiner* — Roger L Pang
(74) *Attorney, Agent, or Firm* — Kelley David; McCoy Russell LLP

(57) ABSTRACT

Methods and systems are provided for launching a vehicle in an electric-only mode of operation. In one example, a driveline operating method comprises engaging a parking pawl to an output shaft of a dual clutch transmission in response to a request to engage a vehicle into a parked state, and disengaging the parking pawl via rotating an engine via an integrated starter/generator in response to a request to propel the vehicle solely via power of an electric machine positioned downstream of the dual clutch transmission. In this way, the vehicle may be launched in the electric-only mode without activating the engine in a fueled mode of operation and then deactivating the engine, which may increase vehicle operator satisfaction and which may improve fuel economy.

20 Claims, 24 Drawing Sheets

(51) Int. Cl.
| | |
|---|---|
| B60W 20/40 | (2016.01) |
| B60W 30/18 | (2012.01) |
| F16H 61/46 | (2010.01) |
| F16H 61/47 | (2010.01) |
| B60W 20/15 | (2016.01) |
| B60W 10/02 | (2006.01) |
| B60W 10/08 | (2006.01) |
| B60K 6/26 | (2007.10) |
| B60K 6/442 | (2007.10) |
| B60W 10/06 | (2006.01) |
| B60W 10/26 | (2006.01) |
| B60W 30/19 | (2012.01) |
| F16H 61/688 | (2006.01) |
| F16H 63/34 | (2006.01) |
| F16H 63/48 | (2006.01) |
| B60W 20/00 | (2016.01) |
| F16H 61/00 | (2006.01) |
| B60K 6/387 | (2007.10) |
| F16D 48/06 | (2006.01) |
| B60W 10/188 | (2012.01) |
| F16H 61/12 | (2010.01) |

(52) U.S. Cl.
CPC ............... *B60K 6/48* (2013.01); *B60W 10/02* (2013.01); *B60W 10/06* (2013.01); *B60W 10/08* (2013.01); *B60W 10/188* (2013.01); *B60W 10/26* (2013.01); *B60W 20/00* (2013.01); *B60W 20/15* (2016.01); *B60W 20/40* (2013.01); *B60W 30/18027* (2013.01); *B60W 30/18054* (2013.01); *B60W 30/18109* (2013.01); *B60W 30/19* (2013.01); *F16D 48/062* (2013.01); *F16H 61/0059* (2013.01); *F16H 61/46* (2013.01); *F16H 61/47* (2013.01); *F16H 61/688* (2013.01); *F16H 63/3433* (2013.01); *F16H 63/48* (2013.01); *B60K 2006/262* (2013.01); *B60L 2240/421* (2013.01); *B60L 2240/423* (2013.01); *B60W 2510/0225* (2013.01); *B60W 2510/0638* (2013.01); *B60W 2510/083* (2013.01); *B60W 2510/104* (2013.01); *B60W 2510/1005* (2013.01); *B60W 2510/1015* (2013.01); *B60W 2510/1095* (2013.01); *B60W 2510/188* (2013.01); *B60W 2520/10* (2013.01); *B60W 2540/10* (2013.01); *B60W 2550/142* (2013.01); *B60W 2710/021* (2013.01); *B60W 2710/027* (2013.01); *B60W 2710/0616* (2013.01); *B60W 2710/0644* (2013.01); *B60W 2710/0666* (2013.01); *B60W 2710/08* (2013.01); *B60W 2710/083* (2013.01); *B60W 2710/1005* (2013.01); *B60W 2710/1011* (2013.01); *B60W 2710/1016* (2013.01); *B60W 2710/1022* (2013.01); *B60W 2710/188* (2013.01); *B60Y 2200/92* (2013.01); *B60Y 2300/182* (2013.01); *B60Y 2400/42* (2013.01); *B60Y 2400/428* (2013.01); *F16H 2061/124* (2013.01); *Y10S 903/914* (2013.01); *Y10S 903/93* (2013.01); *Y10T 477/837* (2015.01); *Y10T 477/839* (2015.01); *Y10T 477/865* (2015.01)

(58) Field of Classification Search
CPC . F16H 63/3433; B60W 10/113; B60W 20/40; B60W 30/18109; B60W 30/18054; B60W 10/06; B60W 2510/188; B60W 2710/08; B60W 2710/0616; B60W 2710/188
See application file for complete search history.

(56) References Cited

U.S. PATENT DOCUMENTS

| | | | |
|---|---|---|---|
| 9,415,761 B2 | 8/2016 | Gibson et al. | |
| 9,452,748 B2 | 9/2016 | Gibson et al. | |
| 9,643,608 B2* | 5/2017 | Kasuya | B60K 6/48 |
| 2008/0086255 A1* | 4/2008 | Oshima | B60K 6/445 701/101 |
| 2018/0118184 A1* | 5/2018 | Ruybal | B60W 20/00 |
| 2018/0215383 A1* | 8/2018 | Badger | B60K 6/24 |

OTHER PUBLICATIONS

Ruybal, K. et al., "Systems and Methods for Controlling an Engine Start in a Hybrid Vehicle," U.S. Appl. No. 15/671,386, filed Aug. 8, 2017, 103 pages.

Ruybal, K. et al., "Methods and Systems for a Hybrid Vehicle," U.S. Appl. No. 15/794,544, filed Oct. 26, 2017, 90 pages.

Miller, K. et al., "Methods and Systems for Operating a Driveline of a Hybrid Engine Powertrain," U.S. Appl. No. 15/794,598, filed Oct. 26, 2017, 90 pages.

Ruybal, K. et al., "Methods and Systems for Operating a Driveline of a Hybrid Vehicle Powertrain," U.S. Appl. No. 15/794,669, filed Oct. 26, 2017, 89 pages.

Frait, S., "Methods and Systems for Engaging and Disengaging a Vehicle Park State," U.S. Appl. No. 15/794,770, filed Oct. 26, 2017, 86 pages.

Doering, J. et al., "Methods and Systems for Adapting Clutches of a Vehicle Transmission," U.S. Appl. No. 15/794,845, filed Oct. 26, 2017, 89 pages.

* cited by examiner

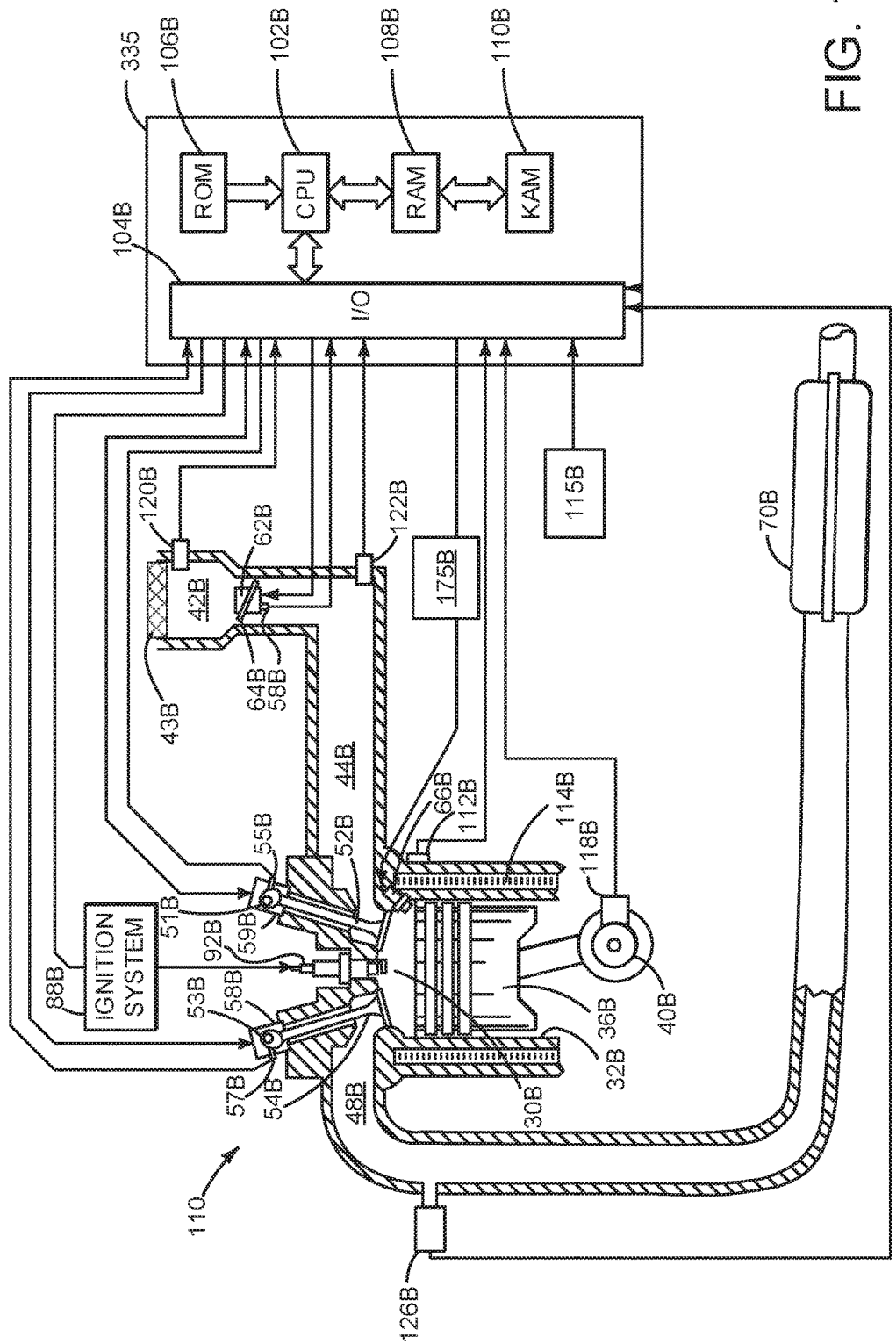

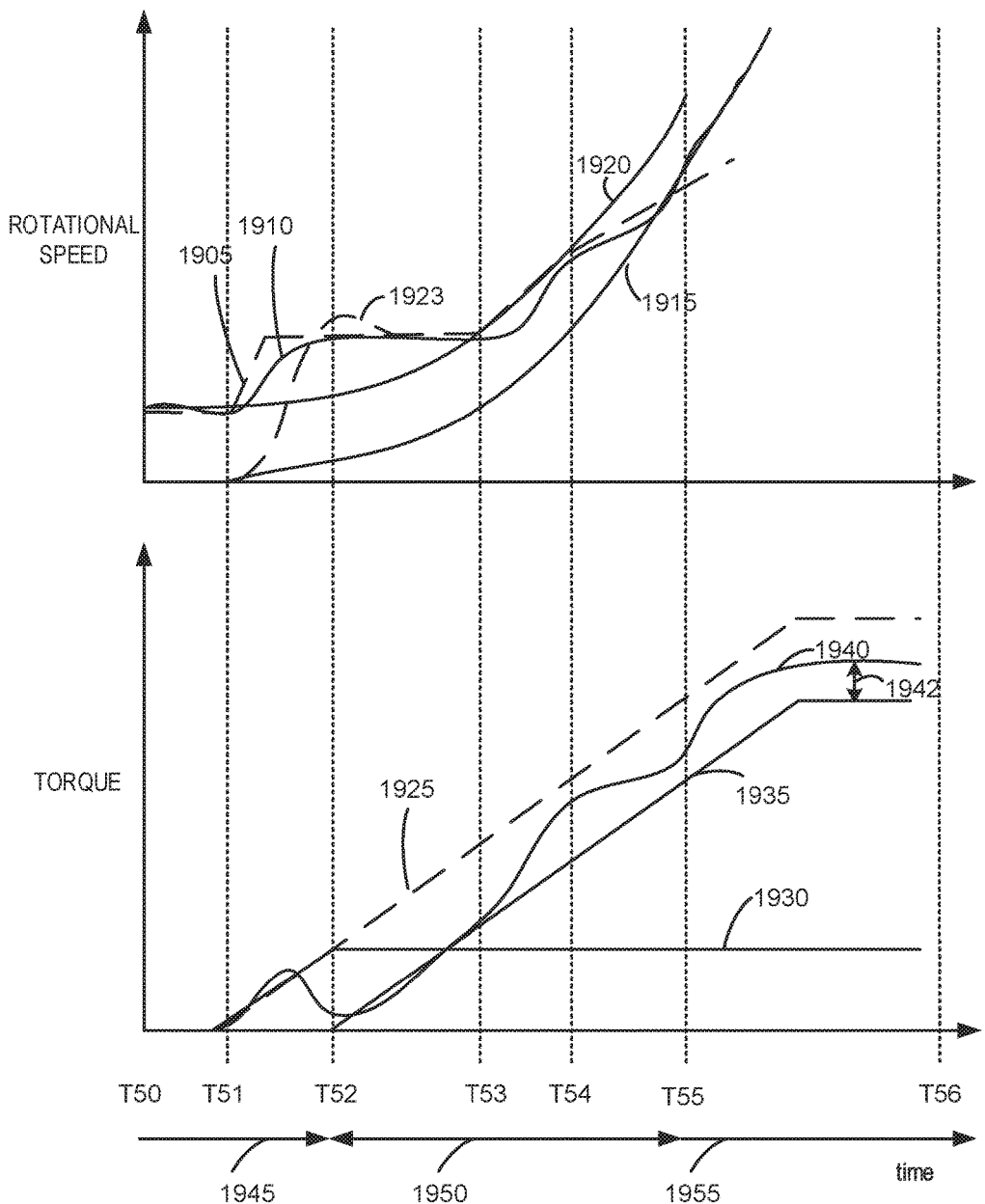

METHODS AND SYSTEMS FOR ENGINE-OFF DISENGAGEMENT OF A VEHICLE PARK STATE

CROSS REFERENCE TO RELATED APPLICATION

The present application claims priority to U.S. Provisional Patent Application No. 62/415,392 entitled "Methods and System for a Hybrid Vehicle," filed on Oct. 31, 2016. The entire contents of the above-referenced application are hereby incorporated by reference in their entirety for all purposes.

FIELD

The present description relates generally to methods and systems for controlling a driveline of a hybrid vehicle. The methods and systems may be particularly useful for hybrid vehicles that include a dual clutch transmission.

BACKGROUND/SUMMARY

A hybrid vehicle may be propelled by an engine and/or an electric machine. In such a vehicle, there can be powertrain modes that enable the vehicle to be propelled using only the electric machine with the transmission input clutch(es) open, allowing the engine to be stationary. Such vehicles may in some examples include a park-pawl, comprising a device fitted to the vehicle's transmission in order to lock up the transmission. Specifically, the parking pawl locks the transmission's output shaft by engaging a pawl or pin that engages a notched wheel on the output shaft, thus stopping it and the driven wheels from rotating. To disengage the parking pawl typically requires engine operation. However, for a hybrid vehicle that offers functions such as silent drive away using an electric-only mode of operation, it may not be desirable to start the engine to release park, and then turn the engine off again. Such actions may be inefficient, and may be counterintuitive to the vehicle operator.

The inventors have recognized the above-mentioned issues, and have developed systems and methods to at least partially address them. In one example, a method comprises engaging a parking pawl to an output shaft of a dual clutch transmission in response to a request to enter a vehicle into a parked state; and disengaging the parking pawl via rotating an engine via an integrated starter/generator in response to a request to propel the vehicle solely via power of an electric machine positioned downstream of the dual clutch transmission.

In one example, such a method includes ceasing engine rotation in response to an indication that the parking pawl is released. In this way, a hybrid vehicle may be enabled to launch the vehicle in an electric-only mode of operation, without undesirably activating the engine in a fueled mode of operation, and then deactivating the engine. By avoiding fueled engine operation to release the parking pawl, fuel efficiency may be increased, undesired emissions may be reduced, and customer satisfaction may be improved.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1B is a sketch of an engine of the hybrid vehicle driveline;

FIGS. 19A and 19B are simulated engine starting sequences.

DETAILED DESCRIPTION

Figure 9:
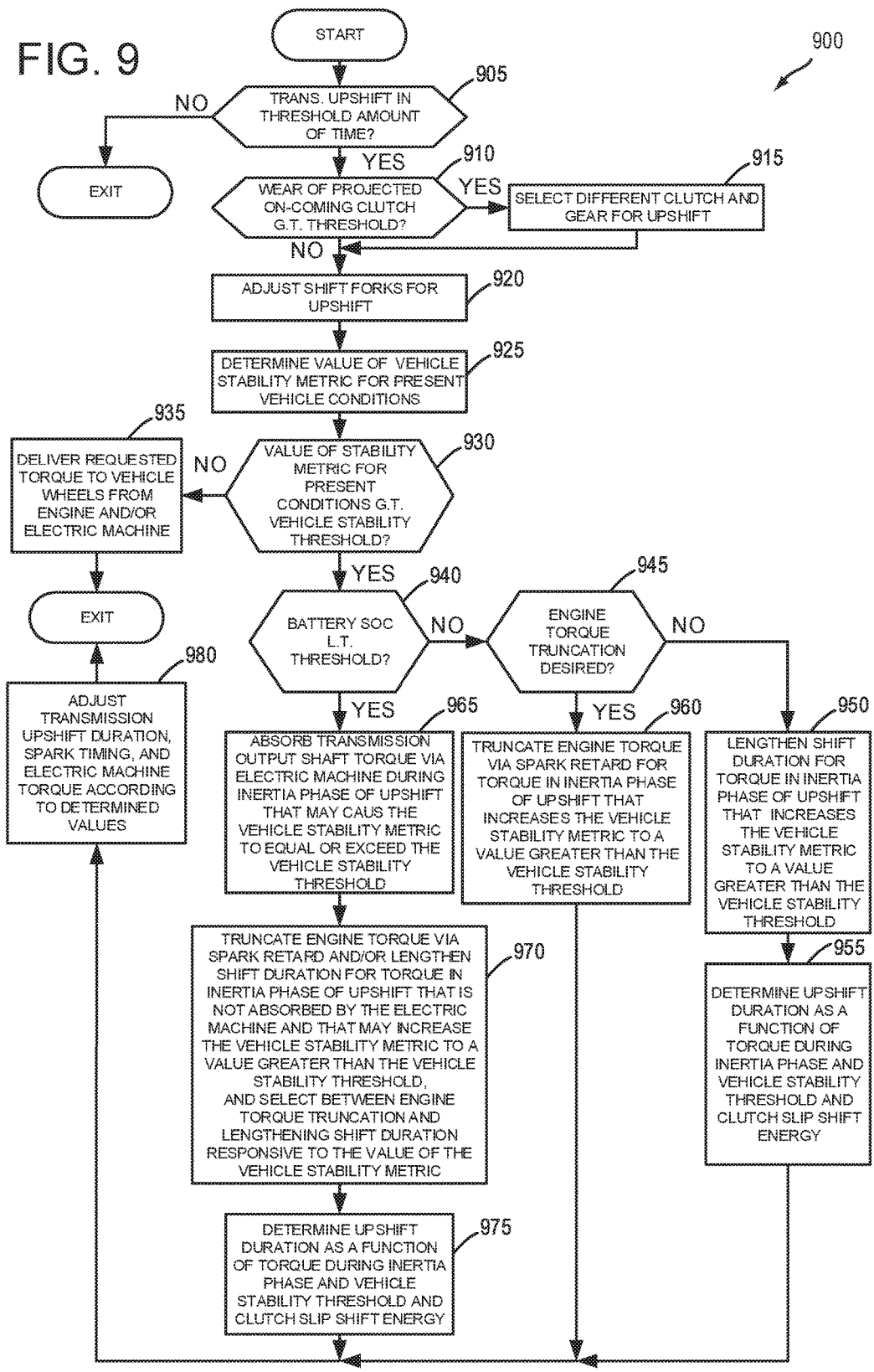
FIG. 9 is a flowchart of a method to control a hybrid driveline responsive to vehicle stability.
Figure 10:
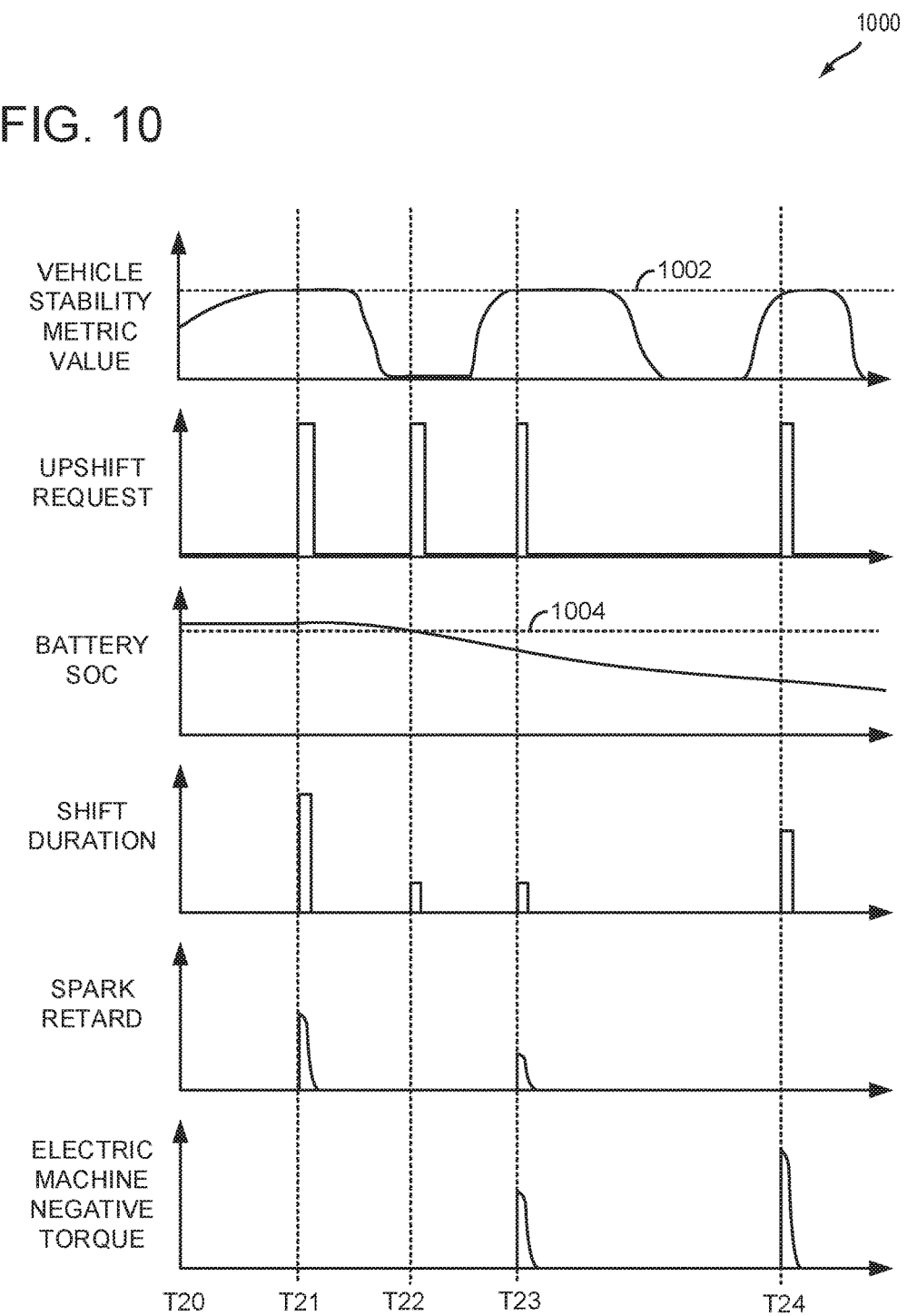
FIG. 10 is a simulated sequence for operating a hybrid driveline responsive to vehicle stability.

The following description relates to systems and methods for operating a driveline of a hybrid vehicle. FIGS. 1A-4 show an example hybrid vehicle system that includes a driveline with a motor, an integrated starter/generator, a dual clutch transmission, and an electric machine that is positioned downstream of the dual clutch transmission. FIGS. 5-8 describe and show operation of ways to engage and disengage a park state in the dual clutch transmission. FIGS. 9 and 10 describe ways of controlling the hybrid vehicle driveline that may improve vehicle stability. Clutches of the dual clutch transmission may be adapted and used during shifting of the dual clutch transmission as described in FIGS.

11-17B. An engine of a hybrid vehicle may be started and engaged to other components of the hybrid vehicle driveline as described in FIGS. 18A-19B.

Figure 1A:
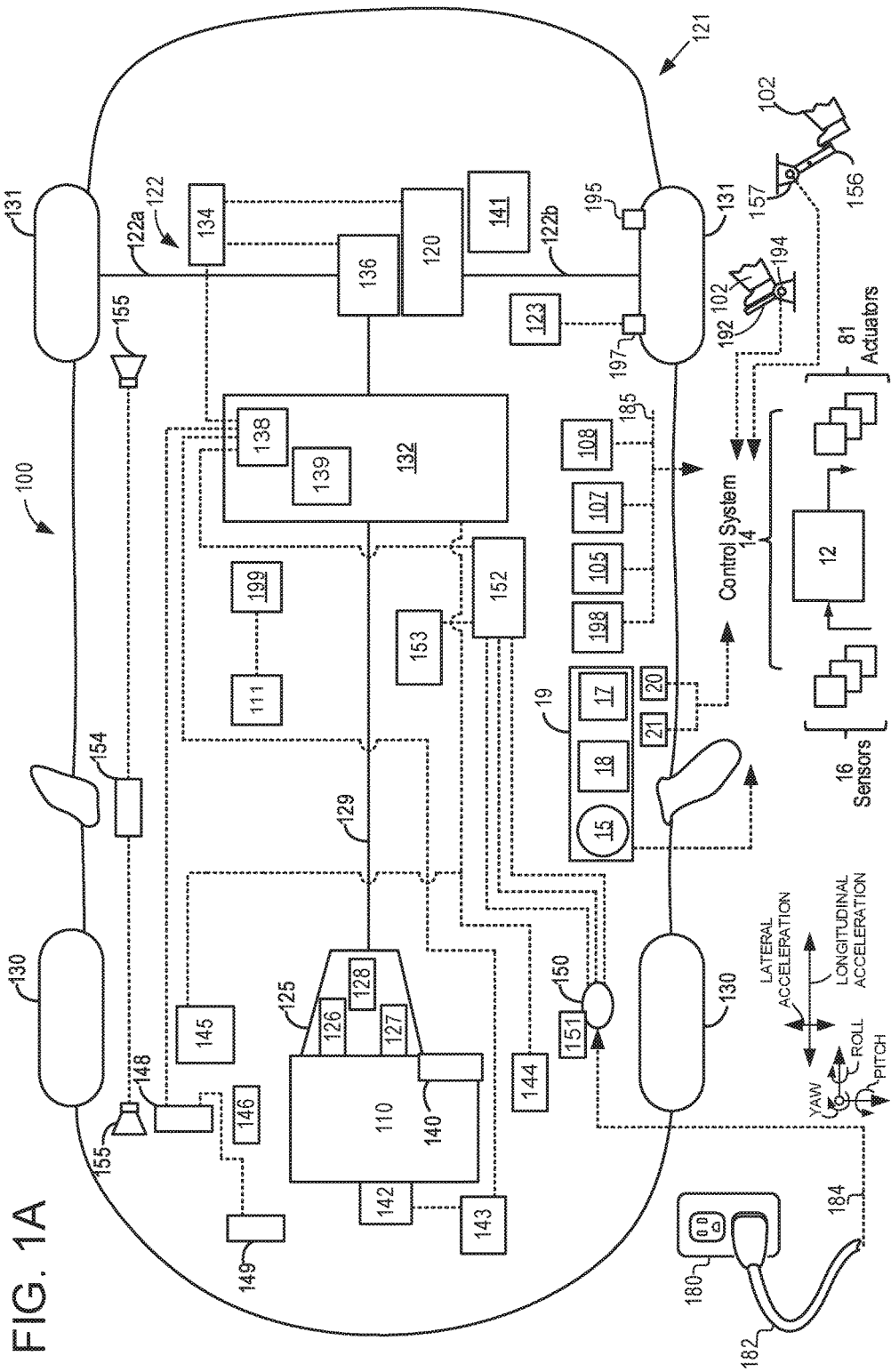
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122a, and second half shaft 122b. Vehicle propulsion system 100 further has front wheels 130 and rear wheels 131. The rear axle 122 is coupled to electric machine 120 and transmission 125, via which the rear axle 122 may be driven. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set and one or more clutches to decouple transmission 125 and electric machine 120 from wheels 131.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 3, transmission 125 may shift gears by selectively opening and closing first clutch 126 and second clutch 127.

Electric machine 120 may receive electrical power from onboard energy storage device 132. Furthermore, electric machine 120 may provide a generator function to convert engine output or the vehicle's kinetic energy into electrical energy, where the electrical energy may be stored at energy storage device 132 for later use by the electric machine 120 or integrated starter/generator 142. A first inverter system controller (ISC1) 134 may convert alternating current generated by electric machine 120 to direct current for storage at the energy storage device 132 and vice versa.

In some examples, energy storage device 132 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system or anti-skid braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIG. 1B, FIG. 3 and FIG. 4.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machine 120) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 10. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

Figure 2:
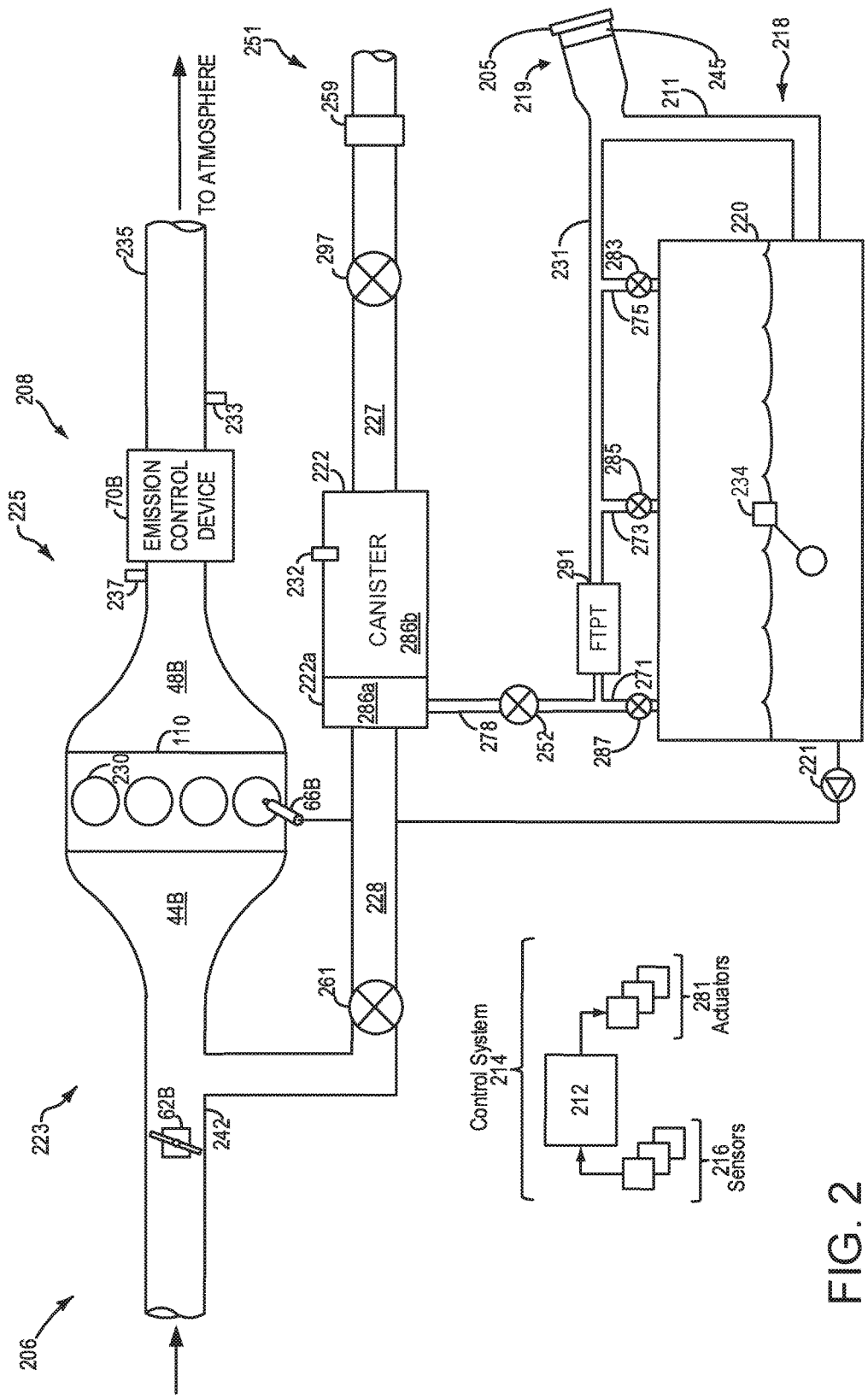
FIG. 2 is a schematic diagram of a fuel vapor management system for a hybrid vehicle.

FIG. 2 shows a schematic depiction of a vehicle system 206. It may be appreciated that vehicle system 206 may comprise vehicle propulsion system 100 depicted at FIG. 1A. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system, such as vehicle propulsion system 100 illustrated at FIG. 1A.

The engine system 208 may include an engine 110 having a plurality of cylinders 230. The engine 110 includes an engine air intake 223 and an engine exhaust 225. The engine air intake 223 includes a throttle 62B in fluidic communication with engine intake manifold 44B via an intake passage 42B. Further, engine air intake 223 may include an air box and filter (not shown) positioned upstream of throttle 62B. The engine exhaust system 225 includes an exhaust manifold 48B leading to an exhaust passage 235 that routes exhaust gas to the atmosphere. The engine exhaust system 225 may include one or more exhaust catalyst 70B, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 110, such as the example injector 66B shown. While only a single injector 66B is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation). In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank 220 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 220 to fuel vapor canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not combusting air and fuel), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 14, as discussed above with regard to FIG. 1A. Control system 214 is shown receiving information from a plurality of sensors 16 (various examples of which are described herein) and sending control signals to a plurality of actuators 81 (various examples of which are described herein. As one example, sensors 16 may include exhaust gas sensor 237 located upstream of the emission control device 70B, temperature sensor 233, pressure sensor 291, and canister temperature sensor 232. Other sensors such as pressure, temperature, air/fuel ratio, and composition sensors may be coupled to various locations in the vehicle system 206. As another example, the actuators may include throttle 62B, fuel tank isolation valve 252, canister purge valve 261, and canister vent valve 297. The control system 214 may include a controller 212. The controller may receive input data from the various sensors, process the input data, and trigger the actuators in response to the processed input data based on instruction or code programmed therein corresponding to one or more routines.

Figure 3:
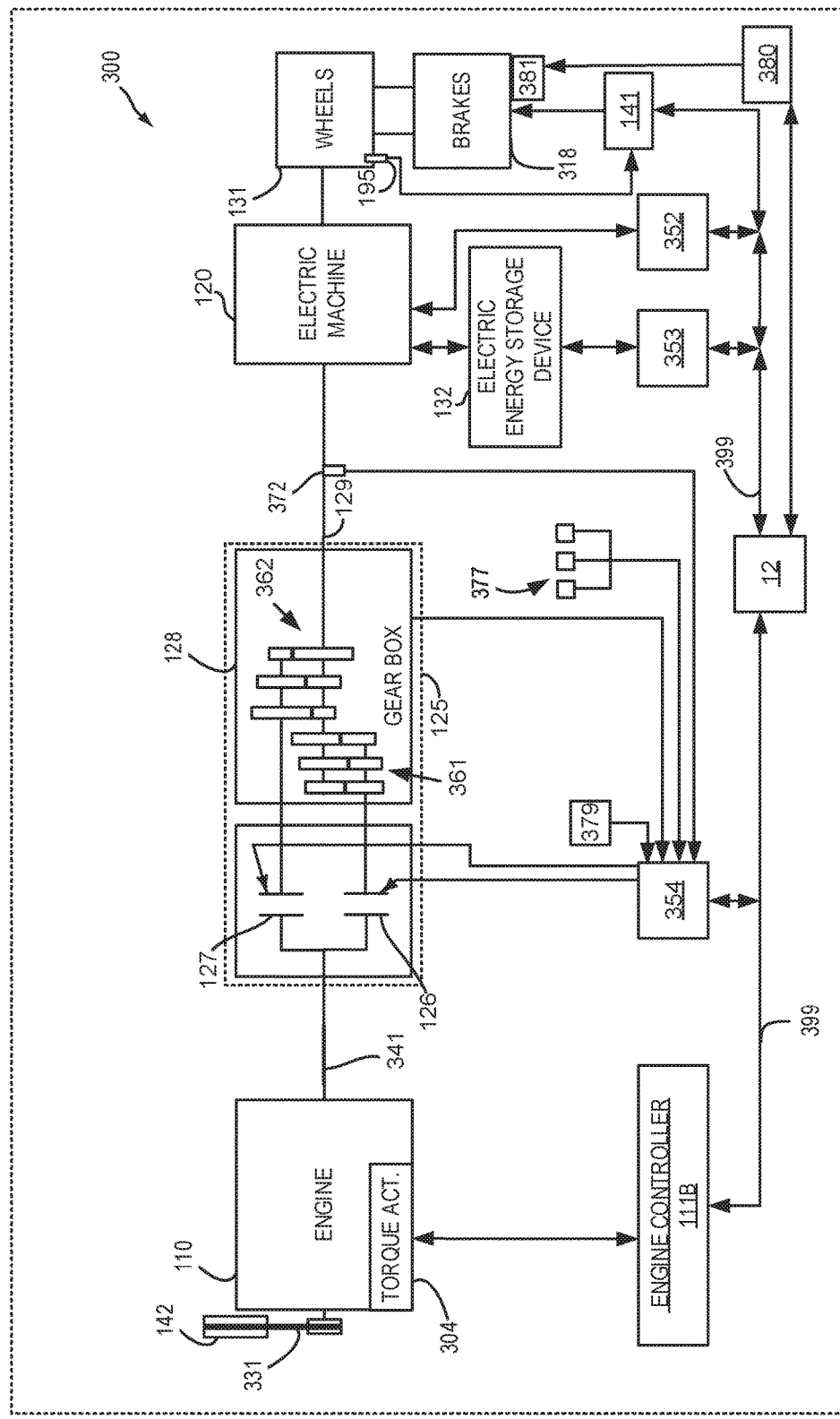
FIG. 3 is a schematic diagram of the hybrid vehicle driveline including controllers of various driveline components.

FIG. 3 is a block diagram of vehicle 121 including a powertrain or driveline 300. The powertrain of FIG. 3 includes engine 110 shown in FIG. 1A-1B. Other components of FIG. 3 that are common with FIG. 1A are indicated by like numerals, and will be discussed in detail below. Powertrain 300 is shown including vehicle system controller 12, engine controller 111B, electric machine controller 352, transmission controller 354, energy storage device controller 353, and brake controller 141 (also referred to herein as brake system control module). The controllers may communicate over controller area network (CAN) 399. Each of the controllers may provide information to other controllers such as torque output limits (e.g. torque output of the device or component being controlled not to be exceeded), toque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 352, transmission controller 354, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 352 and a second braking torque from brake controller 141, the first and second torques providing the desired braking torque at vehicle wheels 131.

In other examples, the partitioning of controlling powertrain devices may be partitioned differently than is illustrated in FIG. 3. For example, a single controller may take the place of vehicle system controller 12, engine controller 111B, electric machine controller 352, transmission controller 354, and brake controller 141. Alternatively, the vehicle system controller 12 and the engine controller 111B may be a single unit while the electric machine controller 352, the transmission controller 354, and the brake controller 141 may be standalone controllers.

In this example, powertrain 300 may be powered by engine 110 and electric machine 120. In other examples, engine 110 may be omitted. Engine 110 may be started with an engine starter (e.g. 140), via belt integrated starter/generator (BISG) 142, or via electric machine 120. In some examples, BISG may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 304, such as a fuel injector, throttle, etc.

BISG 142 is mechanically coupled to engine 110 via belt 331. BISG 142 may be coupled to a crankshaft (not shown) or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 300 includes engine 110 mechanically coupled to dual clutch transmission (DCT) 125 via crank shaft 341. DCT 125 includes a first clutch 126, a second clutch 127, and a gear box 128. DCT 125 outputs torque to shaft 129, to supply torque to vehicle wheels 131. Transmission controller 354 selectively opens and closes first clutch 126 and second clutch 127 to shift DCT 125.

Gear box 128 may include a plurality of gears. One clutch, for example first clutch 126 may control odd gears 361 (e.g. first, third, fifth, and reverse), while another clutch, for example second clutch 127, may control even gears 362 (e.g. second, fourth, and sixth). By utilizing such an arrangement, gears can be changed without interrupting power flow from the engine 110 to dual clutch transmission 125.

Electric machine 120 may be operated to provide torque to powertrain 300 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 300, or is directly driven by powertrain 300.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 300 via operating as a motor or generator as instructed by electric machine controller 352.

Further, a frictional force may be applied to wheels 131 by engaging friction wheel brakes 318. In one example, friction wheel brakes 318 may be engaged in response to the driver pressing his foot on a brake pedal (e.g. 192) and/or in response to instructions within brake controller 141. Further, brake controller 141 may apply brakes 318 in response to information and/or requests made by vehicle system controller 12. In the same way, a frictional force may be reduced to wheels 131 by disengaging wheel brakes 318 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 380. The suspension (e.g. 111) of vehicle 121 may be adjusted to critically damp, over damp, or under damp the vehicle suspension via variable dampeners 381.

Accordingly, torque control of the various powertrain components may be supervised by vehicle system controller 12 with local torque control for the engine 110, transmission 125, electric machine 120, and brakes 318 provided via engine controller 111B, electric machine controller 352, transmission controller 354, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 352 may control torque output and electrical energy production from electric machine 120 by adjusting current flowing to and from field and/or armature windings of electric machine 120 as is known in the art.

Transmission controller 354 may receive transmission output shaft torque from torque sensor 372. Alternatively, sensor 372 may be a position sensor or torque and position sensors. If sensor 372 is a position sensor, transmission controller 354 may count shaft position pulses over a predetermined time interval to determine transmission output shaft velocity. Transmission controller 354 may also differentiate transmission output shaft velocity to determine transmission output shaft acceleration. Transmission controller 354, engine controller 111B, and vehicle system controller 12, may also receive additional transmission information from sensors 377, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 379, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 399. Brake controller 250 may provide braking responsive to a wheel torque command from vehicle system controller 255. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 300, engine 110 is positioned in driveline 300 upstream if transmission 125. Transmission 125 is positioned upstream of electric machine 120, and BISG 142 may be positioned upstream of engine 110, or downstream of engine 110 and upstream of transmission 125. Electric machine 120 is positioned downstream of engine 110 and transmission 125.

Figure 4:
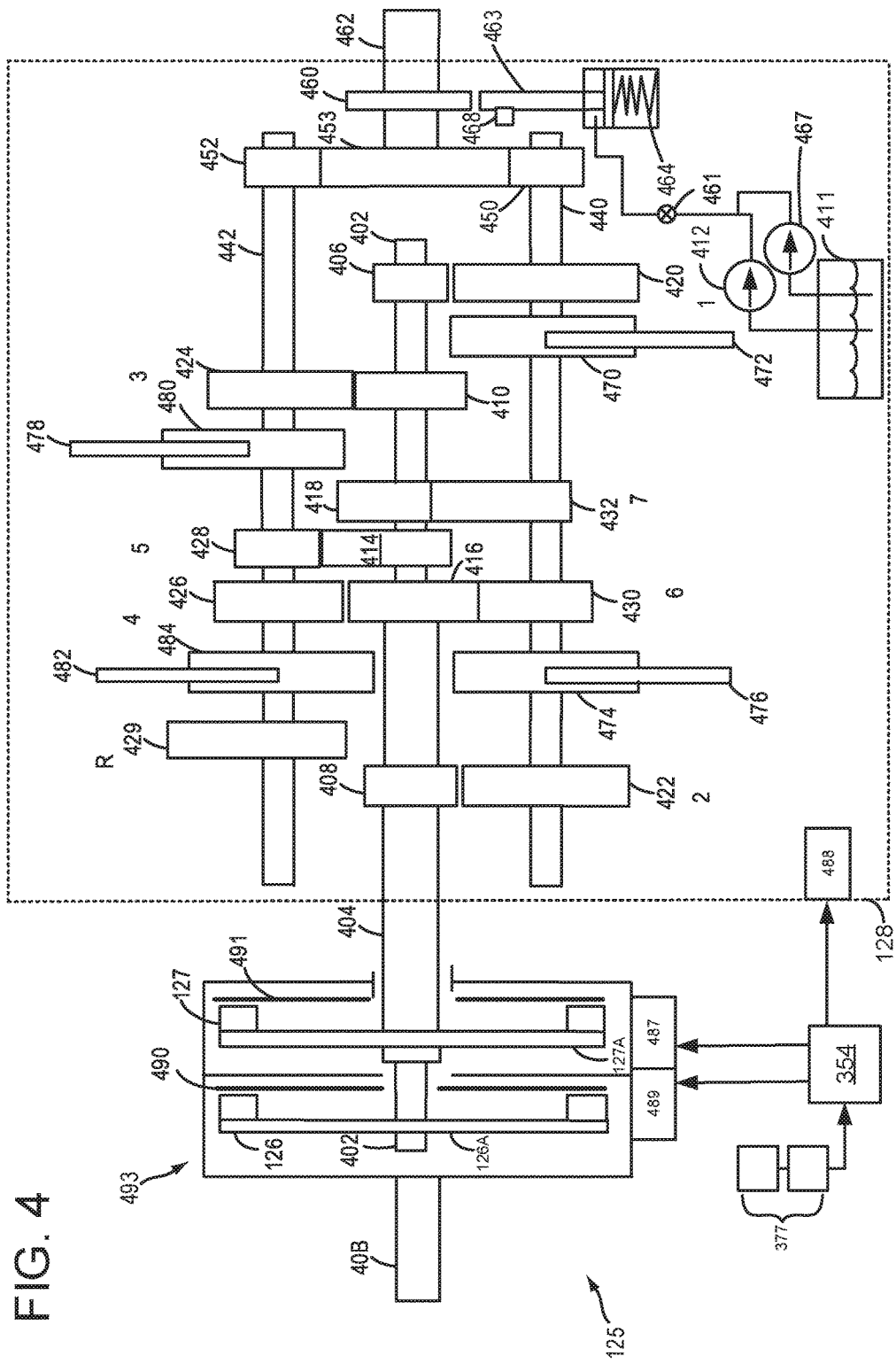
FIG. 4 is a schematic diagram of a dual clutch transmission located in the hybrid vehicle driveline.

FIG. 4 shows a detailed illustration of a dual clutch transmission (DCT) 125. Engine crankshaft 40B is illustrated as coupling to a clutch housing 493. Alternatively, a shaft may couple crankshaft 40B to clutch housing 493. Clutch housing 493 may spin in accordance with rotation of crankshaft 40B. Clutch housing 493 may include a first clutch 126 and a second clutch 127. Furthermore, each of first clutch 126 and second clutch 127 have an associated first clutch plate 490, and a second clutch plate 491, respectively. In some examples, the clutches may comprise wet clutches, bathed in oil (for cooling), or dry plate clutches. Engine torque may be transferred from clutch housing 493 to either first clutch 126 or second clutch 127. First transmission clutch 126 transfers torque between engine 110 (shown in FIG. 1A) and first transmission input shaft 402. As such, clutch housing 493 may be referred to as an input side of first transmission clutch 126 and 126A may be referred to as an output side of first transmission clutch 126. Second transmission clutch 127 transfers torque between engine 110 (shown in FIG. 1A) and second transmission input shaft 404. As such, clutch housing 493 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 402, and second transmission input shaft 404. Second transmission input shaft 404 is hollow, while first transmission input shaft 402 is solid, and sits coaxially within the second transmission input shaft 404. As an example, first transmission input shaft 402 may have a plurality of fixed gears. For example, first transmission input shaft 402 may include first fixed gear 406 for receiving first gear 420, third fixed gear 410 for receiving third gear 424, fifth fixed gear 414 for receiving fifth gear 428, and seventh fixed gear 418 for receiving seventh gear 432. In other words, first transmission input shaft 402 may be selectively coupled to a plurality of odd gears. Second transmission input shaft 404 may include second fixed gear 408 for receiving second gear 422, or a reverse gear 429, and may further include fourth fixed gear 416, for receiving either fourth gear 426 or sixth gear 430. It may be understood that both first transmission input shaft 402 and second transmission input shaft 404 may be connected to each of first clutch 126 and second clutch 127 via spines (not shown) on the outside of each shaft, respectively. In a normal resting state, each of first clutch 402 and second clutch 404 are held open, for example via springs (not shown), etc., such that no torque from engine (e.g. 110) may be transmitted to first transmission input shaft 402 or second transmission input shaft 404 when each of the respective clutches are in an open state. Responsive to closing first clutch 126, engine torque may be transmitted to first transmission input shaft 402, and responsive to closing second clutch 127, engine torque may be transmitted to second transmission input shaft 404. During normal operation, transmission electronics may ensure that only one clutch is closed at any given time.

Gear box 128 may further include a first layshaft shaft 440, and second layshaft shaft 442. Gears on first layshaft shaft 440 and second layshaft shaft 442 are not fixed, but may freely rotate. In example DCT 125, first layshaft shaft 440 includes first gear 420, second gear 422, sixth gear 430, and seventh gear 432. Second layshaft shaft 442 includes third gear 424, fourth gear 426, fifth gear 428, and reverse gear 429. Both first layshaft shaft 440 and second layshaft shaft 442 may transfer torque via a first output pinion 450, and a second output pinion 452, respectively, to gear 453. In this way, both layshafts may transfer torque via each of first output pinion 450 and second output pinion 452, to output shaft 462, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 420, second gear 422, third gear 424, fourth gear 426, fifth gear 428, sixth gear 430, seventh gear 432, and reverse gear 429 are not fixed to layshafts (e.g. 440 and 442), but instead may freely rotate. As such, synchronizers may be utilized to enable each of the gears to match the speed of the layshafts, and may further be utilized to lock the gears. In example DCT 125, four synchronizers are illustrated, for example, first synchronizer 470, second synchronizer 474, third synchronizer 480, and fourth synchronizer 482. First synchronizer 470 includes corresponding first selector fork 472, second synchronizer 474 includes corresponding selector fork 476, third synchronizer 480 includes corresponding third selector fork 478, and fourth synchronizer 484 includes corresponding fourth selector fork 482. Each of the selector forks may enable movement of each corresponding synchronizer to lock one or more gears, or to unlock one or more gears. For example, first synchronizer 440 may be utilized to lock either first gear 420 or seventh gear 432. Second synchronizer 474 may be utilized to lock either second gear 422 or sixth gear 430. Third synchronizer 480 may be utilized to lock either third gear 424 or fifth gear 428. Fourth synchronizer 484 may be utilized to lock either fifth gear 426, or reverse gear 429. In each case, movement of the synchronizers may be accomplished via the selector forks (e.g. 472, 476, 478, and 482) moving each of the respective synchronizers to the desired position.

Movement of synchronizers via selector forks may be carried out via transmission control module (TCM) 354 and shift fork actuators 488, where TCM 354 may comprise TCM 354 discussed above with regard to FIG. 3. TCM 354 may collect input signals from various sensors, assess the input, and control various actuators accordingly. Inputs utilized by TCM 354 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 402 and second transmission input shaft 404), vehicle attitude (tilt). The TCM may control actuators via an open-loop control, to allow for adaptive control. For example, adaptive control may enable TCM 354 to identify and adapt to clutch engagement points, clutch friction coefficients, and position of synchronizer assemblies. TCM 354 may also adjust first clutch actuator 489 and second clutch actuator 487 to open and close first clutch 126 and second clutch 127.

As such TCM 354 is illustrated as receiving input from various sensors 377. As discussed above with regard to FIG. 3, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 377 may further include wheel speed sensors (e.g. 195), engine speed sensors, engine torque sensors, throttle position sensors, engine temperature sensors, steering angle sensors, and inertial sensors (e.g. 199). Inertial sensors may comprise one or more of the following: longitudinal, latitudinal, vertical, yaw, roll, and pitch sensors, as discussed above with regard to FIG. 1A.

Sensors 377 may further include an input shaft speed (ISS) sensor, which may include a magneto-resistive sensor, and where one ISS sensor may be included for each gear box input shaft (e.g. one for first transmission input shaft 402 and one for second transmission input shaft 404). Sensors 377 may further include an output shaft speed sensor (OSS), which may include a magneto-resistive sensor, and may be attached to output shaft 462. Sensors 377 may further include a transmission range (TR) sensor, which may be utilized by the TCM to detect position of selector forks (e.g. 472, 476, 478, 482).

DCT 125 may be understood to function as described herein. For example, when first clutch 126 is actuated closed, engine torque may be supplied to first transmission input shaft 402. When first clutch 126 is closed, it may be understood that second clutch 127 is open, and vice versa. Depending on which gear is locked when first clutch 126 is closed, power may be transmitted via the first transmission input shaft 402 to either first layshaft 440 or second layshaft 442, and may be further transmitted to output shaft 462 via either first pinion gear 450 or second pinion gear 452. Alternatively, when second clutch 127 is closed, power may be transmitted via the second transmission input shaft 404 to either first layshaft 440 or second layshaft 442, depending on which gear is locked, and may be further transmitted to output shaft 462 via either first pinion gear 450 or second pinion gear 452. It may be understood that when torque is being transferred to one layshaft (e.g. first layshaft 440), the other layshaft (e.g. second layshaft 442) may continue to rotate even though only the one shaft is driven directly by the input. More specifically, the non-engaged shaft (e.g. second layshaft 442) may continue to rotate as it is driven indirectly by the output shaft 462 and respective pinion gear (e.g. 452).

DCT 125 may enable preselection of gears, which may thus enable rapid switching between gears with minimal loss of torque during shifting. As an example, when first gear 420 is locked via first synchronizer 440, and wherein first clutch 126 is closed (and second clutch 127 is open), power may be transmitted from the engine to first input shaft 402, and to first layshaft 440. While first gear 420 is engaged, second gear 422 may simultaneously be locked via second synchronizer 474. Because second gear 422 is locked, this may rotate second input shaft 404, where the second input shaft 404 is speed matched to the vehicle speed in second gear. In an alternative case where a gear is pre-selected on the other layshaft (e.g. second layshaft 442), that layshaft will also rotate as it is driven by output shaft 462 and pinion 452.

When a gear shift is initiated by TCM 354, only the clutches need to be actuated to open first clutch 126 and close second clutch 127. Furthermore, outside the TCM, engine speed may be lowered to match the upshift. With the second clutch 127 closed, power may be transmitted from the engine, to second input shaft 404, and to first layshaft 440, and may be further transmitted to output shaft 462 via pinion 450. Subsequent to the shifting of gears being completed, TCM 354 may pre-select the next gear appropriately. For example, TCM 354 may pre-select either a higher or a lower gear, based on input it receives from various sensors 377. In this way, gear changes may be achieved rapidly with minimal loss of engine torque provided to the output shaft 462.

Dual clutch transmission 400 may in some examples include a parking gear 460. A parking pawl 463 may face parking gear 460. When a shift lever is set to park, park pawl 463 may engage parking gear 460. Engagement of parking pawl 463 with parking gear 460 may be accomplished via a parking pawl spring 464, or may be achieved via a cable (not shown), a hydraulic piston (not shown) or a motor (not shown), for example. When parking pawl 463 is engaged with parking gear 460, driving wheels (e.g. 130, 131) of a vehicle may be locked. On the other hand, responsive to the shift lever being moved from park, to another selection (e.g. drive), parking pawl 463 may move such that parking pawl 463 may be disengaged from parking gear 460.

In some examples, an electric transmission pump 412 may supply hydraulic fluid from transmission sump 411 to compress spring 464, in order to release parking pawl 463 from parking gear 460. Electric transmission pump 412 may be powered by an onboard energy storage device (e.g. 132), for example. In some examples, a mechanical pump 467 may additionally or alternatively supply hydraulic fluid from transmission sump 411 to compress spring 464 to release parking pawl 463 from parking gear 460. While not explicitly illustrated, mechanical pump may be driven by the engine (e.g. 110), and may be mechanically coupled to clutch housing 493. A park pawl valve 461 may regulate the flow of hydraulic fluid to spring 464, in some examples.

The system of FIGS. 1A-4 provides for a system, comprising: an engine; a dual clutch transmission coupled to the engine, the dual clutch transmission not including a parking pawl; an electric machine coupled to dual clutch transmission; and a controller including executable instructions stored in non-transitory memory to request rotation of an electric machine in response to an indication that a first gear or a second gear is not engaged after the dual clutch transmission has been commanded to a park state. In a first example of the system, the system further includes where an output shaft of the transmission is held from rotating when the dual clutch transmission is in the park state. A second example of the system optionally includes the first example, and further comprises synchronizers for the first and second gears. A third example of the system optionally includes any one or more or each of the first and second examples, and further comprises sensors to determine operating states of the synchronizers. A fourth example of the system optionally includes any one or more or each of the first through third examples, and further comprises additional instructions to establish whether or not the first gear and the second gear are engaged in response to output of the sensors.

The system of FIGS. 1A-4 also provides for a system, comprising: an engine; a dual clutch transmission coupled to the engine, the dual clutch transmission including a parking pawl and a hydraulic pump in fluidic communication with the parking pawl; an electric machine coupled to dual clutch transmission; and a controller including executable instructions stored in non-transitory memory to disengage the parking pawl via supplying hydraulic fluid to the parking pawl via the hydraulic pump in response to a request to propel a vehicle via power supplied solely from the electric machine. In a first example, the system further includes where the hydraulic pump is electrically driven via an electric motor, the electric motor not coupled to the engine. A second example of the system optionally includes the first example, and further comprises additional instructions to rotate the hydraulic pump via the electric motor in response to the request to propel the vehicle via power supplied solely from the electric machine, and where the electric machine is not the electric motor. A third example of the system optionally includes any one or more or each of the first and second examples, and further comprises additional instructions to rotate the hydraulic pump via the engine without starting the engine. A fourth example of the system optionally includes any one or more or each of the first through third examples and further includes where the parking pawl includes a spring for engaging the parking pawl.

Figure 5:
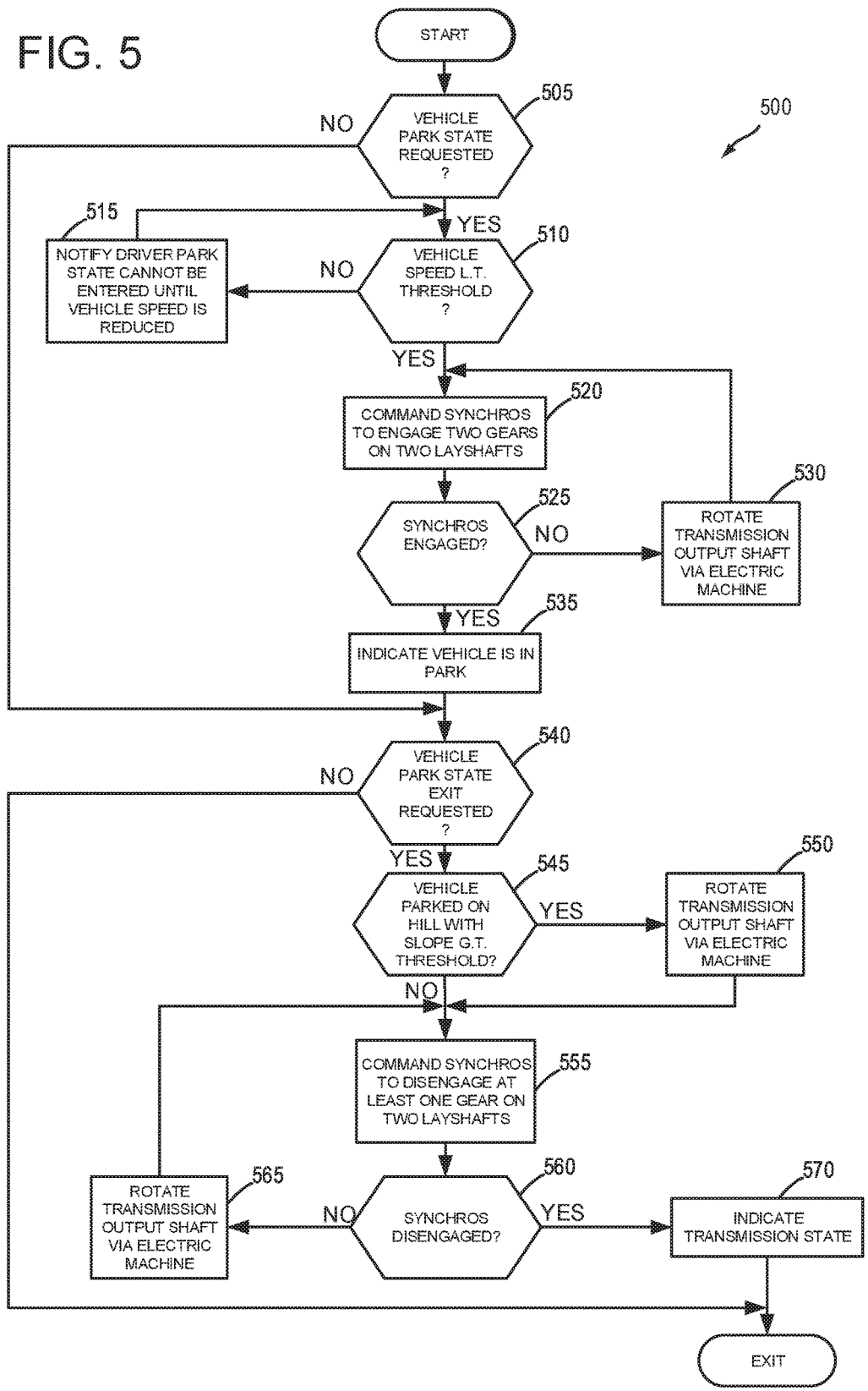
FIG. 5 is a flowchart of a method for engaging a dual clutch transmission in a park state.

Turning to FIG. 5 a high level flowchart for an example method 500 for entering into an exiting a vehicle transmission park state, is shown. More specifically, method 500 may include engaging a first gear and engaging a second gear of a dual clutch transmission in response to a request to enter a vehicle park state where an output of a transmission is held from rotating, and where the first gear is coupled to a first layshaft, the second gear coupled to a second layshaft. In some examples, method 500 may include selecting the first gear and the second gear responsive to vehicle grade.

Method 500 will be described with reference to the systems described herein and shown in FIGS. 1A-4, though it should be understood that similar methods may be applied to other systems without departing from the scope of this disclosure. Method 500 may be carried out by a controller, such as controller 354 in FIG. 3, and may be stored at the controller as executable instructions in non-transitory memory. Instructions for carrying out method 500 and the rest of the methods included herein may be executed by the various controllers described herein based on instructions stored on a memory of the respective controllers and in conjunction with signals received from sensors of the engine system, such as the sensors described above with reference to FIGS. 1A-4. The controller 354 may communicate with other controllers described herein to employ driveline actuators such as electric machine (e.g. 120), selector forks (e.g. 472, 476, 478, 482), etc., according to the methods depicted below.

Method 500 begins at 505 and may include indicating whether a vehicle park state is requested. For example, a vehicle park state may be requested by a vehicle operator attempting to engage a shift lever to a park selection. If, at 505, a vehicle park state is indicated to be requested, method 500 may proceed to 510, and may include indicating whether vehicle speed is less than (L.T.) a threshold speed. In some examples, the threshold speed may comprise a vehicle speed of 2.5 mph. Vehicle speed may be indicated via wheel speed sensors (e.g. 195), for example. If, at 510, vehicle speed is indicated to be above the threshold speed, method 500 may proceed to 515. At 515, method 500 may include informing the vehicle operator (also referred to herein as a driver), that the vehicle park state may not be entered until vehicle speed is reduced. Such an indication may be communicated to the driver via one or more of an audible indication, an indication on a display system on a vehicle dash, etc. Method 500 returns to 510 after providing the indication to the operator. Thus, method 500 may include not engaging the first and second gears unless vehicle speed is less than a threshold speed.

Responsive to an indication that vehicle speed is below the vehicle speed threshold at 510, method 500 may proceed to 520. At 520, method 500 may include commanding gear synchronizers (e.g., 470 of FIG. 4) to engage two gears (e.g. the first gear and the second gear), on the two layshafts (e.g. 440 and 442). Simultaneously commanding synchronizers to engage two gears at 520 may include the controller selecting which of the synchros or synchronizers to utilize to engage the first gear and the second gear). For example, the controller may receive information about vehicle grade via an accelerometer (e.g. 20), or inclinometer (e.g. 21), and an appropriate first gear and appropriate second gear may be indicated, where the appropriate first gear and appropriate second gear may be a function of road grade. With an appropriate first gear and second gear indicated, the controller may thus select which synchronizers to utilize to engage the selected first gear and second gear. It may be understood that in the description herein, first gear may refer to any gear positioned on the first layshaft, while second gear may refer to any gear positioned on the second layshaft. It may be further understood that any of one of the gears positioned on the first layshaft may be engaged, and any one of the gears positioned on the second layshaft may be engaged, where the determination of what gears to engage on the first layshaft and the second layshaft may be a function of road grade. As one example, based on an indicated road grade, first gear may comprise sixth gear (e.g. 430), and second gear may comprise fourth gear (e.g. 426) for a road with a first grade. During a condition of a different road grade a different first gear, such as first gear, and a second gear, such as third gear, may be engaged responsive to the different road grade (e.g., a second road grade). Further, during conditions of no gear degradation, first and second gears may be a first group of gears, and during conditions of gear degradation, first and second gears may be a second group of gears. Such examples are meant to be illustrative, and are not meant to be limiting. By selecting which gear to engage on the first layshaft and which gear to engage on the second layshaft as a function of road grade, wear on gears associated with the first and second layshafts may be reduced. It may be further understood that, responsive to selection of which gear on the first layshaft to engage, and which gear on the second layshaft to engage, the controller may command the appropriate selector fork to move the appropriate synchronizers to the selected first gear and second gear. In such a fashion, the controller may command appropriate synchronizers to engage two gears on the two layshafts at 520. Furthermore, at 525, method 500 may include opening a first clutch (e.g. 126) coupled to the first gear before the first gear is engaged, and opening a second clutch (e.g. 127) coupled to the second gear before the second gear is engaged. In this way, the layshafts may be decoupled from the engine crankshaft during gear engagement to avoid engine motion if the synchronizers do not fully engage the gears to be engaged.

Proceeding to 525, method 500 may include indicating whether the synchronizers are engaged. For example, position sensors (e.g. transmission range sensors 377) on each of the synchronizers may be utilized to indicate whether the synchronizers are engaged with the first gear and second gear. Responsive to an indication that one or both of the synchronizers are not engaged, method 500 may proceed to 530, and may include rotating a transmission output shaft (e.g. 462) via an electric machine (e.g. 120). More specifically, in attempting to engage the synchronizers, under some conditions synchro teeth may be aligned which may thus result in synchro blocking. Thus, at 530, the electric machine may be utilized to resolve the issue of synchro blocking, via applying a rotation to the transmission output shaft, thus resolving the blocked condition. Responsive to rotating the transmission output shaft via the electric machine, position sensors on the synchronizers may be utilized to indicate when the synchronizers are engage, as discussed above. Furthermore, at 530, rotation of the electric machine may comprise communicating a request to rotate the electric machine from a transmission controller (e.g. 354) to an electric machine controller (e.g. 352). The electric machine may be rotated in a forward or reverse direction.

Thus, it may be understood that method 500 may include commanding the first gear engaged and commanding the second gear engaged, in response to a request to enter a vehicle park state where the output shaft of the transmission is held from rotating, and may further include rotating the electric machine coupled to the output shaft of the transmission in response to an indication that the first gear or second gear is not engaged.

Responsive to an indication that the synchronizers are engaged at 525, method 500 may proceed to 535. At 535, method 500 may include indicating that the vehicle is in park. For example, an indication that the vehicle is in park may be communicated to the vehicle controller, and may be further communicated to the vehicle operator, for example via an audible indication, or via an indication on the display system on the vehicle dash.

Proceeding to 540, method 500 may include indicating whether a request to exit the vehicle park state is requested. As an example, a request to exit the vehicle park state may include the vehicle operator adjusting a shift selector to a position other than park. Responsive to an exit from the vehicle park state being requested, method 500 may proceed to 545, and may include indicating whether the vehicle is parked on a hill, or slope, greater than (G.T.) a slope threshold. The slope threshold may comprise a slope wherein a typical synchro and selector fork may not have the force desired to disengage the synchro from either or both of the first and second gears. As described above road grade may be indicated via an accelerometer or an inclinometer. Thus, at 545, if it is indicated that the vehicle is not parked on a slope greater than the slope threshold, method 500 may proceed to 555.

At 555, method 500 may include commanding the first gear or the second gear disengaged in response to the request to exit the vehicle park state. In other words, at 555, method 500 may include commanding the synchronizers to disengage at least one gear on the two layshafts. Commanding the first gear or the second gear disengaged may include the controller commanding the synchronizers engaged with the first gear or the second gear to be disengaged from the first gear or second gear. For example, the selector forks associated with the engaged synchronizers may be controlled via the controller to move the synchronizers engaged with the first gear or second gear to a disengaged position.

Alternatively, returning to 545, responsive to an indication that the vehicle is parked on a slope greater than the slope threshold, method 500 may proceed to 550, and may include rotating the transmission output shaft via the electric machine. The electric machine may rotate in a forward or reverse direction. Thus, method 500 may include rotating the electric machine to unload the first gear or second gear in responsive to the road grade, or slope, greater than the slope threshold. By rotating the electric machine to rotate the transmission output shaft, the force for moving the appropriate synchronizers via the appropriate selector forks may be reduced, thus enabling the synchronizers engaged with the first gear or second gear to a disengaged position.

As discussed, at 555, method 500 may include commanding the synchronizers to disengage at least one gear on the two layshafts. Proceeding to 560, method 500 may include indicating whether the synchro or synchronizers are disengaged. As discussed above, position sensors on each of the plurality of synchronizers may communicate with the controller to provide an indication as to whether the synchronizers are disengaged. Responsive to an indication that the one or more synchronizers are not disengaged, method 500 may proceed to 565. At 565, method 500 may include rotating the electric machine couple to the transmission in response to the indication that the first gear or the second gear is not disengaged after commanding the first gear or second gear disengaged. By rotating the electric machine, which may thus rotate the output shaft coupled to the transmission, the engaged synchro or synchronizers may be freed to disengage. Accordingly, responsive to rotating the transmission output shaft via the electric machine at 565, method 500 may return to 555, and may include again commanding the synchronizers to disengage at least one gear on the two layshafts, as discussed above.

Returning to 560, responsive to an indication that they synchronizers are disengaged, method 500 may proceed to 570, and may include indicating the vehicle transmission state. For example, depending on which synchro was disengaged, the still engaged either first gear or second gear may control transmission output. Accordingly, the transmission gearing state may be communicated to the vehicle controller, and may be further indicated via a display system on the vehicle dash, for example.

Method 500 may be enabled, for example, by a system comprising an engine, a dual clutch transmission not including a parking pawl, an electric machine coupled to the dual clutch transmission, and a controller including executable instructions in non-transitory memory to request rotation of an electric machine in response to an indication that a first gear or a second gear is not engaged after the dual clutch transmission has been commanded to a park state. In such a system, an output shaft of the transmission may be held from rotating when the dual clutch is in the park state. The system may further comprise synchronizers for the first and second gears. The system may further comprise sensors (e.g. position sensors) to determine operating states of the synchronizers. Still further, the system may comprise additional instructions to establish whether or not the first gear and the second gear are engaged in response to output of the sensors.

Thus, the method of FIG. 5 provides for a driveline operating method, comprising: in response to a first condition, engaging a first gear and engaging a second gear of a dual clutch transmission in response to a request to enter a vehicle park state where an output of a transmission is held from rotating, the first gear coupled to a first layshaft, the second gear coupled to a second layshaft; and in response to a second condition, engaging a third gear and engaging a fourth gear of a dual clutch transmission in response to a request to enter a vehicle park state where an output of a transmission is held from rotating, the third gear coupled to a first layshaft, the fourth gear coupled to a second layshaft. In one example, the first and second conditions are first and second road grades. In another example, the first and second conditions are first and second vehicle conditions (e.g., an indication of degraded gears and no indication of degraded gears).

In a first example of the method, the method further comprises opening a first clutch coupled to the first gear before the first gear is engaged and opening a second clutch coupled to the second gear before the second gear is engaged and holding the first and second clutches open while engaging the first and second gears. A second example of the method optionally includes the first example, and further comprises not engaging the first and second gears unless vehicle speed is less than a threshold speed. A third example of the method optionally includes any one or more or each of the first and second examples, and further comprises commanding the first gear or second gear disengaged in response to a request to exit the vehicle park state. A fourth example of the method optionally includes any one or more or each of the first through third examples and further comprises rotating an electric machine coupled to the transmission in response to an indication that the first gear or second gear is not disengaged after commanding the first gear or second gear disengaged. A fifth example of the method optionally includes any one or more or each of the first through fourth examples and further comprises rotating an electric machine to unload the first gear or second gear in response to a road grade greater than a threshold. A sixth example of the method optionally includes any one or more or each of the first through fifth examples and further includes where road grade is estimated via an accelerometer or an inclinometer.

The method of FIG. 5 also provides for a driveline operating method, comprising: simultaneously commanding a first gear engaged and commanding a second gear engaged, the first gear coupled to a first layshaft, the second gear coupled to a second layshaft, in response to a request to enter a vehicle park state where an output shaft of a transmission is held from rotating; and rotating an electric machine coupled to the output shaft of the transmission in response to an indication that the first gear or second gear is not engaged. In a first example of the method, the method further comprises opening a first clutch coupled to the first gear before the first gear is engaged and opening a second clutch coupled to the second gear before the second gear is engaged and holding the first and second clutches open while engaging the first and second gears. A second example of the method optionally includes the first example, and further comprises not engaging the first and second gears unless vehicle speed is less than a threshold speed. A third example of the method optionally includes any one or more or each of the first and second examples, and further comprises commanding the first gear or second gear disengaged in response to a request to exit the vehicle park state.

In some examples, a fourth example of the method optionally includes any one or more or each of the first through third examples, and further comprises rotating an electric machine coupled to the transmission in response to an indication that the first gear or second gear is not disengaged after commanding the first gear or second gear disengaged. A fifth example of the method optionally includes any one or more or each of the first through fourth examples, and further comprises rotating an electric machine to unload the first gear or second gear in response to a road grade greater than a threshold. A sixth example of the method optionally includes any one or more or each of the first through fifth examples, and further comprises communicating a request to rotate the electric machine from a transmission controller to an electric machine controller. A seventh example of the method optionally includes any one or more or each of the first through sixth examples, and further comprises providing the indication that the first gear or second gear is not engaged in response to a position of a gear synchronizer.

The method of FIG. 5 also provides for a driveline operating method, comprising simultaneously commanding a first gear engaged and commanding a second gear engaged, the first gear coupled to a first layshaft, the second gear coupled to a second layshaft, in response to a request to enter a vehicle park state where an output shaft of a transmission is held from rotating; rotating an electric machine coupled to the output shaft of the transmission in response to an indication that the first gear or second gear is not engaged; commanding the first gear or second gear disengaged in response to a request to exit the vehicle park state; and rotating the electric machine coupled to the output shaft of the transmission in response to an indication that the first gear or second gear is not disengaged after commanding the first gear or second gear disengaged.

Figure 6:
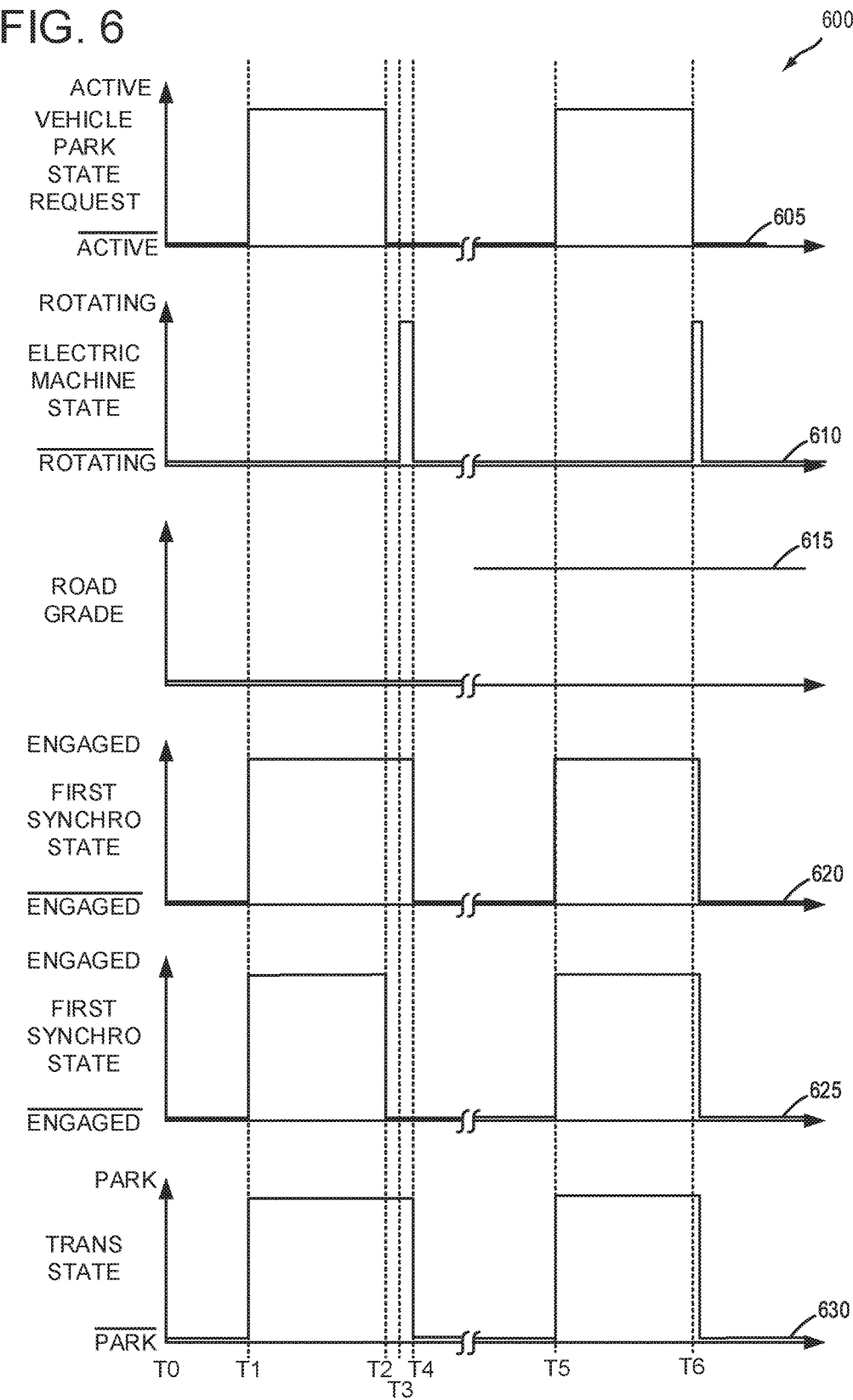
FIG. 6 is a simulated sequence for engaging a dual clutch transmission in a park state.

Turning to FIG. 6, an example timeline 600 is shown for conducting entry into, and exit from, a vehicle transmission park state, according to method 500 described herein, and as applied to the systems described herein and with reference to FIGS. 1A-4. Timeline 600 includes plot 605, indicating whether a vehicle park state is requested (active), or not (e.g., a bar over the word active, active bar), where the park state may be requested via a vehicle operator (also referred to herein as a driver). Timeline 600 further includes plot 610, indicating whether an electric machine (e.g. 120) is rotating, or not (rotating bar), over time. Timeline 600 further includes plot 615, indicating a road grade that the vehicle is traveling on, or is parked on, over time. Such an indication of road grade may be communicated to a vehicle controller via, for example, an accelerometer, or inclinometer. Timeline 600 further includes plot 620, indicating whether a first synchro is engaged with a first gear, or not (engaged bar), and plot 625, indicating whether a second synchro is engaged with a second gear, or not (engaged bar), over time. Furthermore, timeline 600 further includes plot 630, indicating whether a transmission state is in park, or not (park bar), over time.

At time T0, a park request by the vehicle operator is not indicated, illustrated by plot 605. The electric machine is not rotating, illustrated by plot 610. Road grade not substantially inclined, or declined, indicated by plot 615. Furthermore, a first synchro is not engaged with a first gear, indicated by plot 620, and a second synchro is not engaged with a second gear, indicated by plot 625. As discussed above with regard to method 500 depicted at FIG. 5, a first gear may be engage to a first layshaft (e.g., locked to the layshaft so that the gear rotates at a same speed as the layshaft), while a second gear may be engaged to a second layshaft. As the first synchro and the second synchro are not engaged, the transmission state is in a state other than park, illustrated by plot 630.

At time T1, a park state is requested. Accordingly, the first synchro is commanded by the controller to engage the first gear, and the second synchro is commanded by the controller to engage the second gear. As discussed above, the choice of what gear constitutes the first gear, and what gear constitutes the second gear, may be determined by the vehicle controller as a function of road grade or other vehicle operating condition, such as a condition of gear degradation. The first gear may be selected from any of the gears on the first layshaft, and the second gear may be selected from any of the gears on the second layshaft. By engaging both the first gear, and the second gear via the first and second synchronizers, the vehicle transmission is entered into a park state, indicated by plot 630. More specifically, by engaging both the first synchro with the first gear, and the second synchro with the second gear, an output shaft (e.g. 462) of the transmission may be locked, thus placing the vehicle in the park state. Furthermore, it may be understood that engaging the synchronizers may include the controller commanding the synchronizers to move to the desired gears, via selector forks associated with the synchronizers, as discussed above.

Between time T1 and T2, the vehicle is maintained in the park state. At time T2, a request to exit the park state is initiated. Such a request may include a shift lever being moved from the park position, to another position, for example. Responsive to the request to exit the park state, the first synchro and the second synchro may be commanded to disengage from the first gear and second gear, respectively. As discussed, such an action may be initiated via communication between the controller and selector forks associated with the synchronizers.

However, at time T2, only the second synchro is indicated to be disengaged responsive to the command to disengage both the first and second synchro. Accordingly, at time T3, the electric machine is commanded on, whereby rotation of the electric machine may rotate the transmission output shaft. By rotating the transmission output shaft, the first synchro may be freed to disengage from the first gear. Accordingly, with the electric machine activated between time T3 and T4, the first synchro is indicated to disengage from the first gear, and as such, the transmission state is indicated to exit the park state.

The vehicle may be driven for a duration between time T4 and T5. At time T5, another request for entry into a parked state is initiated, indicated by plot 605. Furthermore, the vehicle is indicated to be on a road grade substantially steeper than between time T0 and T4. It may be understood that the road grade indicated at time T5 is greater than a threshold slope.

Responsive to the request for entry into the parked state at time T5, a first gear and a second gear may be selected to engage, where, as discussed above, the first and second gear combination may be selected as a function of road grade. For example, the vehicle controller may receive information pertaining to the current road grade, and responsive to the request for entry to the parked state, the first gear and second gear may be selected in order to minimize wear on the gears. Thus, it may be understood that any of the gears on the first layshaft may be selected as the first gear, and any of the gears on the second layshaft may be selected as the second gear. Furthermore, it may be understood that the gear selection at time T5 may be different than the gear selection at time T1, for example, as the road grade is different between the two time points.

Responsive to the first and second gear being selected, appropriate first and second synchronizers may be selected for which to engage the first and second gears. The synchronizers may be commanded via the controller to engage the first and second gears, which may include commanding the selector forks associated with the selected synchronizers to move the selected synchronizers for engagement with the first and second gears. Accordingly, at time T5, both the first and second syncros are indicated to be engaged, where an indication of the engagement of each of the first and second synchronizers may communicated to the vehicle controller by position sensors associated with the first and second synchronizers. As both the first and second synchronizers are indicated to be engaged, it is further indicated that the vehicle transmission has entered into a park state, illustrated by plot 630.

The vehicle transmission remains in park between time T5 and T6. At time T6, a request for exit from the park state is again indicated. Because the request for exit from the park state occurs while the vehicle is parked on a road grade above the slope threshold, the electric machine may be activated in order to free the first synchro and second synchro, such that the first and second synchronizers may be readily disengaged. In other words, a force to disengage the first and second synchronizers may be reduced by activating the electric machine, where activating the electric machine includes rotating the electric machine, thereby rotating the transmission output shaft (e.g. 462). By activating the electric machine, both the first synchro and second synchro are readily disengaged.

Method 500 as depicted above pertains to entry into, and exit from, a park state, wherein the park state may be achieved via two gears on separate layshafts being simultaneously engaged, such that a transmission output shaft is prevented from rotating. Such a method may be utilized to achieve a park state without the use of a park pawl, such as park pawl (e.g. 463) and associated park gear (e.g. 460), depicted at FIG. 4.

Figure 7:
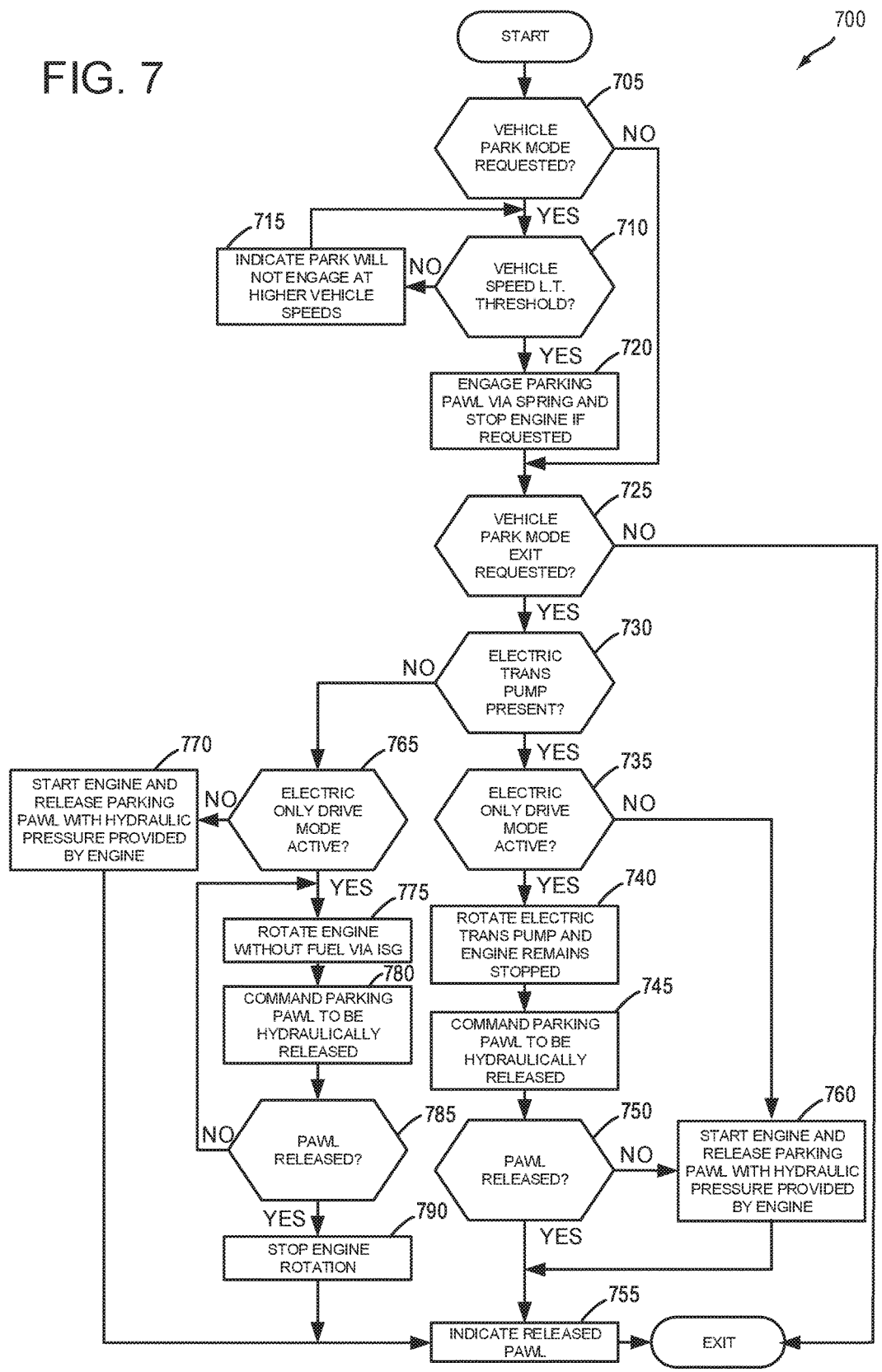
FIG. 7 is a flowchart of a method for operating a parking pawl of a dual clutch transmission.

Turning now to FIG. 7, a method for entry into and exit from a park state, via the use of a park pawl, is shown. More specifically, method 700 may comprise a driveline operating method, including engaging a parking pawl to an output shaft of a dual clutch transmission in response to a request to enter a vehicle into a parked state, and disengaging the parking pawl via rotating an engine via an integrated starter/generator in response to a request to propel the vehicle solely via power of an electric machine positioned downstream of the dual clutch transmission. In another example, method 700 may include disengaging the parking pawl via activating an electric pump in response to a request to propel the vehicle solely via power of an electric machine positioned downstream of the dual clutch transmission. By propelling the vehicle solely via power of the electric machine, fuel supplied to the engine may be conserved.

Method 700 will be described with reference to the systems described herein, and shown in FIGS. 1A-4, though it should be understood that similar methods may be applied to other systems without departing from the scope of this disclosure. Method 700 may be carried out by a controller, such as transmission controller 354 in FIG. 3, and may be stored at the controller as executable instructions in non-transitory memory. Instructions for carrying out method 700 and the rest of the methods included herein may be executed by the various controllers described herein based on instructions stored on a memory of the respective controllers and in conjunction with signals received from sensors of the engine system, such as the sensors described above with reference to FIGS. 1A-4. The controller may communicate with other controllers described herein to employ driveline actuators such as electric pump (e.g. 412), park pawl valve (e.g. 461), electric machine (e.g. 120), ISG (e.g. 142), fuel injectors (e.g. 266), etc., according to the methods depicted below.

Method 700 begins at 705 and may include indicating whether a vehicle park mode is requested. For example, a vehicle park mode being requested may include a vehicle operator selecting a park mode from a shift lever in the vehicle. Proceeding to 710, method 700 may include indicating whether vehicle speed is lower than a threshold speed. In some examples, the threshold speed may be the same threshold speed as indicated above with regard to method 500 (e.g. 2.5 miles per hour). However, in other examples, the threshold speed may be different than that indicated above at FIG. 5. If, at 710, vehicle speed is not lower than the threshold speed, method 700 may proceed to 715, and may include indicating that the park function may not engage at vehicle speeds above the threshold speed. Such an indication may be communicated to a vehicle operator via an audible indication, and/or visually via a display system on the vehicle dash, for example. Furthermore, such an indication may be communicated to the vehicle controller. Method 700 returns to 710 after providing the indication.

Responsive to the vehicle park mode being requested at 705, and further responsive to vehicle speed below the threshold speed at 710, method 700 may proceed to 720. At 720, method 700 may include engaging the parking pawl (e.g. 463) with the parking gear (e.g. 460), via a spring (e.g. 464), for example. In some examples, at 720, method 700 may further include stopping the vehicle engine responsive to the engine being activated and further responsive to a request from the vehicle operator, or vehicle controller, to stop the engine.

Thus, while in the park mode, the park pawl may be engaged with the park gear, thus preventing the transmission output shaft (e.g. 462) from rotating. Proceeding to 725, method 700 may include indicating whether exit from the vehicle park mode is requested. As an example, a request to exit the park mode may include the vehicle operator selecting a transmission state other than park on a shift selector. Responsive to an exit from the park mode being requested, method 700 may proceed to 730, and may include indicating whether an electric transmission pump (e.g. 412) is present in the vehicle system. If an electric transmission pump is indicated to be present, method 700 may proceed to 735, and may include indicating whether an electric only drive mode is active. For example, electric only mode may include a mode wherein the vehicle is propelled solely via an electric machine (e.g. 120 of FIG. 1A) positioned downstream of the dual clutch transmission. If, at 735, it is indicate that electric only drive mode is active, method 700 may proceed to 740.

At 740, method 700 may include rotating the electric transmission pump while the engine is maintained stopped, or deactivated. For example, power to the electric pump may be provided via an onboard energy source (e.g. 132). As indicated at FIG. 4, the electric pump may receive hydraulic fluid from a sump (e.g. 411). Thus, subsequent to activating the electric transmission pump at 740, method 700 may proceed to 745, and may include commanding the parking pawl to be hydraulically released. Such an action may include commanding open park pawl valve 461, for example. Responsive to compression of the spring, the park pawl may become disengaged from the parking gear. Thus, subsequent to activation of the electric pump, and further subsequent to coupling the electric pump to the spring (e.g. 464), method 700 may proceed to 750, and may include indicating whether the parking pawl is released. For example, a pawl position sensor (e.g. 468) may be configured to communicate a position of the parking pawl to the controller. Alternatively, a small torque may be applied to transmission output shaft (e.g., 462 via the electric machine (e.g., 120) while first and second clutches (e.g. 126 and 127) are open, if the transmission output shaft rotates, it may be determined that the parking pawl is released.

If, at 750, it is indicated that the parking pawl is not released, method 700 may proceed to 760. At 760, method 700 may include starting the engine to release the parking pawl via hydraulic pressure provided by the engine. More specifically, a mechanical pump (e.g. 467) may be coupled to the engine, and may be configured to deliver hydraulic pressure to the parking pawl. Thus, at 760, method 700 may include rotating the mechanical pump via the engine, and may further include releasing the parking pawl after the indication that the parking pawl was not released via the use of the electric pump. At 760, it may be understood that starting the engine may include providing fuel and spark to the engine cylinders. While not specifically illustrated, it may be further understood that, responsive to the indication that the parking pawl was not released via the electric pump, method 700 may include deactivating the electric pump at 760. Furthermore, while not specifically illustrated, operating the mechanical pump to release the park pawl may further include commanding open a park pawl valve to deliver hydraulic fluid to the spring associated the park pawl, as discussed above.

At 755, method 700 may include indicating that the parking pawl is released. Such an indication may be communicated to the controller, and may be further communicated to the vehicle operator via a display system on the vehicle dash, for example. While not specifically indicated, responsive to the parking pawl being released, method 700 may further include deactivating the engine (e.g. ceasing engine rotation), and operating the vehicle under electric only mode, in examples where the parking pawl was not released via the electric pump. In other words, method 700 may include providing torque to the vehicle wheels via the electric machine, in response to the parking pawl being released.

Returning to step 730, responsive to exit from the vehicle park mode being requested, and further responsive to an electric pump not being present in the vehicle system, method 700 may proceed to 765. At 765, method 700 may include indicating whether electric only drive mode is active, as described above at step 735 of method 700. If, at 765, electric only mode is not indicated to be active, method 700 may proceed to 770, and may include starting the engine to release the parking pawl utilizing hydraulic pressure provided by the engine. Such an action is described above with regard to step 760, and thus for brevity, will not be reiterated.

Returning to step 765, if electric only drive mode is indicated to be active, method 700 may proceed to 775, and may include rotating the engine unfueled and not combusting air and fuel via the integrated starter/generator (ISG) (e.g. 142). In one example, intake or exhaust valves of the engine are held in an open state while the engine is rotated via the ISG to reduce engine pumping work. It may be understood that the integrated starter/generator may be coupled to the engine, and may receive power supplied via the onboard energy source (e.g. 132) to rotate the engine unfueled. By rotating the engine unfueled via the ISG, the mechanical pump coupled to the engine that is configured to deliver hydraulic pressure to the parking pawl may be activated. Proceeding to 780 method 700 may include commanding the parking pawl to be hydraulically released, which may include commanding open the park pawl valve, as discussed above, to direct hydraulic fluid to compress the spring associated with the park pawl, whereby compression of the spring may release the park pawl from the park gear, as discussed above.

Continuing to 785, method 700 may include indicating whether the park pawl is released. As discussed above, such an indication may be communicated to the controller via a pawl position sensor (e.g. 468) configured to indicate the position of the pawl with respect to the park gear. Alternatively, indication of parking pawl release may be based on rotating the transmission output shaft 462 via electric machine (e.g., 120) as previously described.

If, at 785, it is indicated that the pawl is not yet released, method 700 may include returning to 775, wherein the engine may be continued to be rotated without fueling via the ISG. Alternatively, responsive to an indication at 785 that the park pawl is released, method 700 may proceed to 790, and may include stopping engine rotation, via terminating power supplied via the ISG to rotate the engine. Continuing to 755, method 700 may include indicating that the pawl is released, as discussed above. While not explicitly illustrated, where the electric only drive mode is indicated to be active, method 700 may further include providing torque to the vehicle wheels via the electric machine responsive to the indication that the parking pawl is released.

Thus, the method of FIG. 7 provides for releasing a parking pawl via pressure of hydraulic fluid supplied to a spring actuated parking pawl. The hydraulic pressure may be provided via an electric pump or via rotating an engine that is coupled to the transmission via an integrated starter/generator that is coupled to the engine. The method may be particularly useful when the hybrid vehicle is operated in an electric only drive or propulsion mode.

The method of FIG. 7 provides for a driveline operating method, comprising: engaging a parking pawl to an output shaft of a dual clutch transmission in response to a request to enter a vehicle into a parked state; and disengaging the parking pawl via rotating an engine via an integrated starter/generator in response to a request to propel the vehicle solely via power of an electric machine positioned downstream of the dual clutch transmission. In a first example of the method, the method further comprises reducing pumping work of the engine in response to the request to propel the vehicle solely via power of the electric machine. A second example of the method optionally includes the first example, and further includes where the integrated starter/generator is coupled to the engine. A third example of the method optionally includes any one or more or each of the first and second examples and further includes where the engine is not combusting air and fuel while the parking pawl is engaged. A fourth example of the method optionally includes any one or more or each of the first through third examples, and further comprises rotating a pump via rotating the engine. A fifth example of the method optionally includes any one or more or each of the first through fourth examples and further comprises supplying fluid via the pump to release the parking pawl. A sixth example of the method optionally includes any one or more or each of the first through fifth examples and further includes ceasing engine rotation in response to an indication that the parking pawl is released.

The method of FIG. 7 also provides for a driveline operating method, comprising: engaging a parking pawl to an output shaft of a dual clutch transmission in response to a request to enter a vehicle into a parked state; and disengaging the parking pawl via activating an electric pump in response to a request to propel the vehicle solely via power of an electric machine positioned downstream of the dual clutch transmission. In a first example of the method, the method further comprises deactivating the electric pump in response to an indication that the parking pawl is released. A second example of the method optionally includes the first example, and further comprises providing torque to vehicle wheels via the electric machine in response to the parking pawl being released. A third example of the method optionally includes any one or more or each of the first and second examples, and further comprises starting an engine in response to an indication that the parking pawl is not released after commanding the parking pawl released. A fourth example of the method optionally includes any one or more or each of the first through third examples, and further comprises rotating a mechanical pump via the engine and releasing the parking pawl after the indication that the parking pawl is not released. A fifth example of the method optionally includes any one or more or each of the first through fourth examples, and further comprises deactivating the electric pump in response to the indication that the parking pawl is not released. A sixth example of the method optionally includes any one or more or each of the first through fifth examples, and further includes where the parking pawl is engaged via a spring. A seventh example of the method optionally includes any one or more or each of the first through sixth examples, and further includes where the dual clutch transmission is positioned in a vehicle driveline between an engine and the electric machine.

Figure 8:
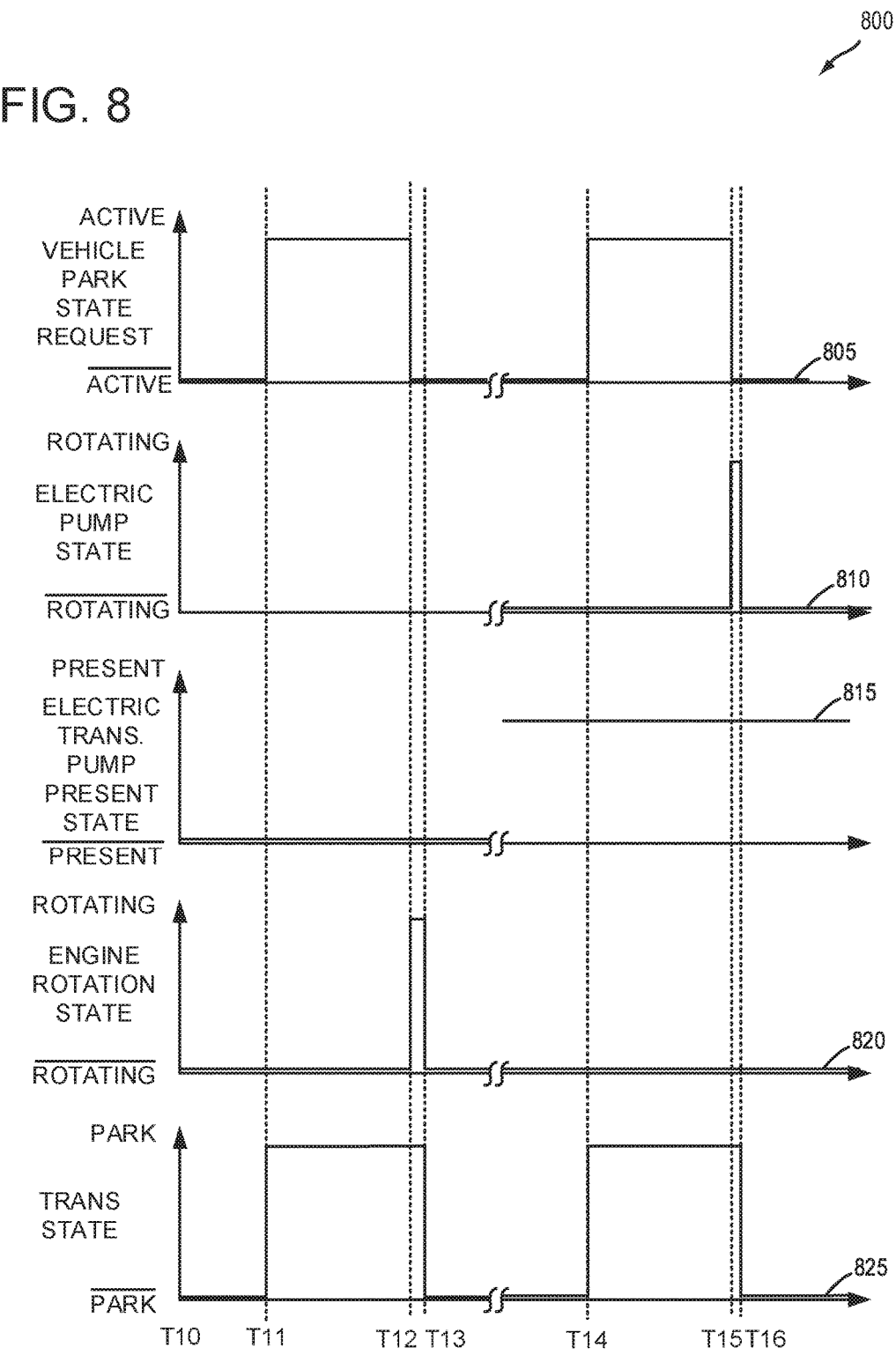
FIG. 8 is a simulated sequence for engaging and releasing a parking pawl of a dual clutch transmission.

Turning to FIG. 8, an example timeline 800 is shown for entry into and exit from a park state vehicle transmission park state, according to method 700 described herein, and as applied to the systems described herein and with reference to FIGS. 1A-4. Timeline 800 includes plot 805, indicating whether a vehicle park request is indicated (active), or not (active bar), over time. Timeline 800 further includes plot 810, indicating whether an electric transmission pump is rotating, or not rotating (rotating bar), over time. Timeline 800 further includes plot 815, indicating whether an electric transmission pump is present in the vehicle, or not (present bar). Timeline 800 further includes plot 820, indicating whether an engine is rotating, or not (rotating bar), over time. Timeline 800 further includes plot 825, indicating whether a vehicle transmission is in a park mode (park), or not (park bar), over time.

At time T10, a request for park mode is not indicated, illustrated by plot 805. Furthermore, an electric transmission pump (e.g. 412) is not indicated to be present in the vehicle, indicated by plot 815. As such, no plot line is indicated for whether the electric pump is rotating or not. The engine is not indicated to be rotating at time T10, illustrated by plot 820. However, the vehicle is in operation, as the transmission is in a gear state other than park, illustrated by plot 825.

At time T11, a request for park mode is indicated. Such a request may be indicated via a vehicle operator selecting a park gear state on a shift selector (e.g., 379), for example. Responsive to the request, the transmission is locked in park mode, via engagement of a park pawl with a park gear, thus locking the transmission output shaft. Thus, at time T11, the transmission is indicated to be in park mode, illustrated by plot 825.

Between time T11 and T12, the vehicle is maintained in a park state. At time T12, exit from the park mode is requested, indicated by plot 805. Such a request may include the vehicle operator selecting a transmission gear other than park, for example. Because an electric pump is not indicated in the vehicle, an electric pump may not be used to generate hydraulic pressure to compress a spring associated with the park pawl. Thus, to release the park pawl, the engine is rotated at time T12. While not explicitly illustrated, it may be understood that the engine is rotated via an ISG (e.g. 142), where the ISG receives power from an onboard energy storage device (e.g. 132). As such, the engine is rotated unfueled, and the rotation of the engine may result in rotation of a mechanical transmission pump coupled to the engine. By activating the mechanical pump via engine rotation, where the engine rotation comprises unfueled operation without combustion, hydraulic pressure may be directed to the spring associated with the park pawl. The hydraulic pressure may compress the spring, thus releasing the park pawl from the park gear. Accordingly, between time T12 and T13, the engine is rotated unfueled, and at time T13, the transmission state is indicated to transition to a state other than park, illustrated by plot 825. In some examples, the release of the park pawl from the park gear may be indicated via a pawl position sensor.

Furthermore, at time T13, engine rotation is stopped. More specifically, power provided via the ISG to the engine in order to rotate the engine may be terminated. Thus, after the transmission park state is indicated to exit from park mode, the vehicle may be propelled via an electric machine (e.g. 120). In other words, as discussed above with regard to method 700, it may be understood that electric only mode is activated. Thus, subsequent to rotating the engine to release the park pawl, the engine rotation may be abruptly stopped, whereby the vehicle may be propelled solely via the electric machine.

The right side of timeline 800 illustrates an example wherein an electric transmission pump is indicated to be present in the vehicle, illustrated by plot 815. Prior to time T14, the vehicle is indicated to be in operation, as transmission gear state is in a state other than park, illustrated by plot 825. At time T14, a request for entry into the park mode is indicated, where such an indication may be communicated to the controller via a vehicle operator selecting a park gear on a shift lever, for example. Responsive to the request, the park pawl may engage with the park gear, as discussed above, thus locking the transmission output shaft.

Between time T14 and T15, the vehicle is maintained in park mode. At time T15, a request for exit from the park mode is indicated. As discussed, such a request may include the vehicle operator selecting a gear other than park on a shift lever. Because the vehicle includes an electric pump configured to couple to the vehicle hydraulic pump system, at time T15 the electric pump is activated, via power supplied to the electric pump via the onboard storage device, for example. With the electric pump activated, hydraulic pressure is provided to the spring associated with the park pawl. As discussed, the hydraulic pressure may compress the spring, such that the park pawl may be released from the park gear. Thus, between time T15 and T16, the electric pump is maintained activated. At time T16, the transmission state is indicated to transition from park, to a gear selection other than park, illustrated by plot 825. Furthermore, while not explicitly illustrated, it may be understood that electric only mode is activated. Thus, engine the engine is maintained off, and it may be understood that after time T16, the vehicle may be propelled solely via power from the electric machine.

Referring now to FIG. 9, a flowchart of a method for operating a driveline of a hybrid vehicle powertrain 100 is shown. The method of FIG. 9 may be incorporated into the system of FIGS. 1A-4 as executable instructions stored in non-transitory memory of one or more controllers. Additionally, portions of the method of FIG. 9 may be actions performed via the controllers shown in FIGS. 1A-4 to transform a state of a device or actuator in the real world. The method shown in FIG. 9 may operate in conjunction and cooperation with other methods described herein.

At 905, method 900 judges if a transmission upshift of a dual clutch transmission (DCT) is expected within a threshold amount of time. In one example, method 900 judges if speed of a vehicle in which the DCT operates will reach a transmission upshift speed stored in controller memory as a transmission shift schedule within the threshold amount of time (e.g., 0.5 seconds). Method 900 may make the judgement based on present vehicle speed, transmission upshift speed for the present gear to the next highest gear, and rate of vehicle acceleration. For example, if a shift is expected at 45 KPH, vehicle speed is 40 KPH, and the vehicle is accelerating at 10 KPH/s, then method 400 may judge an upshift is expected within the threshold amount of time. If method 900 judges that an upshift is expected within the threshold amount of time, the answer is yes and method 900 proceeds to 910. Otherwise, the answer is no and method 900 proceeds to exit.

At 910, method 900 judges if wear of an on-coming clutch is greater than (G.T.) a threshold amount. The wear of a clutch may be estimated based on an amount of pressure applied to the clutch and a torque transfer capacity of the clutch (e.g., an amount of torque the clutch may transfer from an input side of the clutch to the output side of the clutch) at the pressure or via other means. For example, if a clutch transfer function indicates that clutch torque capacity is 100 N-m at a pressure of 20 KPA, but the clutch has a capacity of only 50 N-m at a pressure of 20 KPA, method 900 may judge that the clutch wear exceeds a threshold. If method 900 judges that wear of the clutch is greater than a threshold amount, the answer is yes and method 900 proceeds to 915. Otherwise, the answer is no and method 900 proceeds to 920.

At 915, method 900 may select a different gear than the gear in the shift schedule described at 905. The different gear or new gear is a gear that may be selectively engaged to a different clutch than the gear output from the shift schedule. For example, if the shift schedule indicates a transmission gear shift from third gear (e.g., 424 in FIG. 4) to fourth gear (e.g., 426 in FIG. 4) at a speed of 30 KPH, and fourth gear is selectively engaged to a second clutch (e.g., 127 in FIG. 4) via synchronizers, then method 900 may instead schedule the shift to fifth gear (e.g., 428 in FIG. 4) from third gear in response to wear of second clutch. Thus, the newly scheduled upshift changes from shifting with the second clutch to fourth gear to shifting with the first clutch to fifth gear. Method 900 proceeds to 920.

At 920, method 900 adjusts a position of shift forks for the upshift. In particular, method 900 positions forks to engage the synchronizer for the on-coming gear (e.g., gear requested to be engaged) so that the on-coming gear may be engaged. Method 900 proceeds to 925.

At 925, method 900 determines a value of a vehicle stability metric or parameter for present vehicle operating conditions. The vehicle stability metric may be an amount of lateral vehicle acceleration, wheel slip, yaw, roll, or pitch. The vehicle stability metric may be determined from output of accelerometers, wheel speed sensors, and/or body motion sensors. For example, a lateral acceleration sensor may indicate vehicle lateral acceleration is 0.4 Gs to provide a value of 0.4 for a vehicle stability metric or parameter. Method 900 proceeds to 930.

At 930, method 900 judges if the vehicle stability metric determined at 925 is less than a threshold. The threshold value may be empirically determined and stored in controller memory. For example, the vehicle stability metric threshold value may be 0.9 Gs and the vehicle stability metric may be 0.4 Gs. If method 900 judges that the value of the vehicle stability metric is greater than (G.T.) the threshold value, the answer is yes and method 900 proceeds to 940. Otherwise, the answer is no and method 900 proceeds to 935.

At 935, method 900 outputs a requested torque to the driveline and wheels via the engine and/or the electric machine (e.g., 120 of FIG. 1A). In one example, the requested or desired torque is a wheel torque (e.g., an amount of torque to deliver to vehicle wheels). The requested torque may be determined based on accelerator pedal position and vehicle speed. A first portion of the requested torque may be allocated to the engine while a second portion of the requested torque may be allocated to the electric machine so that the sum of engine torque and electric machine torque provides the requested torque at the vehicle wheels. Method 900 proceeds to exit after the requested torque is output.

At 940, method 900 judges if battery (e.g., electric energy storage device 132 in FIG. 1A) state of charge (SOC) is less than (L.T.) a threshold. The threshold SOC may be empirically determined and stored to controller memory. If SOC is less than a threshold, the battery may store and accept additional charge. If method 900 judges that the present battery SOC is less than the threshold amount, the answer is yes and method 900 proceeds to 965. Otherwise, the answer is no and method 900 proceeds to 945.

At 965, method 900 begins the requested upshift based on the transmission shift schedule and absorbs transmission output shaft torque via the electric machine (e.g., 120 of FIG. 1A) during an inertia phase of the upshift. In one example, method 900 absorbs driveline torque via the electric machine that could cause the vehicle stability metric to exceed the vehicle stability threshold. Alternatively, method 900 absorbs driveline torque via the electric machine to reduce the vehicle stability metric to a value less than the vehicle stability threshold.

In one example, method 900 subtracts the value of the vehicle stability metric from the vehicle stability threshold to determine a vehicle stability error, if the result is negative method 900 absorbs torque from the driveline via the electric machine (e.g., 120 of FIG. 1A) during the inertia phase of the upshift (e.g., inertia phase is a portion of the upshift where engine speed is synchronized to speed of an on-coming gear or gear being engaged) to reduce the vehicle stability error to zero or a positive value. For example, the vehicle stability error may be input into a proportional/integral controller which outputs an amount of torque to absorb from the driveline. However, the amount of torque absorbed from the driveline may be limited by battery or electric machine characteristics or conditions. If the electric machine lacks capacity to absorb torque from the driveline sufficient to provide zero or less than zero vehicle stability error, then additional driveline torque reductions may be provided at 970. The vehicle stability metric may be determined a plurality of times during the course of the upshift so that electric machine torque may be revised a plurality of times during the upshift. In this way, driveline torque may be feedback controlled based on the vehicle stability metric in real-time.

In a second example, method 900 may absorb driveline torque during the inertia phase of the transmission gear upshift based on empirically determined values stored in memory. For example, if the vehicle stability metric is at or greater than the vehicle stability threshold, the electric machine may absorb an empirically determined amount of torque from the driveline during the upshift inertia phase to reduce driveline torque disturbances and the possibility of further degrading vehicle stability.

In a third example, method 900 may begin reducing driveline torque via the electric machine during the inertia phase of an upshift in response to the vehicle stability metric exceeding a first empirically determined threshold and the amount of driveline torque absorbed by the electric machine may increase such that the vehicle stability metric may increase up to, but not exceed, a value of a second empirically determined threshold. In this way, the vehicle may operate at or below the second vehicle stability threshold or limit. Method 900 proceeds to 970.

At 970, method 900 may truncate engine torque via retarding engine spark timing and/or increase a duration (e.g., amount of time from start of upshift to end of upshift) of the upshift and increase a duration of clutch slip during the inertia phase of the upshift for torque that is not absorbed in the inertia phase of the upshift by the electric machine. In one example, method 900 reduces driveline torque at the transmission output shaft via retarding engine spark timing or increasing the upshift duration and slip of the on-coming clutch (e.g., clutch that supplies torque to the new gear being engaged) that is not absorbed via the electric machine and that could cause the vehicle stability metric to exceed the vehicle stability threshold. Alternatively, method 900 reduces driveline torque at the transmission output shaft via increasing engine spark retard or increasing the duration of the upshift so that the vehicle stability metric may be reduced to a value less than the vehicle stability threshold. Further, the amount of driveline torque reduction provide by the engine may be determined based on, or as a function of, a value of the vehicle stability metric. Likewise, an amount of time upshift duration is increased may be made responsive to, or a function of, a value of the vehicle stability metric.

In one example, if the vehicle stability metric is approaching the vehicle stability threshold, the duration of the upshift increases until the vehicle stability metric reaches the vehicle stability threshold, then engine spark timing is retarded. This may allow vehicle fuel efficiency to remain higher since engine torque is not truncated early on during the shift. Similarly, as the value of the vehicle stability metric is reduced and move away from the value of the vehicle stability threshold in a direction of increased vehicle stability, the amount of spark retard may be decreased and the duration of the upshift may be reduced. If the value of the vehicle stability metric reaches or exceeds the vehicle stability threshold, engine torque may be reduced to reduce the possibility of further degrading vehicle stability. Additionally, the clutch slip (e.g., difference in input speed and output speed of the clutch when the clutch is transferring torque) may be increased when the vehicle stability metric approaches the vehicle stability threshold to further reduce transmission output shaft torque. Clutch slip may be increased via reducing pressure of fluid supplied to the clutch. Conversely, clutch slip may be decreased via increasing pressure of fluid supplied to the clutch.

In another example, the upshift duration may be increased and engine spark timing may be retarded based on empirically determined values stored in a table or function that is indexed based on the a vehicle stability error and the amount of torque absorbed via the electric machine. The table outputs a spark retard amount and a gear upshift duration. Method 900 proceeds to 975.

At 975, method 900 describes an alternative method for determining the upshift duration. In particular, the upshift duration may be determined as a function of driveline torque (e.g., transmission output shaft torque) during the inertia phase of the upshift, the vehicle stability threshold, and clutch slip shift energy (e.g., an amount of energy dissipated by the clutch during the shift which may be estimated by torque input to the clutch and clutch input and output speeds). For example, a table or function may hold empirically determined upshift durations for each possible gear upshift (e.g., first to second gear upshift, second to third gear upshift, and third to fourth gear upshift) and the table or function may be indexed via the torque during the inertia phase, the vehicle stability threshold, and the clutch slip shift energy. The table or function outputs the upshift duration. Method 900 proceeds to 980.

At 980, method 900 adjusts the transmission upshift duration, engine spark timing, and electric machine torque according to the upshift duration, engine spark timing, and electric machine torque values determined at least one of steps 970, 975, 960, 950, and 955. The transmission upshift duration may be increased via decreasing a pressure of fluid applied to a clutch being applied to perform an upshift. The reduced clutch pressure may increase clutch slippage so that the clutch's torque transfer capacity may be reduced, thereby lengthening the gear shift duration from the beginning of the gear shift to the end of the gear shift when the clutch transferring torque to the on-coming gear is fully locked. The clutch slip time (e.g., amount of time the clutch slips from when the clutch begins transferring torque to when the clutch is fully locked during a gear shift) may also increase when pressure applied to a clutch is reduced during a gear shift.

At 945, method 900 judges if engine torque truncation via increased spark timing is desired. Method 900 may judge if engine torque truncation is desired via information from a user input, a vehicle operating mode, or vehicle operating conditions. For example, engine torque truncation may be desired if a human drive permits engine torque truncation for the purpose increasing vehicle stability. Alternatively, method 900 may judge that engine torque truncation is desired in response to the vehicle being in a sport or performance mode. In still another example, method 900 may judge that engine torque truncation is desired based on a magnitude of a vehicle stability error. If method 900 judges that engine torque truncation is desired, the answer is yes and method 900 proceeds to 960. Otherwise, the answer is no and method 900 proceeds to 950.

At 960, method 900 truncates engine torque via retarding engine spark timing. In addition, method 900 may increase a duration of the upshift and increase a duration of clutch slip (e.g., an amount of time between where clutch slip is present and when the clutch is locked) during the inertia phase of the upshift. In one example, method 900 reduces driveline torque at the transmission output shaft via retarding engine spark timing or increasing the upshift duration and slip of the on-coming clutch (e.g., clutch that supplies torque to the new gear being engaged) that could cause the vehicle stability metric to exceed the vehicle stability threshold. Alternatively, method 900 reduces driveline torque at the transmission output shaft via increasing engine spark retard and/or increasing the duration of the upshift so that the vehicle stability metric may be reduced to a value less than the vehicle stability threshold. Further, the amount of driveline torque reduction provided by the engine may be determined based on, or a function of, a value of the vehicle stability metric. Likewise, an amount of time upshift duration is increased may be made responsive to, or a function of, a value of the vehicle stability metric.

In one example, if the vehicle stability metric is approaching the vehicle stability threshold, the duration of the upshift increases until the vehicle stability metric reaches the vehicle stability threshold, then engine spark timing is retarded. This may allow vehicle fuel efficiency to remain higher since engine torque is not truncated early on during the shift. Similarly, as the value of the vehicle stability metric is reduced and move away from the value of the vehicle stability threshold in a direction of increased vehicle stability, the amount of spark retard may be decreased and the duration of the upshift may be reduced. If the value of the vehicle stability metric reaches or exceeds the vehicle stability threshold, engine torque may be reduced to reduce the possibility of further degrading vehicle stability. Additionally, the clutch slip (e.g., difference in input speed and output speed of the clutch while the clutch is transferring torque) may be increased when the vehicle stability metric approaches the vehicle stability threshold to further reduce transmission output shaft torque.

In another example, the engine spark timing may be retarded based on empirically determined values stored in a table or function that is indexed based on a vehicle stability error and the amount of torque absorbed via the electric machine. The table outputs a spark retard amount and duration of the upshift. In other example, the upshift duration may be determined as described at 975. Method 900 proceeds to 980.

At 950, method 900 lengthens the duration of the upshift based on torque in the portion of the inertia phase of the upshift that may increase the value of the vehicle stability metric to a value greater than the vehicle stability threshold. In one example, the shift duration is increased as described at 955. In another example, method 900 may increase the upshift duration based on the extent that the vehicle stability metric exceeds a first empirically determined threshold such that the vehicle stability metric may increase up to, but not exceed, a value of a second empirically determined threshold. In other words, the upshift duration may be progressively increased after the vehicle stability metric exceeds the first vehicle stability threshold value and so that it does not exceed the second vehicle stability threshold value. In this way, the vehicle may operate at or below a vehicle stability threshold or limit. Method 900 proceeds to 955.

At 955, method 900 determines the upshift duration as a function of driveline torque (e.g., transmission output shaft torque) during the inertia phase of the upshift, the vehicle stability threshold, and clutch slip shift energy (e.g., an amount of energy dissipated by the clutch during the shift which may be estimated by torque input to the clutch and clutch input and output speeds). For example, a table or function may hold empirically determined upshift durations for each possible gear upshift (e.g., first to second gear upshift, second to third gear upshift, and third to fourth gear upshift), and the table or function may be indexed via the torque during the inertia phase, the vehicle stability threshold, and the clutch slip shift energy. The table or function outputs the upshift duration. Method 900 proceeds to 980.

In this way, the possibility of decreasing vehicle stability may be decreased via increasing upshift duration, increasing engine spark retard, increasing torque absorbed from a driveline via an electric machine, and/or increased transmission clutch slip. Increasing the shift duration reduces torque delivered to the transmission output shaft as does reducing engine torque via spark retard. The reduced transmission output torque may provide additional vehicle stability. Further, vehicle stability may be improved via reducing wheel torque by absorbing transmission output torque via an electric machine positioned downstream of the transmission.

Referring now to FIG. 10, an exemplary hybrid driveline operating sequence is shown. The sequence of FIG. 10 may be provided according to the method of FIG. 9 along with or in conjunction with the system of FIGS. 1A-4. The plots shown in FIG. 10 occur at the same time and are aligned in time.

The first plot from the top of FIG. 10 is a plot of a vehicle stability metric versus time. The vertical axis represents a value of the vehicle stability metric and the value of the vehicle stability metric increases in the direction of the vertical axis arrow. Higher values of the vehicle stability metric indicate decreased vehicle stability. Lower vehicle stability values indicate increased vehicle stability. The horizontal axis represents time and time increases from the left side of the figure to the right side of the figure. Horizontal line 1002 represents a vehicle stability threshold value. Vehicle stability metric values above horizontal line 1002 may be less desirable.

The second plot from the top of FIG. 10 is a plot of a state of vehicle upshift request versus time. A vehicle upshift is requested when the trace is at a higher level near the vertical axis arrow. A vehicle upshift is not requested when the trace is at a lower level near the horizontal axis. The horizontal axis represents time and time increases from the left side of the figure to the right side of the figure.

The third plot from the top of FIG. 10 is a plot of battery state of charge (SOC) versus time. The vertical axis represents battery SOC and SOC increases in the direction of the vertical axis arrow. SOC is a low value at the horizontal axis. The horizontal axis represents time and time increases from the left side of the figure to the right side of the figure. Horizontal line 1004 represents a SOC threshold. If battery SOC is greater than the level of horizontal line 1004, the battery or electric energy storage device does not accept charge from the electric machine. The battery or electric energy storage device accepts charge when the trace is less than or at a lower level than threshold 1004.

The fourth plot from the top of FIG. 10 is a plot of upshift duration (e.g., amount of time from start of upshift to the end of the upshift) versus time. The vertical axis represents the duration of the upshift and the duration of the upshift increases in the direction of the vertical axis arrow. The horizontal axis time and time increases from the left side of the figure to the right side of the figure.

The fifth plot from the top of FIG. 10 is a plot of engine spark retard versus time. The vertical axis represents engine spark retard and engine spark retard increases in the direction of the vertical axis arrow. The horizontal axis represents time and time increases from the left side of the figure to the right side of the figure.

The sixth plot from the top of FIG. 10 is a plot of negative electric machine torque (e.g., torque absorbed by the electric machine (e.g., 120 of FIG. 1A) when the electric machine is operating a generator or alternator mode) versus time. The vertical axis represents electric machine negative and the magnitude of the negative electric machine torque increases in the direction of the vertical axis arrow. The horizontal axis represents time and time increases from the left side of the figure to the right side of the figure.

At time T20, the value of the vehicle stability metric is less than threshold 1002 and a transmission upshift is not requested as indicated by the upshift request trace being at a lower level. The transmission upshift duration is a small value since no transmission upshift is requested. Engine spark is not retarded since the engine spark retard trace is at a lower level. The electric machine negative torque is at a lower level indicating that the electric machine is not absorbing torque from the hybrid vehicle driveline.

Between time T20 and time T21, the vehicle stability metric value increases to indicate decreasing vehicle stability. The vehicle stability metric may increase as a vehicle enters a corner of a road or track. Transmission upshifting is not requested and battery state of charge is at a higher level above threshold 1004. The battery does not accept charge when battery SOC is at the level shown. A transmission upshift is not requested and the shift duration is a small value.

At time T21, a transmission upshift is requested. The transmission upshift may be requested in response to a transmission shift schedule, vehicle speed, and a desired torque. The battery SOC remains above threshold 1004 so the electrical machine negative torque is zero in response to the requested upshift. However, the shift duration is increased to a longer duration (e.g., longer period of time) in response to the upshift request and vehicle stability being at threshold 1002. By increasing the shift duration, driveline torque disturbances that may occur during an inertia phase of an upshift may be reduced so that torque at the vehicle wheels may be reduced as compared to if the upshift duration where shorter. In addition, engine spark retard is increased so that spark timing is retarded away from minimum spark timing for best engine torque. Retarding the engine spark timing reduces engine torque, but it may reduce engine fuel economy. The engine spark retard is at a higher level to indicate engine torque is reduced via a larger amount of spark retard. Increasing the shift duration and the engine spark retard may reduce the possibility of the vehicle stability metric exceeding threshold 1002.

Between time T21 and time T22, an upshift is performed in response to the upshift request and the upshift is performed with a longer upshift duration and reduced engine torque. The vehicle stability metric is reduced as time approaches time T22. The vehicle stability metric may be reduced as a vehicle exits a corner of a road or track.

At time T22, a second transmission upshift is requested in response to vehicle conditions including the transmission shift schedule, vehicle speed, and requested torque. The vehicle stability metric is at a lower level to indicate that the vehicle is operating in stable conditions. The battery SOC remains above threshold 1004. Therefore, the shift duration is made short and the amount of spark retard is zero so that driveline torque is not reduced responsive to the vehicle stability metric. In addition, driveline torque absorbed by the electric machine is substantially zero.

Between time T22 and time T23, an upshift is performed in response to the upshift request and the upshift is performed with a shorter upshift duration and at requested engine torque. The vehicle stability metric is increases as time approaches time T23. The battery SOC is reduced to a level less than threshold 1002 as charge is consumed via the electric machine.

At time T23, a transmission upshift is requested. The battery SOC is now below threshold 1004 so the electrical machine may absorb torque from the driveline. The amount of negative torque being absorbed from the driveline is increased since the SOC value is lower. By delivering torque to the electric machine, the torque may be converted into electrical energy that is stored in the battery or electric energy storage device. In this example, the electric machine's capacity to store charge during the upshift is less than the amount of energy provided during the upshift so engine torque is reduced to further lower driveline torque.

The spark retard at time T23 is much less than the amount of spark retard used at time T21 to reduce driveline torque. The shift duration is short so that clutch wear may be reduced. Such driveline operation may be provided when the vehicle is operating in a non-sport mode, such as a touring mode, where vehicle performance is reduced as compared to when the vehicle is operated in a sport mode.

Between time T23 and time T24, an upshift is performed in response to the upshift request and the upshift is performed with a shorter upshift duration and at requested engine torque. The vehicle stability metric is increases as time approaches time T23.

At time T24, another transmission upshift is requested. The battery SOC remains below threshold 1004 so the electrical machine may absorb torque from the driveline and convert the torque into electrical energy that is stored in the battery or electric energy storage device. In this example, the electric machine's capacity to store charge during the upshift is less than the amount of energy provided during the upshift so driveline torque at the vehicle wheels is reduced via increasing a duration of the upshift. Nevertheless, the amount of torque absorbed by the electric machine is a higher level. Engine spark is not retarded at time T24 so that engine torque is available quickly. Such driveline operation may be provided when the vehicle is operating in a sport mode, such as a sport mode, where vehicle performance is increased as compared to when the vehicle is operated in a touring mode.

Thus, vehicle stability may be improved in different ways during different vehicle operating conditions. For example, vehicle stability may be improved via increasing upshift duration so that less torque may be provided to vehicle wheels while vehicle stability is decreasing. In addition, transmission output torque may be absorbed via an electric machine or reduced via engine spark retard in response to lower vehicle stability. By reducing wheel torque, the possibility of further decreasing vehicle stability may be reduced. Further, driveline torque disturbances that may occur due to shifting may be reduced to improve vehicle drivability. In some examples, the vehicle stability may be adjusted via shift duration, engine torque, and electric machine torque so that vehicle stability may approach, but not exceed, a vehicle stability threshold or limit.

Figure 11:
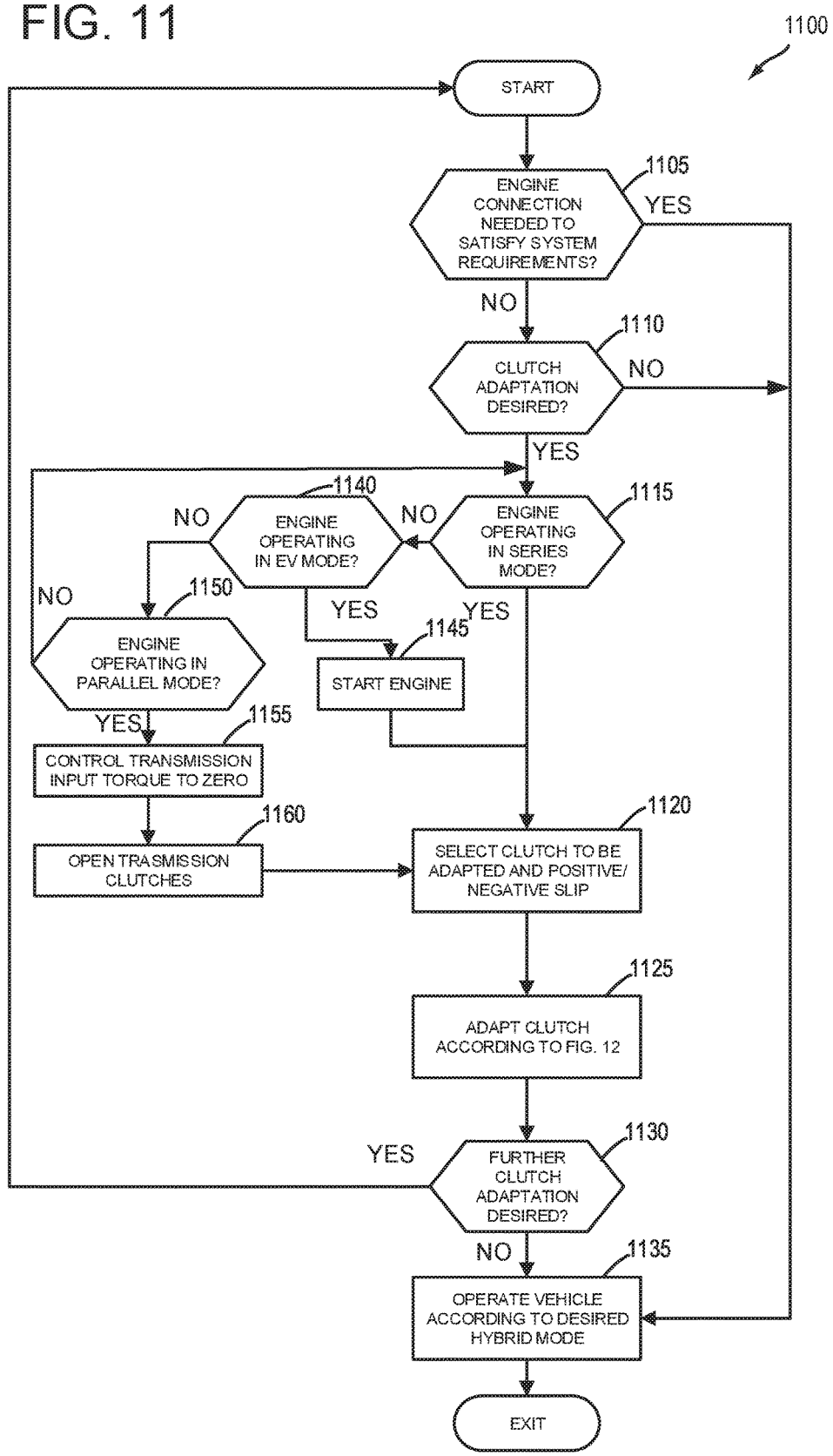
FIGS. 11 and 12 are flowcharts for a method to adapt clutches of a dual clutch transmission operating in a driveline of a hybrid vehicle.
Figure 12:
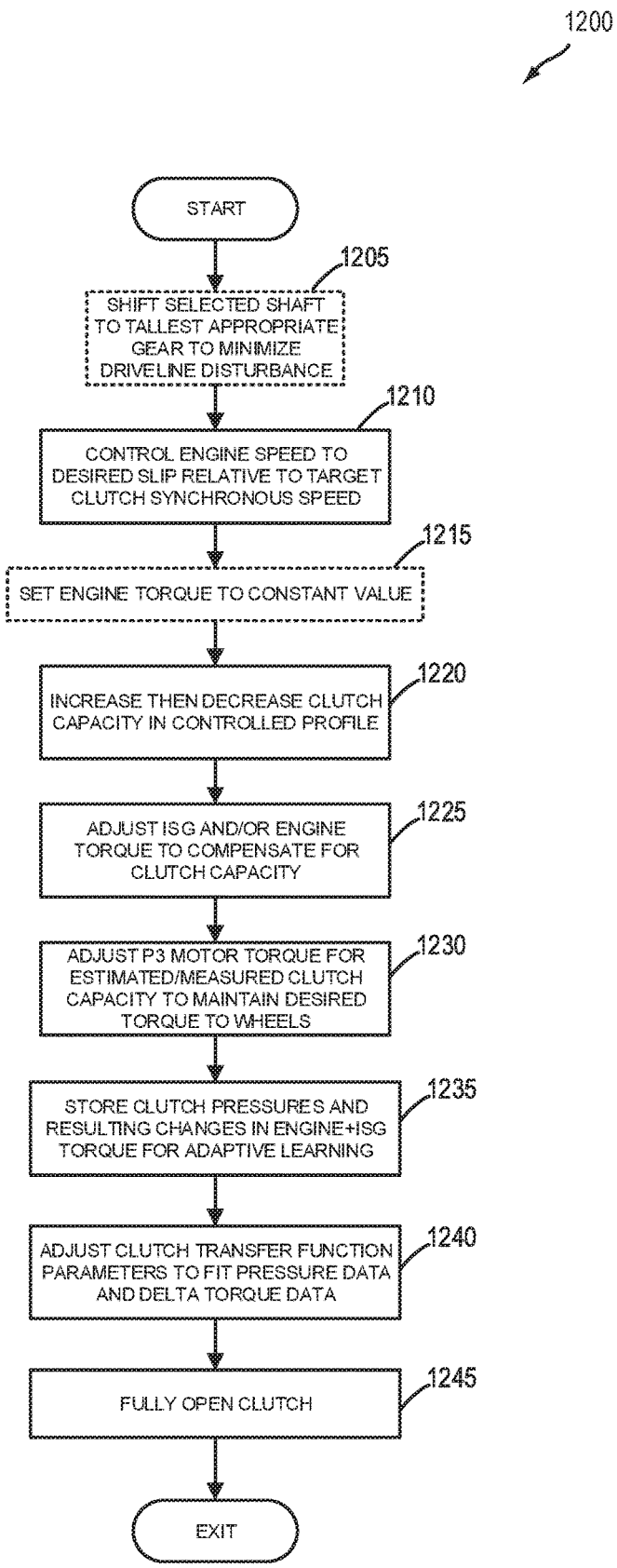

Referring now to FIGS. 11 and 12, a method for adapting clutches of a transmission is shown. The method of FIGS. 11 and 12 may be incorporated into the system of FIGS. 1A-4 as executable instructions stored in non-transitory memory of one or more controllers. Additionally, portions of the method of FIGS. 11 and 12 may be actions performed via the controllers shown in FIGS. 1A-4 to transform a state of a device or actuator in the real world. The method shown in FIGS. 11 and 12 may operate in conjunction and cooperation with other methods described herein. The method of FIGS. 11 and 12 may be applied to adapt transfer functions of clutches 126 and 127 shown in FIG. 4.

At 1105, method 1100 judges if the engine is to be connected to the wheels to satisfy vehicle operating requirements. For example, the engine may be connected to the wheels if a desired or driver demanded wheel torque is greater than a threshold level. However, the engine may be decoupled from the wheels if the desired or driver demanded wheel torque is less than the threshold level. If method 1100 judges that the engine is to be connected to the wheels to satisfy vehicle operating requirements, the answer is yes and method 1100 proceeds to 1135. Otherwise, the answer is no and method 1100 proceeds to 1110.

At 1110, method 1100 judges if clutch adaptation is desired. Clutch adaptation may be desired after the vehicle has been driven a threshold distance. Further, clutch adaptation may be desired if the vehicle driveline accelerates or decelerates more or less than is desired while the clutch is being closed. In other instances, clutch adaptation may be desired if the vehicle in which the clutch operates has not been driven for an extended period of time. If method 1100 judges that clutch adaptation is desired, the answer is yes and method 1100 proceeds to 1115. Otherwise, the answer is no and method 1100 proceeds to 1135.

At 1115, method 1100 judges if the hybrid vehicle driveline is operating in a series mode. Method 1100 may judge that the hybrid vehicle driveline is operating in a series mode when the engine is running and combusting fuel with clutches of the transmission open. Further, torque from an electric machine (e.g., 120) may be propelling the vehicle that includes the engine. Sensors (e.g., synchronizer position sensors) within the transmission may indicate the position of transmission clutches. If method 1100 judges that the hybrid vehicle driveline is operating in a series mode, the answer is yes and method 1100 proceeds to 1120. Otherwise, the answer is no and method 1100 proceeds to 1140.

At 1140, method 1100 judges if the hybrid driveline is operating in an electric only propulsion mode or electric vehicle mode. Method 1100 may judge that the hybrid driveline is operating in an electric only propulsion mode if the engine is stopped rotating (e.g., not combusting air and fuel) and an electric machine positioned in the driveline is providing torque to propel or slow the vehicle. If method 1100 judges that the hybrid driveline is operating in an electric only propulsion mode, the answer is yes and method 1100 proceeds to 1145. Otherwise, the answer is no and method 1100 proceeds to 1150.

At 1145, method 1100 starts the engine and accelerates the engine to a desired speed (e.g., a speed within a threshold speed above or below a speed of the transmission input shaft speed that is rotating at a higher speed of the two transmission input shaft speeds). Alternatively, engine speed may accelerate to engine idle speed. The engine is operated in a speed control mode to achieve the desired engine speed. Method 1100 proceeds to 1120.

At 1150, method 1100 judges whether or not the hybrid driveline is operating in a parallel mode. Method 1100 may judge that the hybrid driveline is operating in a parallel mode when the engine is coupled to the vehicle wheels through a closed clutch. Further, the electric machine (e.g., 120) may be providing torque to the driveline. If method 1150 judges that the hybrid driveline is operating in a parallel mode, the answer is yes and method 1100 proceeds to 1155. Otherwise, the answer is not and method 1100 returns to 1115.

At 1155, method 1100 adjusts torque input to the transmission to substantially zero torque (e.g., +10 N-m). Torque input to the transmission may be adjusted via adjusting engine torque or adjusting torque of the electric machine positioned downstream of the transmission. Engine torque may be adjusted via adjusting a position of a throttle or other torque actuator. Method 1100 proceeds to 1160.

At 1160, method 1100 opens transmission clutches to decouple the engine from the vehicle wheels. The transmission clutches are opened so that no torque is transferred across the clutches. Method 1100 proceeds to 1120.

At 1120, method 1100 selects which clutch is to be adapted. In one example, method 1100 first selects the first clutch (e.g., 126). After the first clutch is adapted, then the second clutch (e.g., 127) is adapted. However, in other examples, the clutch selected to be adapted is a clutch that provides a torque transfer capacity that is different than may be expected. Method 1100 proceeds to 1125 after the clutch to be adapted is selected.

At 1125, method 1100 adapts the selected clutch according to the method of FIG. 12. In particular, a transfer function that describes operation of the clutch may be adapted to improve clutch engagement and disengagement. The vehicle may be traveling on a road and be propelled solely from torque provided by the electric machine positioned downstream of the transmission when clutch adaptation is performed. Method 1100 proceeds to 1130 after adapting the selected clutch.

At 1130, method 1100 judges if adaptation of other clutches is desired. Alternatively, the same clutch may be adapted a second time to confirm the adaptation process. If method 1100 judges that additional clutch adaptation is desired, the answer is yes and method 1100 returns to 1115. Otherwise, the answer is no and method 1100 proceeds to 1135.

At 1135, method 1100 operates the hybrid driveline according to a desired mode and adapted transfer functions for transmission clutches. The desired hybrid mode may be based on driver demanded wheel torque, battery SOC, and other vehicle operating conditions. The hybrid driveline may operate in electric only mode, series hybrid vehicle mode, and parallel hybrid vehicle mode. If the hybrid driveline is operated in electric vehicle only mode in response to vehicle operating conditions, engine rotation is stopped and the engine ceases combusting fuel and air. If the hybrid driveline is operated in series mode in response to vehicle operating conditions, the engine continues combusting fuel and air and the transmission clutches are open. If the hybrid driveline is operated in a parallel mode in response to vehicle operating conditions, the engine speed is controlled to a synchronous speed with one of the transmission input shafts and a transmission clutch is closed. Method 1100 proceeds to exit after the hybrid driveline is operating in a desired mode responsive the vehicle operating conditions.

Referring now to FIG. 12, method 1200 optionally shifts the transmission into a tallest gear or the gear with the highest gear number at 1205. For example, if the transmission is a six speed transmission, method 1200 may shift the gear into sixth gear. The transmission may be shifted into gear by repositioning transmission shifting forks. Method 1200 proceeds to 1210.

At 1210, method 1200 controls engine speed to provide a desired speed difference between a desired speed of the transmission input shaft connected to the clutch being adapted and engine speed. The engine is operated in a speed control mode. In speed control mode, engine speed follows a desired speed, which may be constant or varying, while engine torque is varied to achieve the desired engine speed. Engine speed may be controlled to a speed above or below the desired speed of the transmission input shaft. In some examples, the desired transmission input shaft speed may be a function of the engaged gear and vehicle speed. Also, torque of an integrated starter/generator coupled to the engine may be adjusted to zero. Method 1200 proceeds to 1215.

At 1215, method 1200 optionally moves the engine from speed control mode to a torque control mode. In torque control mode, the engine torque follows a desired torque while engine speed is allowed to vary. In one example, engine torque is commanded to a torque that maintains engine speed at the desired speed mentioned at 1210. If the engine is commanded to a torque control mode, the integrated starter/generator is commanded to a speed control mode. Integrated starter/generator speed and engine speed are controlled to a speed above or below a speed of a transmission input shaft coupled to the clutch that is being adapted. Method 1200 proceeds to 1220.

At 1220, method 1200 increases and then decrease torque capacity of the clutch selected to be adapted by adjusting a clutch torque capacity command. The clutch torque capacity command may be converted into a clutch application pressure (e.g., a pressure of fluid supplied to the clutch). The clutch application pressure may then be converted into a command to adjust a pressure control valve or a pump as discussed in FIG. 13. Further, method 1200 determines actual pressure of fluid supplied to the clutch to adjust the torque capacity of the clutch. The clutch torque capacity is an amount of torque the clutch may transfer from the input side of the clutch to the output side of the clutch or vice-versa. The clutch torque capacity may be increased from a small value to a large value and the decreased from the large value to the small value. Method 1200 proceeds to 1225.

At 1225, method 1200 adjusts torque of the engine and/or the integrated starter/generator to compensate for adjusting the clutch torque capacity. The engine torque and/or integrated starter/generator torque are adjusted simultaneously as the clutch torque capacity is adjusted. The engine and/or integrated starter/generator torque are adjusted as discussed in FIGS. 14A and 14B so that speed of the transmission input shaft coupled to the clutch being adapted is maintained at a speed that is based on vehicle speed and the engaged transmission gear. For example, if the engine is in a torque control mode and providing a constant amount of torque, torque of the integrated starter/generator is adjusted to maintain engine and motor speed at the desired engine speed. If the engine is in a speed control mode and integrated starter/generator torque is zero or a constant value, engine torque is adjusted to maintain engine speed at the desired engine speed. Method 1200 proceeds to 1230.

At 1230, method 1200 adjusts torque of the electric machine positioned downstream of the transmission (e.g., 125) to maintain a desired wheel torque. The electric machine torque is adjusted responsive to the torque transferred via the clutch being adapted, and the torque transferred via the clutch being adapted may be estimated based on the change in engine torque or the change in integrated starter/generator torque. For example, if engine torque or integrated starter/generator torque is increased to maintain engine speed, torque of the electric machine positioned downstream of the transmission is decreased by a corresponding amount to compensate for torque transferred from the engine to the transmission input shaft via the clutch. Similarly, if engine torque or integrated starter/generator torque is decreased to maintain engine speed, torque of the electric machine positioned downstream of the transmission is increased by a corresponding amount to compensate for torque transferred from the transmission input shaft to the engine via the clutch. The electric machine torque is adjusted while the clutch is being applied and released and while engine and integrated starter/generator torque is adjusted. Method 1200 proceeds 1235.

At 1235, method 1200 stores values of clutch pressures and change in engine and/or integrated starter generator torque measured during application and release of the clutch for the commanded clutch torque capacities to controller memory. Method 1200 proceeds to 1240.

At 1240, method 1200 adjusts clutch transfer function values that describe the relationship between clutch fluid application pressure and torque change of the engine and/or integrated starter generator. The torque change of the engine and/or the integrated starter generator is an estimate of the clutch torque capacity. In one example, the values are stored in a table or function that may be described as a transfer function that relates clutch fluid application pressure (e.g., pressure of fluid supplied to the clutch being adapted) to clutch torque capacity. The old values in the transfer function may be replaced by new values or the transfer function may be revised based on an average of the old values and the new values. Method 1200 proceeds to 1245.

At 1245, method 1200 fully opens the clutch being adapted. Method 1200 proceeds to exit after the clutch being adapted is opened.

Figure 13:
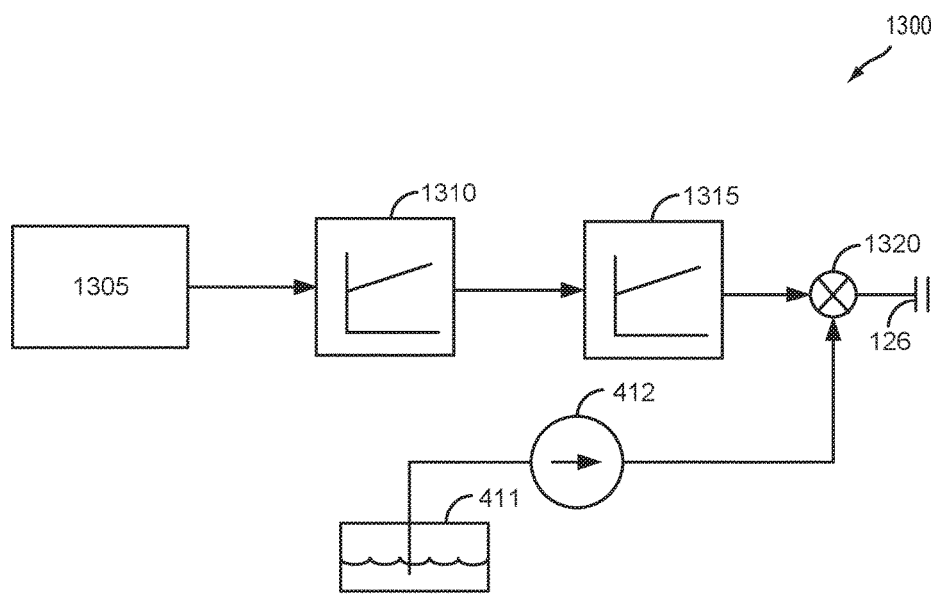
FIG. 13 is a block diagram showing how a clutch is engaged or disengaged.

Referring now to FIG. 13, a block diagram showing a transfer function and how it may be applied to control a clutch is shown. A requested clutch torque transfer capacity 1305 is used to index transfer function 1310. The requested torque transfer capacity (e.g., an amount of torque a clutch may transfer from its input to its output) may originate from an empirically determined clutch application profile stored in memory or from an analytical solution. Transfer function 1310 describes a relationship between a torque transfer capacity and a pressure applied to the clutch to provide the torque transfer capacity. The relationship may be described by a curve or a series of points that may be interpolated between. The transfer function may be adapted by replacing inaccurate values of the transfer function with more accurate values. For example, as described elsewhere herein torque transferred across the clutch may be estimated via determining an amount of torque provided by a motor to hold one side of the clutch at a steady substantially constant (e.g., ±50 RPM) speed while the clutch is closed and clutch pressure is monitored. In particular, for a given clutch pressure, the motor outputs a torque, which may be determined from motor current, to hold the clutch at a steady substantially constant speed. The torque estimate from the motor may replace a torque value in transfer function 1310 that corresponds to the clutch application pressure that resulted in the torque value determined from the motor. The output of transfer function 1310 is input to a second transfer function 1315.

Transfer function 1315 converts the pressure output from transfer function 1310 to a duty cycle or other valve position command. The valve position command is output to valve 1320. Valve 1320 controls a supply of fluid to clutch 126 shown in FIG. 4. Transmission pump 412 supplies fluid from transmission sump 411 to pressure control valve 1320. It should be noted that in some examples, the clutch torque transfer capacity may be converted directly into a valve command via a single transfer function. Such a transfer function may be adapted in a similar way. Hydraulic fluid is supplied to clutch 127 via a similar system having similar components and a similar configuration. Transmission pump 412 may be electrically or engine driven.

Figure 14A:
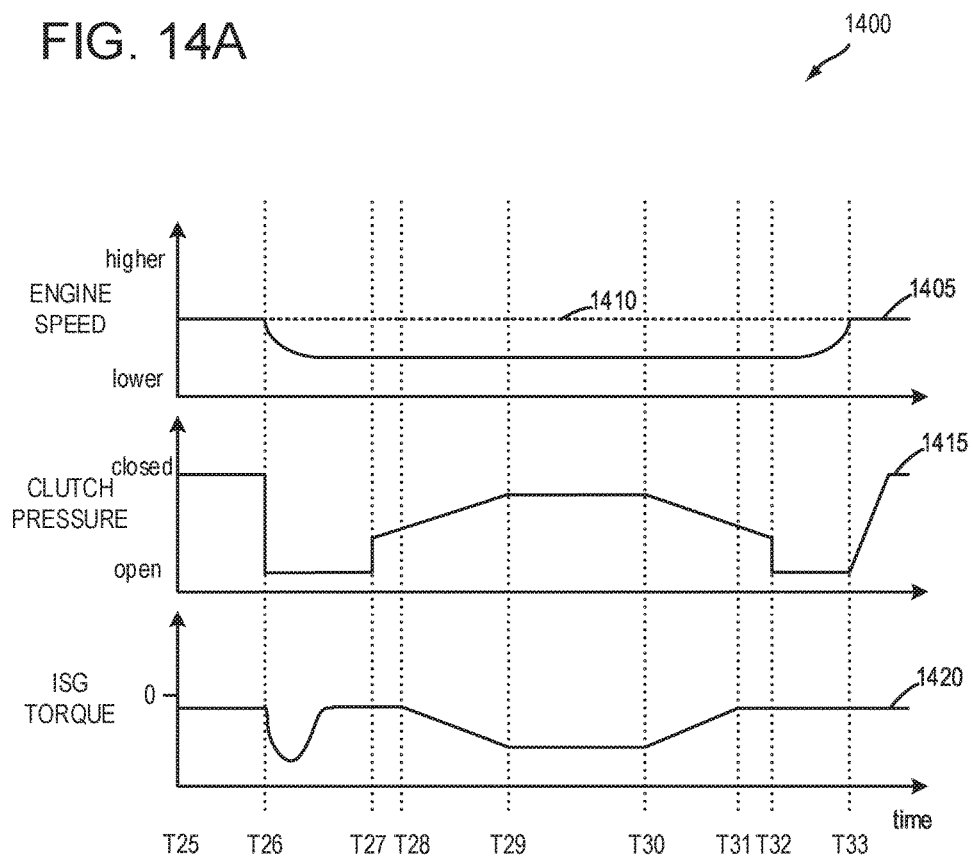
FIGS. 14A and 14B are simulated sequences for adapting clutches of a dual clutch transmission of a hybrid vehicle driveline.

Turning to FIG. 14A, an example timeline 1400 is shown for conducting a clutch adaptation operation, according to methods 1100 and 1200 described herein, and as applied to the systems described herein and with reference to FIGS. 1A-4. Timeline 1400 includes plot 1405, indicating engine speed, over time. Line 1410 represents transmission input shaft (e.g. 402, 404) speed to a dual clutch transmission (e.g. 125). Timeline 1400 further includes plot 1415, indicating a clutch pressure, over time, where clutch pressure may range from a higher pressure that closes (e.g. locked) the clutch, to a lower pressure that opens (e.g. completely unlocked) the clutch, over time. Timeline 1400 further includes plot 1420, indicating an integrated starter/generator (ISG) (e.g. 142) torque, over time. Alternatively, engine torque may be controlled similarly.

In the following description, it may be understood that the dual clutch transmission in which the clutch adaptation operation is being performed may include a first clutch (e.g. 126), and a second clutch (e.g. 127). Furthermore, it may be understood that the dual clutch transmission may include a first input shaft (e.g. 402), and a second input shaft (e.g. 404). The clutch adaptation operation may be conducted on either the first clutch, where input shaft speed illustrated in FIG. 14A may correspond to the first input shaft, or on the second clutch, where input shaft speed illustrated in FIG. 14A may correspond to the second input shaft. For simplicity, a single clutch pressure and a single input shaft speed is indicated, thus it may be understood that the clutch adaptation operation is being performed on one clutch, where the input shaft speed thus corresponds to that one clutch. For clarity, the clutch being adapted in example timeline 1400 may be understood to be first clutch (e.g. 126), where the input shaft speed corresponds to the first input shaft (e.g. 402).

At time T25, the engine is rotating at a constant speed. The first clutch is closed, thus engine torque is being transmitted to vehicle wheels via the first clutch, to a vehicle driveline, through the first input shaft. ISG torque is slightly negative, thus the ISG is operating in a generator mode of operation. Thus, it may be understood that at time T25 the vehicle is being operated in a parallel mode of hybrid electric vehicle operation.

At time T26, first clutch pressure is reduced to 0, thus opening the clutch. Responsive to the opening of the clutch, it may be understood that the vehicle may be operating in a series mode of hybrid electric vehicle operation. Between time T26 and T27, engine speed is reduced to below the first input shaft speed. The engine speed is reduced via reducing engine torque and increasing the amount of negative torque applied to the engine for a duration of time, via the ISG, before the negative torque applied to the engine is returned to the initial negative torque. In other words, the load on the engine is increased via the ISG for a duration between time T26 and T27, before returning to the initial ISG-determined load.

At time T27, first clutch pressure is raised to above zero, but below a touchpoint where clutch capacity may be measurable. The amount by which the clutch pressure is raised above zero at time T27 may in some examples be a function of part-to-part variability and change over time).

Between time T27 and T28, first clutch pressure is slowly increased, or raised up. At time T28, the first clutch begins to carry capacity, where carrying capacity may refer to the engine being coupled to a measurable amount to the first input shaft, via the first clutch. In other words, the torque capacity of the first clutch is increased. Negative ISG torque is increased to regulate engine speed in the presence of increasing clutch capacity. Engine torque may be kept constant to improve accuracy of the torque change measurement. In other words, since increasing torque capacity of the clutch tends to increase torque at the engine due to the first input shaft speed being greater than engine speed, excess torque that would accelerate the engine may instead be absorbed by the ISG to maintain engine speed constant. As such, between time T28 and T29, while clutch capacity is increased, magnitude of negative ISG torque increases accordingly.

Between time T29 and T30, clutch pressure is held constant, and as such, negative ISG torque is indicated to be constant. In other words, a constant amount of excess torque resulting from the difference in input shaft speed and engine speed may be absorbed by the ISG operating in the regenerative mode.

At time T30, first clutch pressure begins to be decreased. Between time T30 and T31, while clutch capacity is decreased, excess torque due to input shaft speed being greater than engine speed becomes less and less, as the first input shaft becomes decoupled from the engine.

At time T31, clutch pressure reduces to a point of no measurable clutch capacity. The point at which clutch pressure reaches no measurable clutch capacity may be the same as the clutch pressure indicated at time T27, for example. Between time T31 and T32, clutch pressure is further reduced, and at time T32 clutch pressure reduces to zero, thus fully opening the first clutch.

Between time T32 and T33, engine speed is controlled to match the desired input shaft speed by operating the engine in a speed control mode, responsive to a desired return to parallel hybrid electric vehicle operation, as discussed above. At time T33, responsive to engine speed matching the first input shaft speed, the first clutch may be closed to connect the engine to the first input shaft.

Figure 14B:
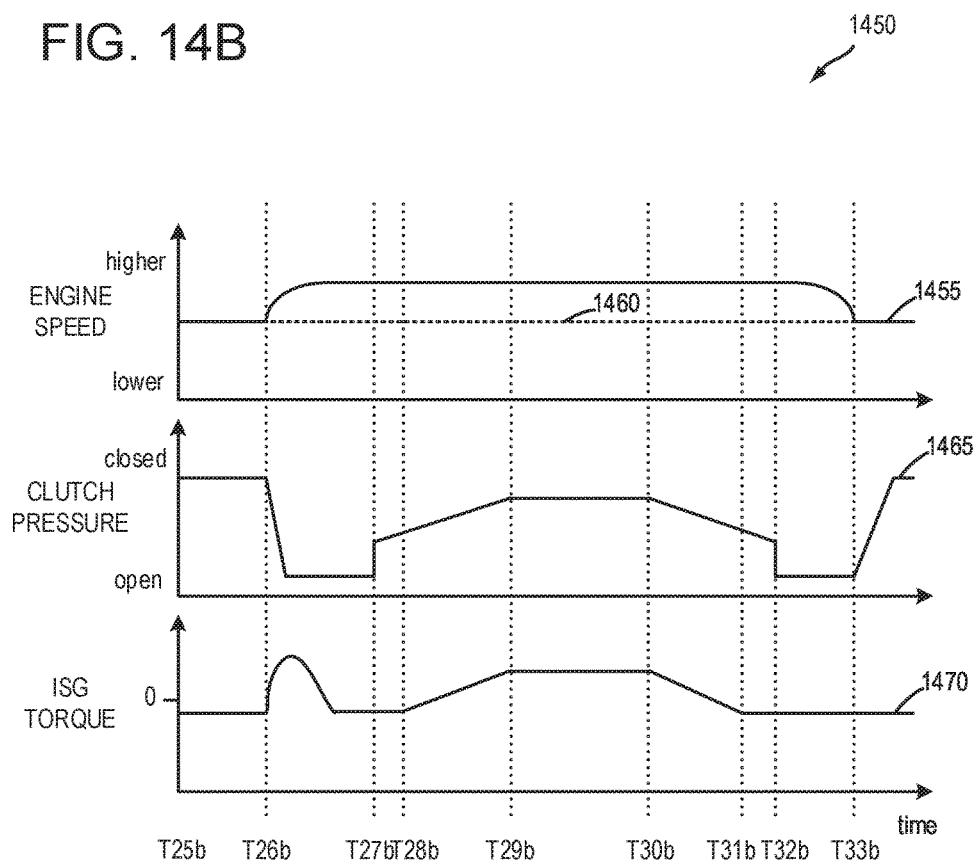

Turning now to FIG. 14B, an example timeline 1450 is shown for conducting a clutch adaptation operation, according to methods 1100 and 1200 described herein, and as applied to the systems described herein and with reference to FIGS. 1A-4. Timeline 1450 includes plot 1455, indicating engine speed, over time. Line 1460 represents transmission input shaft (e.g. 402, 404) speed to a dual clutch transmission (e.g. 125). Timeline 1450 further includes plot 1465, indicating a clutch pressure, over time, where clutch pressure may range from closed (e.g. locked), or open (e.g. completely unlocked), over time. Timeline 1450 further includes plot 1470, indicating an integrated starter/generator (ISG) (e.g. 142) torque, over time. Timeline 1450 is essentially the same as FIG. 14A, except that instead of engine speed being controlled to below input shaft speed, engine speed is controlled to above input shaft speed. Aspects of timeline 1450 that are different from timeline 1400 as a result of controlling engine speed to be above input shaft speed will be discussed in the description below, accordingly.

In the following description, similar to that described above for FIG. 14A, it may be understood that the dual clutch transmission in which the clutch adaptation operation is being performed may include a first clutch (e.g. 126), and a second clutch (e.g. 127). Furthermore, it may be understood that the dual clutch transmission may include a first input shaft (e.g. 402), and a second input shaft (e.g. 404). The clutch adaptation operation may be conducted on either the first clutch, where input shaft speed illustrated in FIG. 14B may correspond to the first input shaft, or on the second clutch, where input shaft speed illustrated in FIG. 14B may correspond to the second input shaft. For simplicity, a single clutch pressure and a single input shaft speed is indicated, thus it may be understood that the clutch adaptation operation is being performed on one clutch, where the input shaft speed thus corresponds to that one clutch. For clarity, the clutch being adapted in example timeline 1450 may be understood to be first clutch (e.g. 126), where the input shaft speed corresponds to the first input shaft (e.g. 402).

At time T25$b$, the engine is rotating at a constant speed. The first clutch is closed, thus engine torque is being transmitted to vehicle wheels via the first clutch, to a vehicle driveline, through the first input shaft. ISG torque is slightly negative, thus the ISG is operating in a generator mode of operation. Thus, it may be understood that at time T25$b$ the vehicle is being operated in a parallel mode of hybrid electric vehicle operation.

At time T26$b$, first clutch pressure is reduced to 0, thus opening the clutch. Responsive to the opening of the clutch, it may be understood that the vehicle may be operating in a series mode of hybrid electric vehicle operation. Between time T26$b$ and T27$b$, engine speed is increased to above the first input shaft speed. The engine speed is increased via increasing the amount of torque (positive torque) applied to the engine for a duration of time, via the ISG, before the torque applied to the engine is returned to the initial negative torque. In other words, the ISG may provide an increased torque to the engine in order to raise engine speed above input shaft speed between time T26$b$ and T27$b$. Additionally, engine may be in a speed control mode where engine torque is increased to increase engine speed to the desired engine speed.

At time T27$b$, first clutch pressure is raised to above zero, but below a touchpoint where clutch capacity may be measurable. The amount by which the clutch pressure is raised above zero at time T27$b$ may in some examples be a function of part-to-part variability and change over time).

Between time T27$b$ and T28$b$, first clutch pressure is slowly increased, or raised up. At time T28$b$, the first clutch begins to carry capacity, where carrying capacity may refer to the engine being coupled to a measurable amount to the first input shaft, via the first clutch. ISG torque provided to the engine (positive torque) is increased to regulate engine speed in the presence of clutch capacity increasing. Engine torque may be kept constant to improve accuracy of the torque change measurement. In other words, since increasing torque capacity of the clutch tends to decrease torque at the engine due to the first input shaft speed being lower than engine speed, a torque deficit that would decelerate the engine may instead by filled in by increasing ISG torque to maintain engine speed constant. As such, between time T28$b$ and T29$b$, while clutch capacity is increased, positive ISG torque increases accordingly.

Between time T29$b$ and T30$b$, clutch pressure is held constant, and as such, positive torque applied to the engine via the ISG is indicated to be constant. In other words, engine torque is maintained constant even though input shaft speed is below engine speed, via positive torque applied to the engine via the ISG.

At time T30$b$, first clutch pressure begins to be decreased. Between time T30$b$ and T31$b$, while clutch capacity is decreased, the torque deficit due to input shaft speed being less than engine speed becomes less and less, as the first input shaft becomes decoupled from the engine.

At time T31$b$, clutch pressure reduces to a point of no measurable clutch capacity. The point at which clutch pressure reaches no measurable clutch capacity may be the same as the clutch pressure indicated at time T27$b$, for example. Between time T31$b$ and T32$b$, clutch pressure is further reduced, and at time T32$b$ clutch pressure reduces to zero, thus fully opening the first clutch.

Between time T32$b$ and T33$b$, engine speed is controlled to match the desired input shaft speed by operating the engine in a speed control mode, responsive to a desired return to parallel hybrid electric vehicle operation, as discussed above. At time T33$b$, responsive to engine speed matching the first input shaft speed, the first clutch may be closed to connect the engine to the first input shaft.

Referring to the example timelines illustrated in FIGS. 14A-14B, both timelines depicted conditions wherein the vehicle system was operating at least in part via the engine prior to the clutch adaptation procedure, and furthermore, subsequent to the clutch adaptation procedure, the vehicle system was indicated to return to operating at least in part via the engine. However, in some examples, the vehicle system may be operating in an electric-only mode, for example wherein an electric machine (e.g. 120) is solely propelling the vehicle. In such a condition, prior to conducting the clutch adaptation procedure the engine may be first started (with clutches open). Responsive to the engine start, engine speed may be controlled to either below input shaft speed (as discussed with regard to FIG. 14A), or above input shaft speed (as discussed with regard to FIG. 14B). With the engine started, the clutch adaptation procedure may be carried out as described, without modification. After completion of the clutch adaptation procedure, rather than returning to a mode of vehicle operation where the vehicle is propelled at least in part by the engine, as illustrated in FIGS. 14A-14B, an engine shutdown may be carried out, such that the engine may be propelled solely via power from the electric machine, as discussed above.

Figure 15:
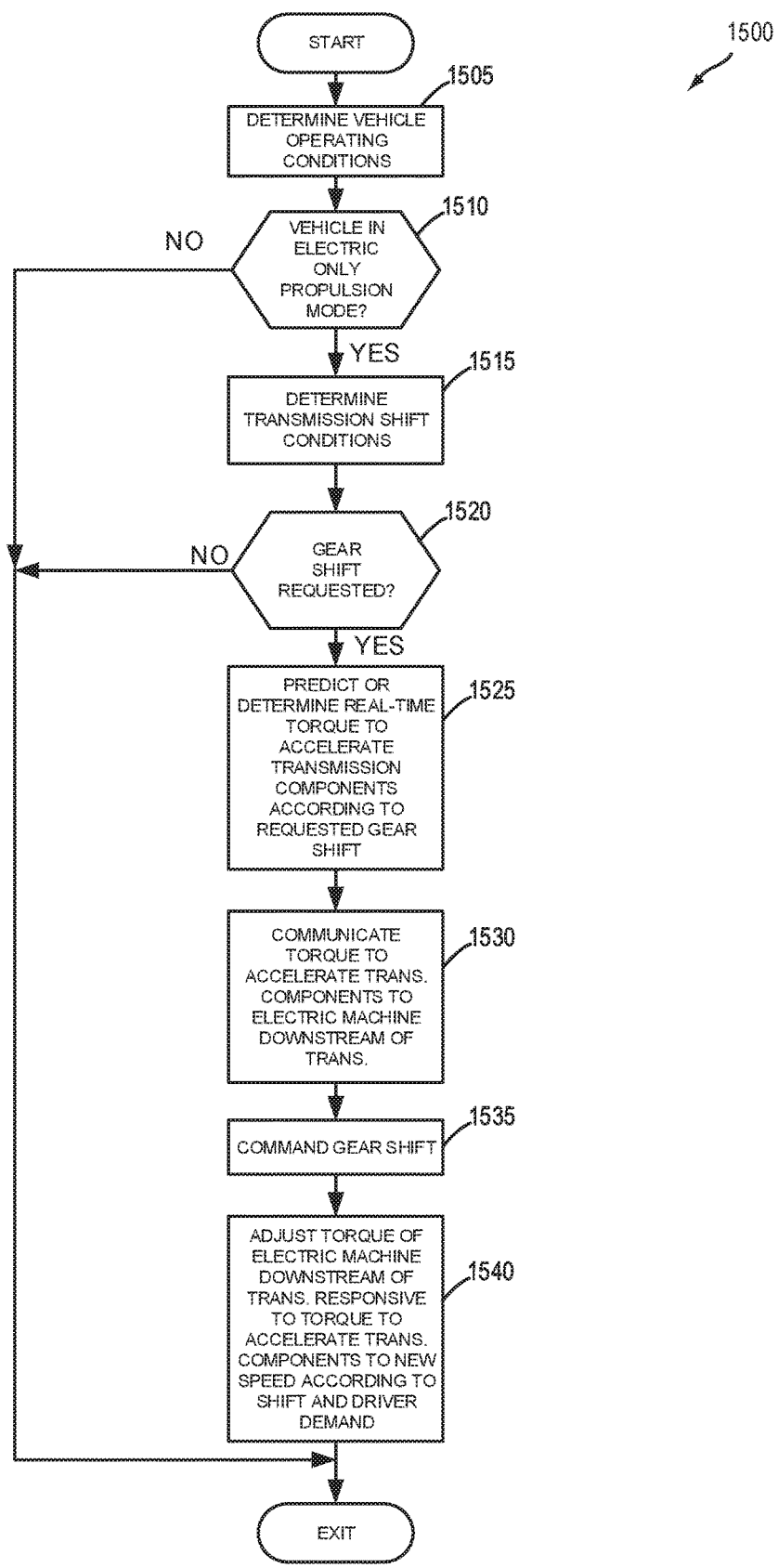
FIG. 15 is a flowchart of a method for shifting a dual clutch transmission of a hybrid vehicle.

Referring now to FIG. 15, a flowchart of a method for operating a driveline of a hybrid vehicle powertrain 100 is shown. The method of FIG. 15 may be incorporated into the system of FIGS. 1A-4 as executable instructions stored in non-transitory memory of one or more controllers. Additionally, portions of the method of FIG. 15 may be actions performed via the controllers shown in FIGS. 1A-4 to transform a state of a device or actuator in the real world. The method shown in FIG. 15 may operate in conjunction and cooperation with other methods described herein.

At 1505, method 1500 determines vehicle operating conditions. Vehicle operating conditions may include but are not limited to gear actuator position, vehicle speed, presently engaged gear, vehicle speed, engine operating conditions, requested wheel torque, and electric machine operating conditions. The vehicle operating conditions may be communicated to a transmission controller via a vehicle system controller or other controllers in the vehicle. Method 1500 proceeds to 1510.

At 1510, method 1500 judges if the vehicle is in an electrical only propulsion mode. The vehicle is propelled solely via torque produced by an electric machine during electric only propulsion mode. In one example, method 1500 may judge that the vehicle is in an electric only propulsion mode if engine speed is zero and the electric machine (e.g., 120 of FIG. 1A) is providing torque to propel the vehicle. The engine is not combusting air and fuel. Further, both clutches of dual clutch transmission (e.g., 125) are in an open state. In other examples, a value of a bit or byte in memory may provide an indication of vehicle mode. If method 1500 judges that the vehicle is in electric only propulsion mode, the answer is yes and method 1500 proceeds to 1515. Otherwise, the answer is no and method 1500 proceeds to exit.

At 1515, method 1500 determines conditions for shifting the transmission while the vehicle is in electric only propulsion mode. In one example, the shifting conditions are empirically determined and saved in a shift schedule that is stored in controller memory. The shift schedule indicates when upshift and downshifts are requested. In one example, upshifts and downshifts may be scheduled in response to vehicle speed and desired wheel torque. For example, the transmission may upshift from first gear to second gear at a vehicle speed of 5 KPH when demanded wheel torque is 10 N-m. Method 1500 proceeds to 1520.

At 1520, method 1500 judges if a transmission shift is requested. Method 1500 may make the judgement based on values stored in the transmission shift schedule described at 1515. If method 1500 judges that a transmission shift is requested, the answer is yes and method 1500 proceeds to 1525. Otherwise, the answer is no and method 1500 proceeds to exit.

At 1525, method 1500 predicts or determines in real-time torque to accelerate transmission components according to the on-coming gear (e.g., the gear being shifted into or being engaged). The prediction or determination of torque to accelerate transmission components may be provided as described in FIGS. 16A-16D. In one example, torque to accelerate the transmission components may be determined via the following equation:

$$\text{compensation\_tq} = (\text{estimated\_synchro\_tq})(\text{gear\_ratio})$$

where compensation_tq is the torque to accelerate the transmission components, estimated_synchro_tq is estimated synchronizer torque, and gear_ratio is the ratio of the gear engaged between the electric machine (e.g., 120) and the synchronizer engaging the on-coming gear during the shift. This equation may be applied when the synchronizer torque is known. If the synchronizer torque is not known, the following equations may be applied in some examples:

$$\text{estimated\_input\_acc} = (\text{input\_speed} - \text{last\_input\_speed})/(\text{sample\_time})$$

$$\text{estimated\_synchro\_tq} = (\text{estimated\_input\_acc})(\text{known\_input\_inertia})$$

$$\text{compensation\_tq} = (\text{estimated\_synchro\_tq})(\text{gear\_ratio})$$

where estimated_input_acc is estimated transmission input shaft acceleration, input_speed is present transmission input shaft speed, last_input_speed is last previous transmission input shaft speed, sample_time is transmission input shaft sample time, estimated_synchro_tq is estimated synchronizer torque, known_input_inertia is the known inertia of the transmission components, compensation_tq is the torque to accelerate the transmission components, and gear_ratio is the ratio of the gear engaged between the electric machine (e.g., 120) and the synchronizer engaging the on-coming gear during the shift. This equation may be applied when the synchronizer torque is unknown. Method 1500 proceeds to 1530 after determining the torque to accelerate transmission components while the transmission is being shifted and the vehicle is in electric only propulsion mode.

At 1530, method 1500 communicates torque to accelerate transmission components from a transmission controller (e.g., 354 in FIG. 3) to other vehicle controllers (e.g., electric machine controller 352 in FIG. 3). Alternatively, vehicle system controller (e.g., 12 of FIG. 3) may communicate the torque to accelerate transmission components to the electric machine controller. The torque to accelerate transmission components is applied by the electric machine controller to compensate the torque to accelerate various transmission components (e.g., layshafts, gears, output sides of clutches, etc.) to wheel speed factoring in axle gearing and any other gearing between the transmission output shaft and the vehicle wheels. For example, if the shift accelerates transmission components to a higher speed, a higher torque is commanded of the electric machine so that vehicle speed is not reduced and a torque disturbance due to accelerating the mass of components in the transmission may not be observed. The higher torque command is based on the torque to accelerate the components of the transmission to the desired speed of the transmission components after the shift, which is the transmission output speed before the shift multiplied by the on-coming gear ratio. In this way, wheel speed may remain substantially constant while the transmission is shifted and the engine is stopped. The beginning of the transmission of the torque to accelerate the transmission components may occur before the actual gear shift to time align the electric machine torque adjustment with the actual shift timing, thereby compensating for data transmission delays. Method 1500 proceeds to 1535.

At 1535, method 1500 commands the gear shift according to the gear shift schedule. Actuators in the transmission move shift forks to engage synchronizers to the on-coming gear in response to the gear shift command. The transmission clutches are open while the vehicle is in electric only propulsion mode so that the electric machine does not waste energy rotating the engine. Method 1500 proceeds to 1540.

At 1540, method 1500 adjusts torque of the electric machine downstream of the transmission (e.g., 125 of FIG. 3) in response to the torque to accelerate the transmission components to a desired speed after the on-coming gear is engaged. Further, the electric machine torque is adjusted responsive to the driver demanded wheel torque. Thus, electric machine torque=driver demand wheel torque times an axle ratio (if present)+the torque to accelerate or decelerate transmission components, the transmission components being accelerated are related to the shift. The torque of the electric machine is adjusted at the same time or simultaneously with the gear shift. Method 1500 proceeds to exit after adjusting electric machine torque.

Figure 16A:
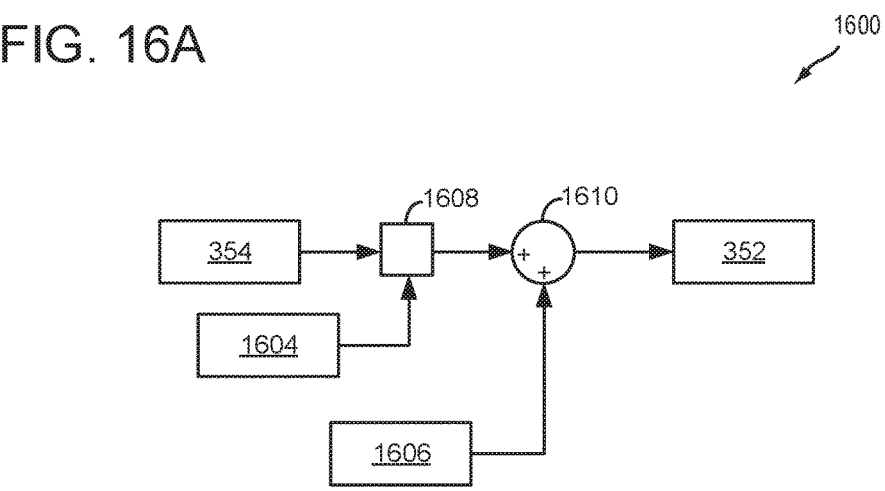
FIGS. 16A-16D are block diagrams of ways to determine compensation torque for shifting a dual clutch transmission of a hybrid vehicle while an engine is stopped and not combusting air and fuel.

Referring now to FIG. 16A, a first block diagram for determining an amount of torque to accelerate transmission components related to a gear shift while the vehicle is in an electric only propulsion mode is shown. The method of block diagram 1600 may be used in the method of FIG. 15.

Transmission controller (e.g., 354 of FIG. 3) outputs an estimated torque to accelerate the transmission components (e.g., synchronizers, gears, layshafts, output side of a clutch, etc.) to multiplier block 1608. For example, if an upshift from third gear to fourth gear of transmission 125 shown in FIG. 4 is scheduled, the speed of on-coming gear is fourth gear (e.g., 426) is changed along with the speed of synchronizer 484, speed of layshaft 442, speed of input shaft 404, and speed of input side of clutch 127 shown in FIG. 4. In one example, the estimated torque to accelerate the transmission components may be the inertia of the components times the angular acceleration from the original speed of the transmission components to the desired speed of the transmission components after the on-coming gear is engaged. The gear ratio between the electric machine and the transmission components being accelerated or decelerated is input at block 1604, which is multiplied by the torque to accelerate the transmission components at block 1608 to provide a compensation torque. The compensation torque is output from block 1608 to summing junction 1610 where it is added to the driver demand torque. The output of summing junction 1610 is provided to the electric machine controller 352 as a torque request of the electric machine.

Figure 16B:
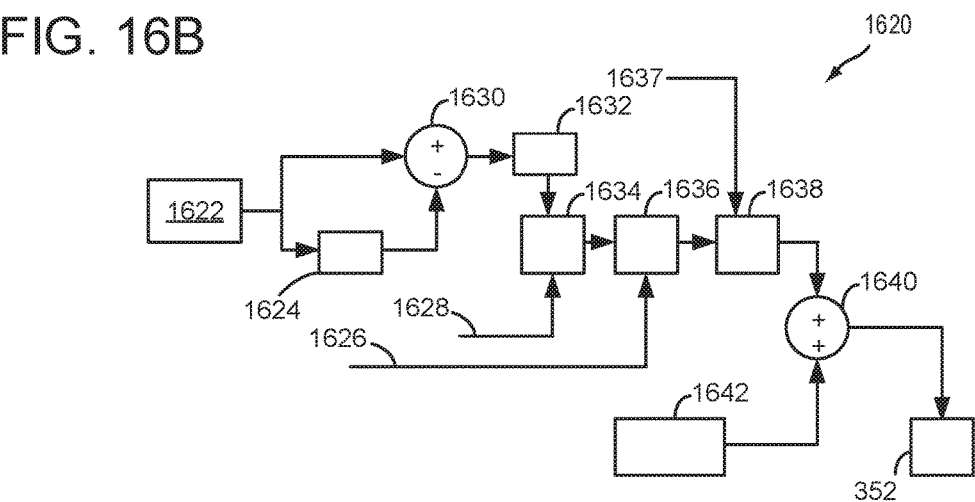

Referring now to FIG. 16B, a second block diagram for determining an amount of torque to accelerate transmission components related to a gear shift while the vehicle is in an electric only propulsion mode is shown. The method of block diagram 1620 may be used in the method of FIG. 15.

Transmission input shaft speed is input at block 1622. A previous value of transmission input shaft speed is stored to memory at block 1604. The previous transmission input shaft speed output from block 1624 is subtracted from the present transmission input shaft speed output from block 1622 at summing junction 1630. The output of summing junction 1630 is input into low pass filter 1632. The output of low pass filter 1632 is input to block 1634 where it is divided by a sample time 1628 of an input shaft speed sensor, which provides the input shaft speed to block 1622. The output of block 1634 is multiplied by the inertia of transmission components being accelerated due to the gear shift 1626 at block 1636. The output of block 1636 is multiplied by a gear ratio between the electric machine and the transmission components being accelerated due to the gear shift 1637 at block 1638. The output of block 1638 is a compensation torque for shifting the transmission to avoid driveline torque disturbances and vehicle speed disturbances. The output of block 1638 is added to the driver demand torque 1642 at summing junction 1640. The output of summing junction 1640 is provided to the electric machine controller 352 as a torque request of the electric machine.

Figure 16C:
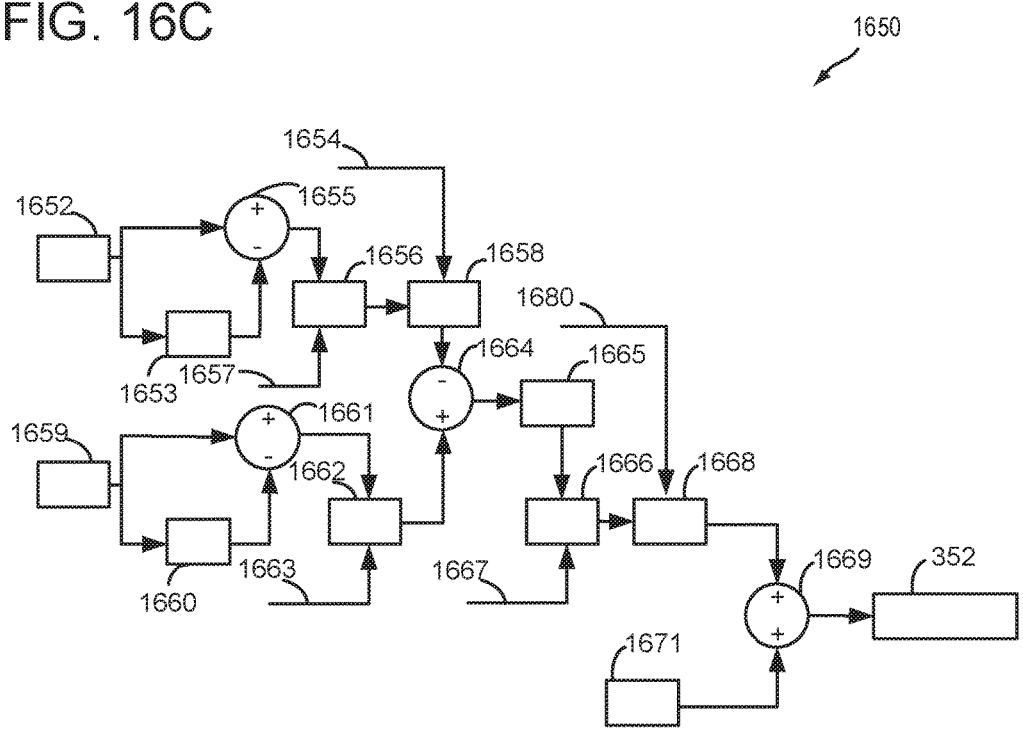

Referring now to FIG. 16C, a third block diagram for determining an amount of torque to accelerate transmission components related to a gear shift while the vehicle is in an electric only propulsion mode is shown. The method of block diagram 1650 may be used in the method of FIG. 15.

Transmission output shaft speed is input at block 1652. A previous value of transmission output shaft speed is stored to memory at block 1653. The previous transmission input shaft speed output from block 1653 is subtracted from the present transmission input shaft speed output from block 1652 at summing junction 1655. The output of summing junction 1655 is input to block 1656 where it is divided by a sample time 1657 of an input shaft speed sensor, which provides the output shaft speed to block 1652. The output of block 1656 is multiplied by a ratio of a previously locked gear ratio (e.g., off-going gear) at block 1658. The output of block 1658 is subtracted from the output of block 1662 at summing junction 1664.

Transmission input shaft speed is input at block 1659. A previous value of transmission input shaft speed is stored to memory at block 1660. The previous transmission input shaft speed output from block 1660 is subtracted from the present transmission input shaft speed output from block 1659 at summing junction 1661. The output of summing junction 1661 is divided by a sample time 1663 of an input shaft speed sensor, which provides the input shaft speed to block 1659. The output of block 1662 is input to summing junction 1664.

The output of summing junction 1664 is input into low pass filter 1665. The output of low pass filter 1665 is input to block 1666 where it multiplied by the inertia of transmission components being accelerated due to the gear shift 1667. The output of block 1666 is multiplied by a gear ratio between the electric machine and the transmission components being accelerated due to the gear shift 1680 at block 1668. The output of block 1668 is a compensation torque for shifting the transmission to avoid driveline torque disturbances and vehicle speed disturbances. The output of block 1668 is added to the driver demand torque 1671 at summing junction 1669. The output of summing junction 1669 is provided to the electric machine controller 352 as a torque request of the electric machine.

Figure 16D:
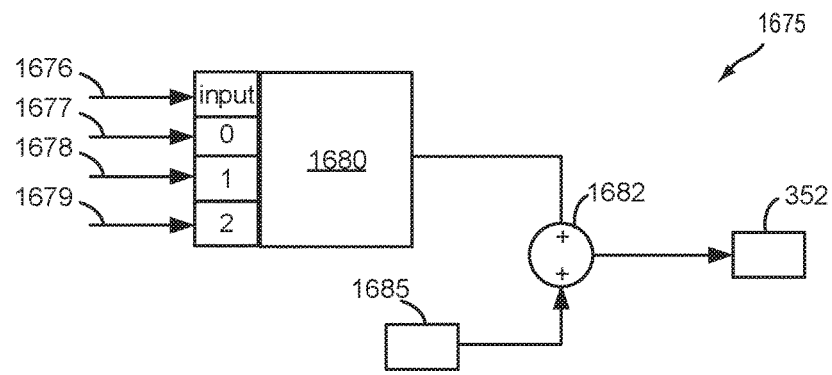

Referring now to FIG. 16D, a fourth block diagram for determining an amount of torque to accelerate transmission components related to a gear shift while the vehicle is in an electric only propulsion mode is shown. The method of block diagram 1675 may be used in the method of FIG. 15.

Block 1680 provides a switch like function to select from predetermined values of positive torque compensation 1678, negative torque compensation 1679, and no torque compensation 1677 (e.g., zero) based on a determination as to whether shifting gears accelerates components of the transmission or decelerates components of the transmission. The determination may be based on whether the shift is an upshift or a downshift. The determination is input to switch 1680 at 1676 and the determination causes block 1680 to output one of 1678, 1679, and 1677 to summing junction 1682. The output of block 1680 is added to the driver demand torque 1685 at summing junction 1682. The output of summing junction 1682 is provided to the electric machine controller 352 as a torque request of the electric machine.

Figure 17A:
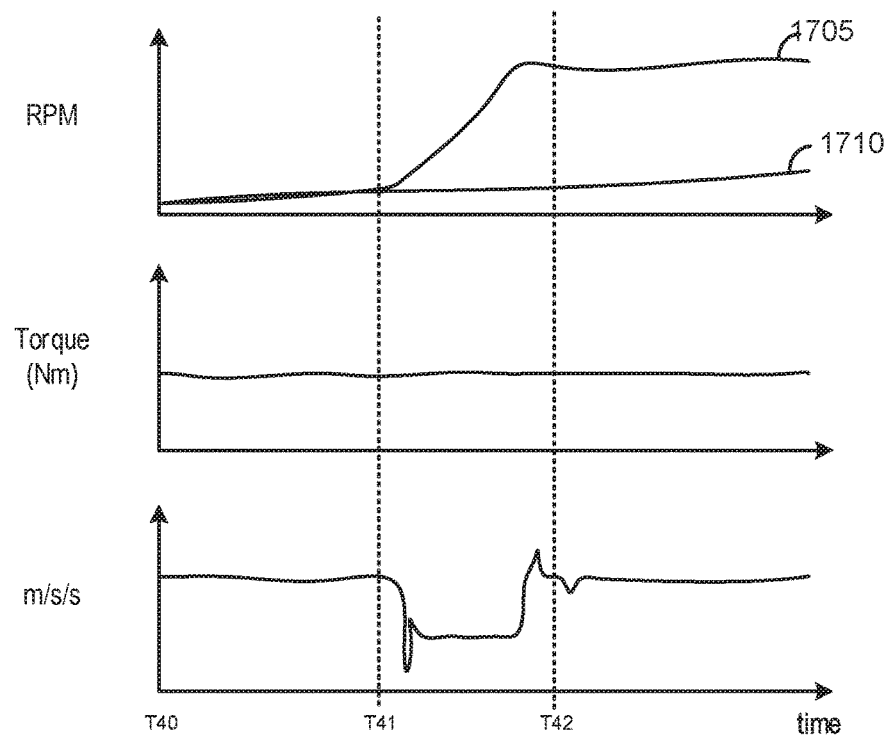
FIGS. 17A and 17B are simulated sequences for shifting a dual clutch transmission of a hybrid vehicle.

Referring now to FIG. 17A, a simulated gear shift without compensating the torque of electric machine positioned downstream of the transmission is shown. The sequence may be provided via the system of FIGS. 1A-4 when torque compensation is not provided while shifting the transmission with the engine is stopped and not combusting air and fuel.

The first plot from the top of FIG. 17A is a plot of transmission input shaft speed versus time. The vertical axis represents transmission input shaft speed and transmission input shaft speed increases in the direction of the vertical axis arrow. The horizontal axis represents time and time increases from the left side of the figure to the right side of the figure. Trace 1705 represents speed of a transmission input shaft that engages with odd gears (e.g., $1^{st}$ gear, $3^{rd}$ gear, and $5^{th}$ gear) (e.g., 402 of FIG. 4). Trace 1710 represents speed of a transmission input shaft that engages with even gears (e.g., $2^{nd}$ gear, $4^{th}$ gear, and $6^{th}$ gear) (e.g., 404 of FIG. 4).

The second plot from the top of FIG. 17A is a plot of electric machine torque versus time. The vertical axis represents electric machine torque and electric machine torque increases in the direction of the vertical axis arrow. The horizontal axis represents time and time increases from the left side of the figure to the right side of the figure.

The third plot from the top of FIG. 17A is a plot of vehicle speed versus time. The vertical axis represents vehicle speed and vehicle speed increases in the direction of the vertical axis arrow. The horizontal axis represents time and time increases from the left side of the figure to the right side of the figure.

At time T40, the transmission input shaft speeds are at a lower level and electric machine torque is at a middle level. Vehicle speed is constant and non-zero. Engine rotational speed is zero and the engine is not combusting air and fuel (not shown).

At time T41, a gear shift is initiated so that transmission input speed is at a desired speed in preparation for an engine start. As the on-coming gear is engaged, the transmission input shaft speed increases responsive to torque provided through the transmission output shaft via the electric machine positioned downstream of the transmission (e.g., 125). The torque of the electric machine is constant since the electric machine is providing the driver demand torque and the driver demand torque has not changed (not shown). However, the vehicle speed is reduced as the transmission input shafts accelerate. The dip in vehicle speed is caused by the net torque delivered to the vehicle wheels decreasing as a portion of the electric machine torque accelerates the transmission's internal components to a new speed that is a function of the present vehicle speed and the engaged transmission gear.

At time T42, the input shafts reach a final speed after the components of the transmission reach a new speed that is a function of vehicle speed and the selected gear ratio. The vehicle speed returns to near its original value before the gear shift and the electric machine torque remains constant.

Thus, without compensating electric machine torque that accelerates transmission components, vehicle speed changes in a way that may not be desired. As such, electric machine torque compensation may be desirable.

Figure 17B:
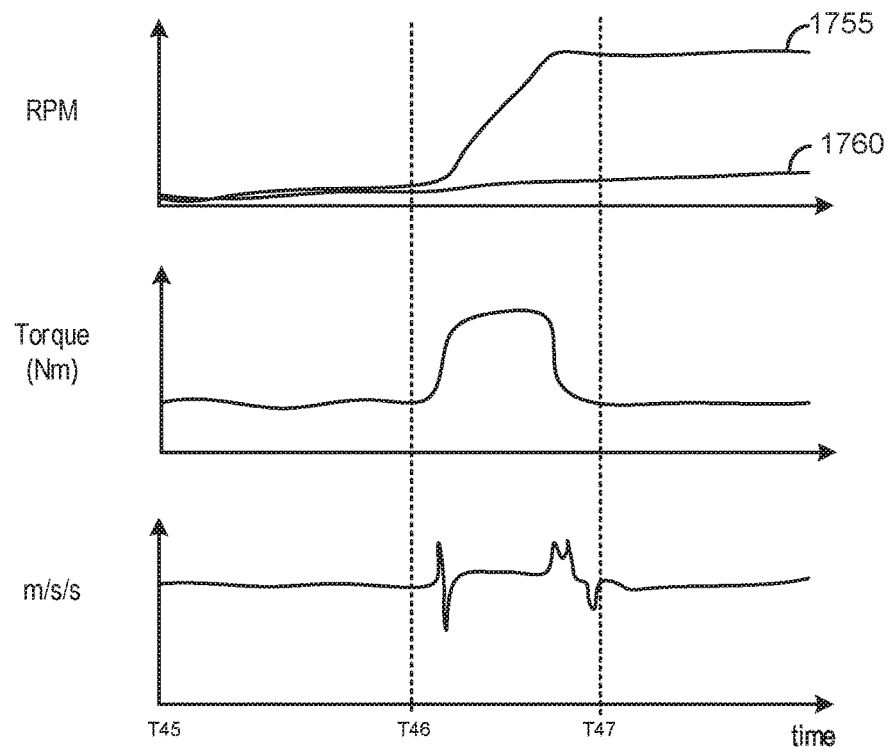

Referring now to FIG. 17B, a simulated gear shift with compensating the torque of electric machine positioned downstream of the transmission is shown. The sequence may be provided via the system of FIGS. 1A-4 and the method of FIG. 15 when torque compensation is provided for shifting the transmission with the engine is stopped and not combusting air and fuel.

The first plot from the top of FIG. 17B is a plot of transmission input shaft speed versus time. The vertical axis represents transmission input shaft speed and transmission input shaft speed increases in the direction of the vertical axis arrow. The horizontal axis represents time and time increases from the left side of the figure to the right side of the figure. Trace 1755 represents speed of a transmission input shaft that engages with odd gears (e.g., $1^{st}$ gear, $3^{rd}$ gear, and $5^{th}$ gear) (e.g., 402). Trace 1760 represents speed of a transmission input shaft that engages with even gears (e.g., $2^{nd}$ gear, $4^{th}$ gear, and $6^{th}$ gear) (e.g., 404).

The second plot from the top of FIG. 17B is a plot of electric machine torque versus time. The vertical axis represents electric machine torque and electric machine torque increases in the direction of the vertical axis arrow. The horizontal axis represents time and time increases from the left side of the figure to the right side of the figure.

The third plot from the top of FIG. 17B is a plot of vehicle speed versus time. The vertical axis represents vehicle speed and vehicle speed increases in the direction of the vertical axis arrow. The horizontal axis represents time and time increases from the left side of the figure to the right side of the figure.

At time T45, the transmission input shaft speeds are at a lower level and electric machine torque is at a middle level. Vehicle speed is constant and non-zero. Engine rotational speed is zero and the engine is not combusting air and fuel (not shown).

At time T46, a gear shift is initiated so that transmission input speed is at a desired speed in preparation for an engine start. As the on-coming gear is engaged, the transmission input shaft speed increases responsive to torque provided through the transmission output shaft via the electric machine (e.g., 120) positioned downstream of the transmission. The torque of the electric machine is increased to compensate for accelerating components of the transmission related to the gear shift. The electric machine torque is equal to demanded wheel torque plus the compensation torque to accelerate transmission components responsive to the transmission gear shift. There is a small change in vehicle speed, but it is significantly less than if no compensation torque is provided.

At time T47, the input shafts reach a final speed after the components of the transmission reach a new speed that is a function of vehicle speed and the selected gear ratio. The compensation torque is zero at this time so electric machine torque is a same torque as before the gear shift.

Thus, providing compensating torque via the electric machine to the driveline may smooth vehicle speed and improve vehicle drivability. The compensation torque may be a predetermined value stored in controller memory or it may be based on present vehicle conditions as described herein.

Figure 18A:
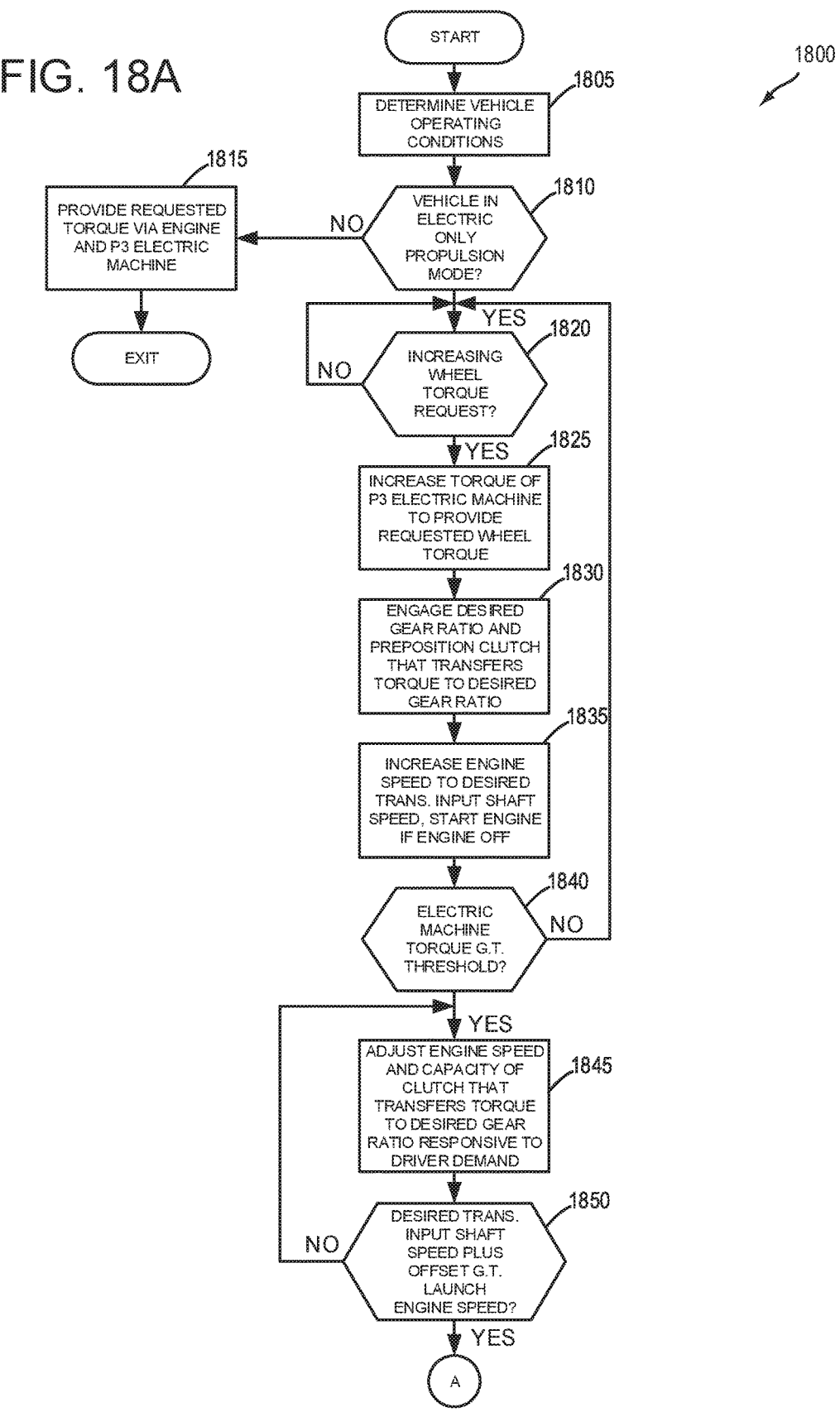
FIGS. 18A and 18B show a flowchart of a method of starting an engine and engaging the engine to a dual clutch transmission.
Figure 18B:
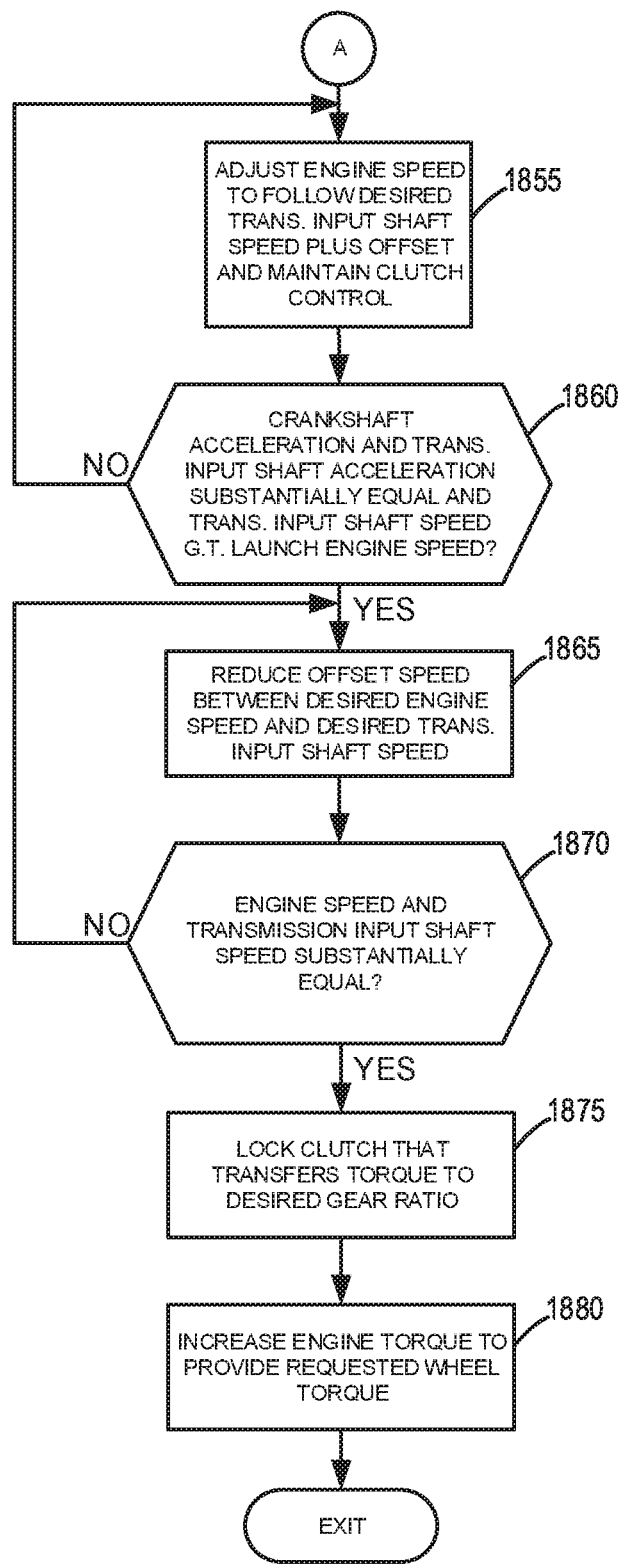

Referring now to FIGS. 18A and 18B, a method for starting an engine that has stopped rotating in a hybrid driveline is shown. The engine may be started while the vehicle in which the engine resides is moving or stationary. The method of FIGS. 18A and 18B may be incorporated into the system of FIGS. 1A-4 as executable instructions stored in non-transitory memory of one or more controllers. Additionally, portions of the method of FIGS. 18A and 18*b* may be actions performed via the controllers shown in FIGS. 1A-4 to transform a state of a device or actuator in the real world. The method shown in FIGS. 18A and 18B may operate in conjunction and cooperation with other methods described herein. The method of FIGS. 18A and 18B may be applied whether first clutch 126 or second clutch 127 is being applied after an engine start.

At 1805, method 1800 determines vehicle operating conditions. Vehicle operating conditions may include but are not limited to engine speed, vehicle speed, driver demanded or desired wheel torque, and torque of the electric machine (e.g., 120) positioned downstream of the transmission. Method 1800 proceeds to 1810.

At 1810, method 1800 judges if the hybrid driveline is operating in an electric only propulsion mode or electric vehicle mode. Method 1800 may judge that the hybrid driveline is operating in an electric only propulsion mode if the engine is stopped rotating and an electric machine positioned in the driveline is providing torque to propel or slow the vehicle. The engine is not combusting air and fuel in electric only mode. If method 1800 judges that the hybrid driveline is operating in an electric only propulsion mode, the answer is yes and method 1800 proceeds to 1820. Otherwise, the answer is no and method 1800 proceeds to 1815.

At 1815, method 1800 provides a desired wheel torque via engine torque or engine torque and electric machine torque. In one example, a portion of the desired or requested wheel torque is provided by allocating a first portion of the desired wheel torque to the engine and a second portion of the desired wheel torque to the electric machine positioned downstream of the transmission. Method 1800 proceeds to exit after providing the desired wheel torque.

At 1820, method 1800 judges if there is an increasing wheel torque request. In one example, method 1800 may judge that there is an increasing wheel torque request if a current sample value of the desired wheel torque is greater than a value of a most recent past sample of the desired wheel torque. If method 1800 judges that there is an increasing wheel torque request, the answer is yes and method 1800 proceeds to 1825. Otherwise, the answer is no and method 1800 proceeds to 1825.

At 1825, method 1800 increases torque of the electric machine downstream of the transmission (e.g., 125) in response to the increasing requested wheel torque. In particular, the electric machine torque may be increased to match the desired wheel torque multiplied by any gear ratio between the electric machine and the wheels and accounting for the wheel rolling radius. Method 1800 proceeds to 1830.

At 1830, method 1800 engages a desired gear ratio and prepositions a clutch that selectively transmits torque to the desired gear ratio. In one example, the desired gear ratio is based on vehicle speed and desired wheel torque. The desired gear ratio may be extracted from a transmission shift schedule stored in memory. The transmission shift schedule is indexed via vehicle speed and desired wheel torque. The transmission shift schedule outputs a gear ratio or desired gear. The clutch that selectively provides torque to the desired gear ratio is prepositioned via a stroking pressure of fluid delivered to the clutch. The stroking pressure may be a pressure that moves clutch plates to a position just before the clutch transfers torque from an input side of the clutch to an output side of the clutch. Method 1800 proceeds to 1835.

At 1835, method 1800 starts the engine if the engine is not started. After the engine is started, or if the engine is combusting air and fuel, the engine speed is adjusted to a desired transmission input shaft speed. The engine speed is accelerated to a speed greater than an engine idle speed. This engine speed may be referred to as an engine launch speed. Increasing engine speed increases the engine's capacity to provide larger torque amounts. If the vehicle in which the engine is operating is moving, engine speed is increased to a desired transmission inputs shaft speed plus a variable offset value. The engine is operated in a speed control mode where engine torque is varied so that engine speed follows a desired engine speed. Method 1800 proceeds to 1840.

At 1840, method 1800 judges if torque of the electric machine positioned in the driveline downstream of the transmission is greater than a threshold value. Method 1800 may estimate the electric machine torque via current entering or exiting the electric machine. If method 1800 judges that electric machine torque is greater than the threshold, the answer is yes and method 1800 proceeds to 1845. Otherwise, the answer is no and method 1800 returns to 1820.

At 1845, method 1800 adjusts engine speed and torque capacity of the clutch that selectively transfers torque to the engaged transmission gear responsive to desired wheel torque or a driver demanded wheel torque. A driver or controller may request wheel torque via an accelerator pedal or a controller variable. For example, if the desired wheel torque continues increasing, the desired engine speed may be increased to increase the engine's torque capacity. Additionally, the torque capacity of the clutch that selectively transfers torque to the engaged gear may be increased as the desired wheel torque increases. Torque capacity of the clutch is increased by increasing pressure of fluid supplied to the clutch. Similarly, if the desired wheel torque decreases, the desired engine speed may be decreased to decrease the engine's torque capacity and the torque capacity of the clutch that selectively transfers torque to the engaged gear may be decreased. Method 1800 proceeds to 1850.

At 1850, method 1800 judges if speed of the transmission input shaft that transfers torque to the engaged gear plus an offset speed is greater than engine launch speed. If method 1800 judges that speed of the transmission input shaft that transfers torque to the engaged gear plus an offset speed is greater than engine launch speed, the answer is yes and method 1800 proceeds to 1855. Otherwise, the answer is no and method 1800 returns to 1845.

At 1855 of FIG. 18B, the engine continues operating in speed control mode and engine speed is commanded to follow speed of the transmission input shaft that transfers torque to the engaged gear plus an offset speed. In addition, the torque capacity of the clutch continues to be controlled as a function of the desired wheel torque. Method 1800 proceeds to 1860.

At 1860, method 1800 judges if engine crankshaft acceleration and acceleration of the transmission input shaft that selectively transfers torque to the engaged gear are substantially equal (e.g., within +10 percent of each other) and if speed of the transmission input shaft that transfers torque to the engaged gear is greater than engine launch speed. If so, the answer is yes and method 1800 proceeds to 1865. Otherwise, the answer is no and method 1800 returns to 1855.

At 1865, method 1800 reduces the offset speed between the desired engine speed and the desired speed of the transmission input shaft that selectively transfers torque to the engaged gear. By reducing the offset speed, the engine speed and the speed of the transmission input shaft that selectively transfers torque to the engaged gear may be brought together. Method 1800 proceeds to 1870.

At 1870, method 1800 judges if engine crankshaft speed and speed of the transmission input shaft that selectively transfers torque to the engaged gear are substantially equal (e.g., within ±75 RPM of each other). If so, the answer is yes and method 1800 proceeds to 1875. Otherwise, the answer is no and method 1800 returns to 1865.

At 1875, method 1800 locks the clutch that selectively transfers torque to the engaged gear. The clutch may be locked via increasing pressure of fluid supplied to the clutch. Method 1800 proceeds to 1880.

At 1880, method 1800 increases engine torque to provide the requested wheel torque. Engine torque may be increased via opening a throttle of the engine, adjusting engine spark timing, or adjusting other engine torque actuators. Method 1800 proceeds to exit.

In this way, an engine may be started and engine torque may be delivered to the driveline of a hybrid vehicle so that the possibility of driveline torque disturbances may be reduced. Further, the method of FIGS. 18A and 18B may be applied if the vehicle in which the engine operates is stationary or moving.

Turning now to FIG. 19A, an example prophetic timeline 1900 is shown for an engine connection algorithm, according to method 1800 depicted in FIGS. 18A-18B, and as applied to the systems described herein and with reference to FIGS. 1A-4. The upper graph depicts rotational speed of an engine (e.g. 110) and transmission input shaft (e.g. 402, 404) on the vertical-axis, while the lower graph depicts torque profiles (wheel torque, engine torque, total engine crankshaft torque). The horizontal-axis of both the upper and lower graphs depict time. More specifically, timeline 1900 includes plot 1905, indicating a desired engine speed, and plot 1910, indicating engine speed, over time. Timeline 1900 further includes plot 1915, indicating input shaft speed, and plot 1920, indicating input shaft speed plus an offset, over time. Timeline 1900 further includes plot 1923, indicating a normal engine starting speed profile (e.g., an engine speed profile for when the engine is started while the vehicle's transmission is in park and not in response to an increasing torque demand), over time. Timeline 1900 further includes plot 1925, indicating a desired total wheel torque, and plot 1930, indicating an actual wheel torque from an electric machine (e.g. 120), over time. Timeline 1900 further includes plot 1935, indicating a wheel torque from a launch clutch through the vehicle transmission and final drive, over time. Timeline 1900 further includes plot 1940, indicating total engine crankshaft torque multiplied by a transmission and final drive ratio, over time. Arrows 1942 indicating engine torque needed to accelerated engine inertia.

Furthermore, arrow 1945 indicates a period of time between time T50 and T52 wherein the launch clutch (e.g., clutch that is closed to accelerate the vehicle) is open, two-way arrow 1950 indicates a period of time between time T52 and T55 wherein the launch clutch is slipping, and arrow 1955 indicates a period of time between time T55 and T56, wherein the launch clutch is locked, over time.

At time T50, the engine is on and is rotating at normal idle speed, indicated by plot 1910. Furthermore, the vehicle is stationary, as torque is not being transmitted to the wheels, indicated by the absence of an indication of torque at time T50. While this example timeline illustrates an example condition wherein the engine is on at an idle speed, it may be understood that the description contained herein with regard to the engine connection algorithm may be conducted if the engine is initially off, without departing from the scope of this disclosure.

At time T51, and accelerator tip-in imposes an increasing wheel torque request. As such, between time T51 and T52, the vehicle is propelled via the electric machine with the engine and dual clutch transmission (e.g. 125) preparing to transmit engine torque to the wheels. Thus, between time T51 and T52, desired wheel torque increases along a rate limited trajectory up to a value determined by the accelerator pedal position (and potentially other signals). Such a rate may be determined by stability limits, drivetrain twist management, calibration values, or other values calculated to provide desired vehicle response.

Accordingly, between time T51 and T52, electric machine wheel torque, indicated by plot 1930, increases to follow the desired torque reference with electrical propulsion only. Leading with electric drive may provide fast vehicle response, may give a time buffer to prepare the engine and DCT to transmit torque, and may allow the electric machine to be used to reduce wheel torque quickly for traction control, stability control, or a change of mind accelerator pedal lift if needed.

Further, during time T51 and T52, the DCT may prepare the target input clutch to carry capacity and lock the desired target gear ratio. For example, a clutch actuator (e.g. 489 of FIG. 4) may be filled with pressurized fluid. As an example, in a case where the vehicle is stationary, the desired gear ratio may be first gear (e.g. 420). In a case where the vehicle is moving at the time of the tip-in (e.g., increase in accelerator pedal position), the desired gear may be determined based on an engine torque multiplication needed to meet the wheel torque demand and the desired engine speed at the time of connection of the engine.

If the engine is running in idle speed control, as in example timeline 1900, the desired engine speed may rise. In a case where the vehicle is stationary, as in example timeline 1900, the desired speed may rise above idle to a value for vehicle launch to provide the engine more torque capacity for better engine speed regulation with load from the launch clutch, and also to give an indication to the driver that the vehicle is responding to the tip-in request. In an example where the vehicle is moving, the desired engine speed may be a desired DCT input shaft speed plus variable offset speed. Still further, in a case where the engine is off, it may be started and put into speed control with the same desired engine speed as discussed above.

At time T52, it may be understood that electric machine (e.g., 120) torque is above a configurable threshold, indicating that it is close to running out of capability and it may be further understood that engine speed is above desired transmission input shaft speed.

Accordingly, between time T52 and T53, it may be understood that electric machine torque is making torque above an electric machine torque threshold (not shown), indicating that it is close to running out of capacity to meet driver demand. Thus, engine torque may be added to the wheels to achieve the required wheel torque profile. Adding engine torque to the wheels to achieve the required torque profile may include engine speed greater than desired transmission input shaft speed to transmit positive torque through a slipping clutch. In an example condition where the vehicle is stationary, the positive torque may be transmitted through the slipping clutch without delay, due to the input shaft speed being low. However, in an example condition where the vehicle is moving, there may be a time delay while engine speed rises above the desired input shaft speed before the clutch can be applied to transmit positive torque to the driveline. In either case, clutch torque may be ramped in at the same rate the motor torque was applied to maintain constant driveline twist and vehicle acceleration.

In an example condition where the vehicle is stationary, vehicle speed will be low, and the input shaft of the transmission used for the vehicle launch gear may be below a minimum engine speed that can be used for launch, so the input clutch may slip to transmit engine torque to the wheels. Because constant engine speed is desired during such a time, engine torque may be approximately equal to the increasing clutch torque. Driver demand may dictate the peak slipping clutch torque because the clutch is the device controlling wheel torque and vehicle acceleration at this time. Accordingly, accelerator input and driver demand may be mapped to clutch torque while the clutch is slipping. In other words, clutch torque capacity may be a function of driver demand torque.

In an example condition where the vehicle was initially moving, engine speed may be above the desired input shaft speed, and further the input shaft speed may be above a minimum engine launch speed, thus enabling transmission of positive torque within minimal clutch slipping.

Furthermore, responsive to the driver reducing desired wheel torque, a combination of reducing electric machine torque and slipping clutch torque capacity may be conducted to meet the wheel torque reduction. At this point, the DCT clutches may be opened to return the vehicle to electric propulsion mode, or the vehicle may continue to accelerate with the launch clutch slipping until the transmission input shaft speed is high enough for the clutch to lock at the engine launch speed for hybrid vehicle propulsion.

At time T53, target input shaft speed plus offset rises above the launch engine speed. Accordingly, between time T53 and T54, the engine speed controller may increase engine torque to follow input shaft speed plus an additional offset. The additional offset may be used to keep positive slip across the clutch and prevent it from locking before desired. It may be understood that the slipping clutch is in control of wheel torque, thus there is no change in vehicle operation. Accordingly, the time period between time T53 and T54 may be utilized to match acceleration between the input shaft and crankshaft to achieve a smooth clutch lock event by reducing an amount of engine torque increase at the point of locking to maintain the same vehicle acceleration with increased driveline inertia at the time of lock.

At time T54, crankshaft and transmission input have the same acceleration and input speed is above launch speed. Thus, between time T55 and T56, once the acceleration of the engine crankshaft and input shaft are the same and the input shaft is above the minimum engine speed for the clutch to lock, offset between the engine speed control target and input shaft speed is reduced to zero. This may be linearly reduced as a function of time, or it may be shaped using some other means such that the engine speed controller may reduce engine torque to bring the two shaft speeds together, to allow the clutch to lock. By having the engine speed controller control clutch locking instead of coordinating engine and clutch torque may automatically compensate for engine and clutch torque errors, and may provide robust locking times determined by a rate at which the speed offset is reduced.

At time T55, engine and input shaft speeds are matched and clutch locking is achieved. Thus, between time T55 and T56, once the engine and input shaft speeds are matched within a threshold, DCT target input clutch capacity may be rapidly increased to lock the clutch without affecting drivetrain wheel torque, as the speeds and accelerations may be closely matched. When the clutch locks, torque transmitted through the clutch into the transmission may change from its slipping capacity to engine torque minus the torque needed to accelerate the engine inertia. The more closely matched the acceleration of the engine and input shafts when their speeds match, the less difference there will be in torque as a result of the lock. The acceleration of the engine may be at least somewhat lower than acceleration of the input shaft for the speeds to intersect and enable clutch locking. Accordingly, some amount of engine torque may be quickly added to the transmission to compensate for extra inertia added to the input clutch by the engine. After the lock, engine torque transmitted to the wheels through the transmission may be controlled directly by the engine torque controller, and not the clutch. To maintain a same rate of torque into the transmission, the engine may need to produce the desired wheel torque contribution from the engine plus the torque to continue the same rate of acceleration of the engine inertia.

Thus, transition to hybrid propulsion may be completed between time T55 and T56, and the electric machine torque may be blended out and engine torque increased according to energy management to achieve a desired torque split between the two the electric machine and engine.

Figure 19B:
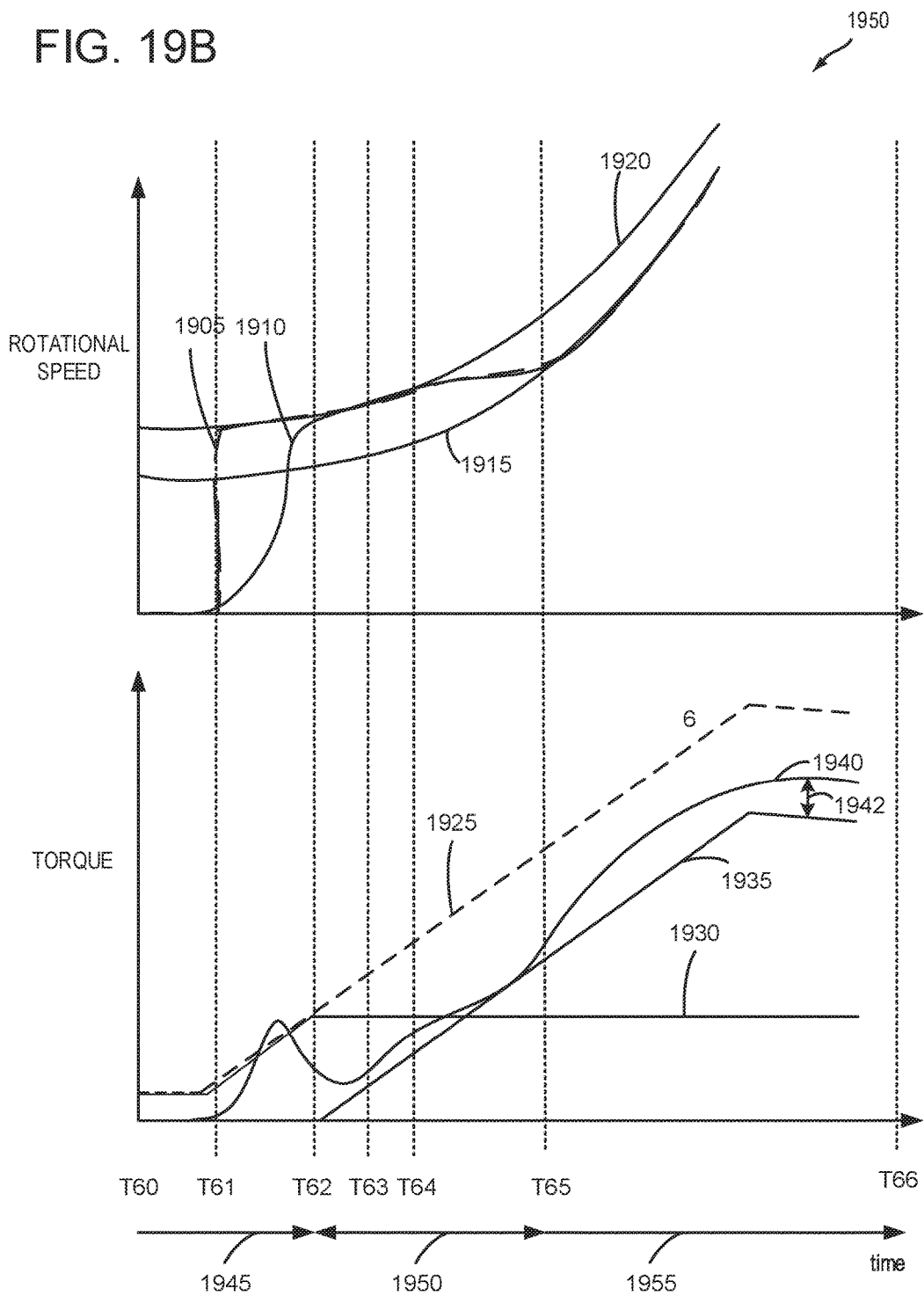

Turning now to FIG. 19B, an example prophetic timeline 1900 is shown for an engine connection algorithm, according to method 1800 depicted in FIGS. 18A-18B, and as applied to the systems described herein and with reference to FIGS. 1A-4. In this example, the engine is started while the vehicle in which the engine is rolling on a road. The upper graph depicts rotational speed of an engine (e.g. 110) and transmission input shaft (e.g. 402, 404) on the vertical-axis, while the lower graph depicts torque profiles (wheel torque, engine torque, total engine crankshaft torque). The horizontal-axis of both the upper and lower graphs depict time. More specifically, timeline 1950 includes plot 1905, indicating a desired engine speed, and plot 1910, indicating engine speed, over time. Timeline 1950 further includes plot 1915, indicating input shaft speed, and plot 1920, indicating input shaft speed plus an offset, over time. Timeline 1950 further includes plot 1925, indicating a desired total wheel torque, and plot 1930, indicating an actual wheel torque from an electric machine (e.g. 120), over time. Timeline 1950 further includes plot 1935, indicating a wheel torque from a launch clutch through the vehicle transmission and final drive, over time. Timeline 1900 further includes plot 1940, indicating total engine crankshaft torque multiplied by a transmission and final drive ratio, over time. Arrows 1942 indicating engine torque needed to accelerated engine inertia.

Furthermore, arrow 1945 indicates a period of time between time T60 and T62 wherein the launch clutch (e.g., clutch that is closed to accelerate the vehicle) is open, two-way arrow 1950 indicates a period of time between time T62 and T65 wherein the launch clutch is slipping, and arrow 1955 indicates a period of time between time T65 and T66, wherein the launch clutch is locked, over time.

At time T60, the engine is stopped, not rotating, and not combusting air and fuel as indicated by plot 1910. Furthermore, the vehicle is rolling via power from the electric machine (e.g., 120) as indicated by actual wheel torque from the electric machine 1930 at time T50.

At time T61, and accelerator tip-in imposes an increasing wheel torque request. As such, between time T61 and T62, the vehicle is propelled via the electric machine with the engine and dual clutch transmission (e.g. 125) preparing to transmit engine torque to the wheels. Thus, between time T61 and T62, desired wheel torque 1925 increases along a rate limited trajectory up to a value determined by the accelerator pedal position (and potentially other signals). Such a rate may be determined by stability limits, drivetrain twist management, calibration values, or other values calculated to provide desired vehicle response.

At time T61, desired engine speed 1905 increases to indicate a request to start the engine. The engine is started and it begins to accelerate to the input shaft speed of the input shaft that is coupled to the presently engaged transmission gear plus an offset speed value 1920. The engine is accelerated to its desired speed in a speed control mode.

Accordingly, between time T61 and T62, electric machine wheel torque, indicated by plot 1930, increases to follow the desired torque reference with electrical propulsion only. Leading with electric drive may provide fast vehicle response, may give a time buffer to prepare the engine and DCT to transmit torque, and may allow the electric machine to be used to reduce wheel torque quickly for traction control, stability control, or a change of mind accelerator pedal lift if needed.

Further, during time T61 and T62, the DCT may prepare the target input clutch to carry capacity and lock the desired target gear ratio. For example, a clutch actuator (e.g. 489 of FIG. 4) may be filled with pressurized fluid. As an example, in a case where the vehicle is stationary, the desired gear ratio may be first gear (e.g. 420). In a case where the vehicle is moving at the time of the tip-in (e.g., increase in accelerator pedal position), the desired gear may be determined based on an engine torque multiplication needed to meet the wheel torque demand and the desired engine speed at the time of connection of the engine.

At time T62, it may be understood that electric machine (e.g., 120) torque is above a configurable threshold, indicating that it is close to running out of capability and it may be further understood that engine speed is above desired transmission input shaft speed.

Accordingly, between time T62 and T63, it may be understood that electric machine torque is making torque above an electric machine torque threshold (not shown), indicating that it is close to running out of capacity to meet driver demand. Thus, engine torque may be added to the wheels to achieve the required wheel torque profile.

Because constant engine speed is desired during such a time, engine torque may be approximately equal to the increasing clutch torque. Driver demand may dictate the peak slipping clutch torque because the clutch is the device controlling wheel torque and vehicle acceleration at this time. Accordingly, accelerator input and driver demand may be mapped to clutch torque while the clutch is slipping. In other words, clutch torque capacity may be a function of driver demand torque.

At time T63, desired input shaft speed plus offset rises above the launch engine speed. Accordingly, between time T63 and T64, the engine speed controller may increase engine torque to follow input shaft speed plus an additional offset. The additional offset may be used to keep positive slip across the clutch and prevent it from locking before desired. The time period between time T63 and T64 may be utilized to match acceleration between the input shaft and crankshaft to achieve a smooth clutch lock event by reducing an amount of engine torque increase at the point of locking to maintain the same vehicle acceleration with increased driveline inertia at the time of lock.

At time T64, crankshaft and transmission input have the same acceleration and input speed is above launch speed. Thus, between time T65 and T66, once the acceleration of the engine crankshaft and input shaft are the same and the input shaft is above the minimum engine speed for the clutch to lock, offset between the engine speed control target and input shaft speed is reduced to zero.

At time T65, engine and input shaft speeds are matched and clutch locking is achieved. Thus, between time T65 and T66, once the engine and input shaft speeds are matched within a threshold, DCT target input clutch capacity may be rapidly increased to lock the clutch without affecting drivetrain wheel torque, as the speeds and accelerations may be closely matched. Thus, transition to hybrid propulsion may be completed between time T65 and T66. The engine may be started from a stopped state and accelerated to a speed of a transmission input shaft. One of the transmission clutches may be closed with clutch slip responsive to driver demand torque. The closing clutch transfers engine torque to the vehicle wheels to meet the driver demand torque. The closing clutch is fully closed after the engine speed and the transmission speed are substantially equal.

In this way, a hybrid vehicle may be enabled to launch the vehicle in an electric-only mode of operation, or silent drive, without activating the engine in a fueled mode of operation and then deactivating the engine, simply to release the park pawl. Instead, the park pawl may be released without fueled engine operation, which may increase vehicle operator satisfaction and which may improve fuel economy.

The technical effect is to recognize that by spinning the engine unfueled, and/or by operating an electric transmission pump, the park pawl may be released without fueled engine operation. Such operations may enable an increase in fuel efficiency for hybrid vehicles.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A driveline operating method, comprising:
engaging a parking pawl to an output shaft of a dual clutch transmission in response to a request to enter a vehicle into a parked state; and
disengaging the parking pawl via rotating an engine via an integrated starter/generator in response to a request to propel the vehicle solely via power of an electric machine positioned downstream of the dual clutch transmission.

2. The method of claim 1, further comprising reducing pumping work of the engine in response to the request to propel the vehicle solely via power of the electric machine.

3. The method of claim 1, where the integrated starter/generator is coupled to the engine.

4. The method of claim 1, where the engine is not combusting air and fuel while the parking pawl is engaged.

5. The method of claim 1, further comprising rotating a pump via rotating the engine.

6. The method of claim 5, further comprising supplying fluid via the pump to release the parking pawl.

7. The method of claim 1, ceasing engine rotation in response to an indication that the parking pawl is released.

8. A driveline operating method, comprising:
engaging a parking pawl to an output shaft of a dual clutch transmission in response to a request to enter a vehicle into a parked state; and
disengaging the parking pawl via activating an electric pump in response to a request to propel the vehicle solely via power of an electric machine positioned downstream of the dual clutch transmission.

9. The method of claim 8, further comprising deactivating the electric pump in response to an indication that the parking pawl is released.

10. The method of claim 8, further providing torque to vehicle wheels via the electric machine in response to the parking pawl being released.

11. The method of claim 8, further comprising starting an engine in response to an indication that the parking pawl is not released after commanding the parking pawl released.

12. The method of claim 11, further comprising rotating a mechanical pump via the engine and releasing the parking pawl after the indication that the parking pawl is not released.

13. The method of claim 11, further comprising deactivating the electric pump in response to the indication that the parking pawl is not released.

14. The method of claim 8, where the parking pawl is engaged via a spring.

15. The method of claim 8, where the dual clutch transmission is positioned in a vehicle driveline between an engine and the electric machine.

16. A system, comprising:
an engine;
a dual clutch transmission coupled to the engine, the dual clutch transmission including a parking pawl and a hydraulic pump in fluidic communication with the parking pawl;
an electric machine coupled to, and positioned downstream of, the dual clutch transmission; and
a controller including executable instructions stored in non-transitory memory to disengage the parking pawl via supplying hydraulic fluid to the parking pawl via the hydraulic pump in response to a request to propel a vehicle via power supplied solely from the electric machine.

17. The system of claim 16, where the hydraulic pump is electrically driven via an electric motor, the electric motor not coupled to the engine.

18. The system of claim 17, further comprising additional instructions to rotate the hydraulic pump via the electric motor in response to the request to propel the vehicle via power supplied solely from the electric machine, and where the electric machine is not the electric motor.

19. The system of claim 16, further comprising additional instructions to rotate the hydraulic pump via the engine without starting the engine.

20. The system of claim 16, where the parking pawl includes a spring for engaging the parking pawl.

* * * * *